United States Patent [19]
Yano et al.

[11] Patent Number: 5,907,666
[45] Date of Patent: May 25, 1999

[54] RECORDING SYSTEM FOR TRANSFERRING OFFSET DATA TO BE RECORDED

[75] Inventors: Kentaro Yano; Naoji Otsuka, both of Yokohama; Kiichiro Takahashi; Osamu Iwasaki, both of Kawasaki; Daigoro Kanematsu, Yokohama, all of Japan

[73] Assignee: Canon Kabushiki Kaisha, Tokyo, Japan

[21] Appl. No.: 08/557,568

[22] Filed: Nov. 14, 1995

[30] Foreign Application Priority Data

Nov. 17, 1994 [JP] Japan ................ 6-283385
Nov. 28, 1994 [JP] Japan ................ 6-293132
Nov. 28, 1994 [JP] Japan ................ 6-293160
Nov. 28, 1994 [JP] Japan ................ 6-293196

[51] Int. Cl.⁶ .......................... G06F 15/00; B41J 29/38
[52] U.S. Cl. .................. 395/109; 395/105; 395/107; 347/13; 347/20; 347/40; 347/115; 347/141
[58] Field of Search .................. 347/13, 41, 42, 347/115, 151, 174, 186, 190, 195, 180, 19, 37, 40, 109; 395/109, 107, 115, 116, 105; 358/296, 474, 502, 298

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,540,996 | 9/1985 | Saito | 358/502 |
| 4,558,333 | 12/1985 | Sugitani et al. | 346/140 R |
| 4,608,577 | 8/1986 | Hori | 346/140 R |
| 4,723,129 | 2/1988 | Endo et al. | 346/1.1 |
| 4,740,796 | 4/1988 | Endo et al. | 346/1.1 |
| 4,779,102 | 10/1988 | Sasaki | 347/13 |
| 4,978,971 | 12/1990 | Goetz | 395/105 |
| 5,057,852 | 10/1991 | Formica et al. | 347/37 |
| 5,109,239 | 4/1992 | Cobbs et al. | 347/40 |
| 5,250,956 | 10/1993 | Haselby et al. | 347/40 |
| 5,350,929 | 9/1994 | Meyer et al. | 347/19 |
| 5,376,958 | 12/1994 | Richtsmeier et al. | 347/104 |
| 5,384,587 | 1/1995 | Takagi et al. | 347/41 |
| 5,477,246 | 12/1995 | Hirabayashi et al. | 347/40 |
| 5,485,178 | 1/1996 | Tateyama et al. | 395/115 |
| 5,488,397 | 1/1996 | Nguyen et al. | 347/40 |
| 5,506,606 | 4/1996 | Saikawa et al. | 347/104 |
| 5,528,270 | 6/1996 | Tajika | 347/19 |
| 5,539,434 | 7/1996 | Fuse | 347/40 |
| 5,570,464 | 10/1996 | Fuse | 395/105 |
| 5,604,597 | 2/1997 | Imai | 358/474 |
| 5,608,431 | 3/1997 | Kishida et al. | 347/13 |
| 5,625,391 | 4/1997 | Hirabayashi et al. | 347/41 |
| 5,668,584 | 9/1997 | Broder et al. | 347/40 |
| 5,696,542 | 12/1997 | Matsubara et al. | 347/40 |

FOREIGN PATENT DOCUMENTS

| | | |
|---|---|---|
| 0520818 | 12/1992 | European Pat. Off. |
| 0600707 | 6/1994 | European Pat. Off. |
| 54-56847 | 5/1979 | Japan |
| 56-145480 | 11/1981 | Japan |
| 59-123670 | 7/1984 | Japan |
| 59-138461 | 8/1984 | Japan |
| 60-71260 | 4/1985 | Japan |
| 5-338209 | 12/1993 | Japan |

*Primary Examiner*—Edward L. Coles
*Assistant Examiner*—Mark Wallerson
*Attorney, Agent, or Firm*—Fitzpatrick, Cella, Harper & Scinto

[57] ABSTRACT

A host computer offsets data for each color to be recorded in a sub-scanning direction in accordance with the quantities of offset of recording elements for a plurality of colors in a sub-scanning direction relative to recording elements for any one of the plurality of colors and transfers the offset data to be recorded to a recording apparatus so that a system is disclosed for improving efficiency in using a memory in a case where a recording head is used which has the plurality of recording elements for recording the plurality of colors, the recording elements being offset in a predetermined direction.

58 Claims, 37 Drawing Sheets

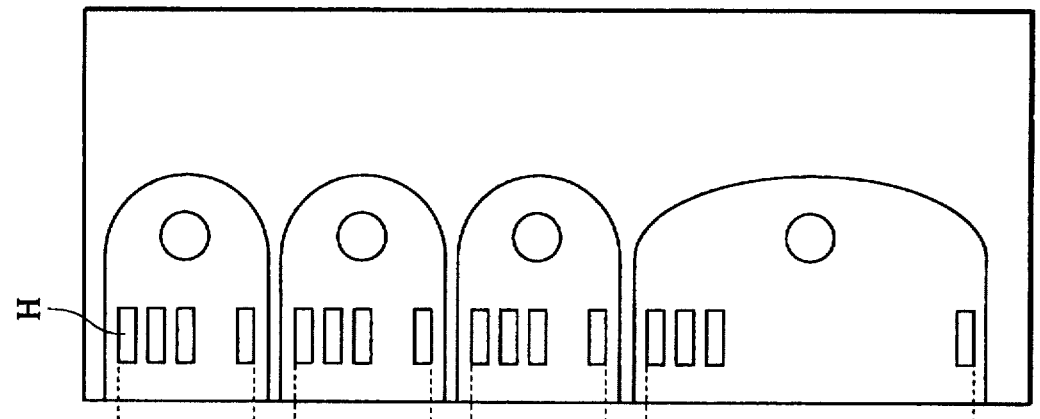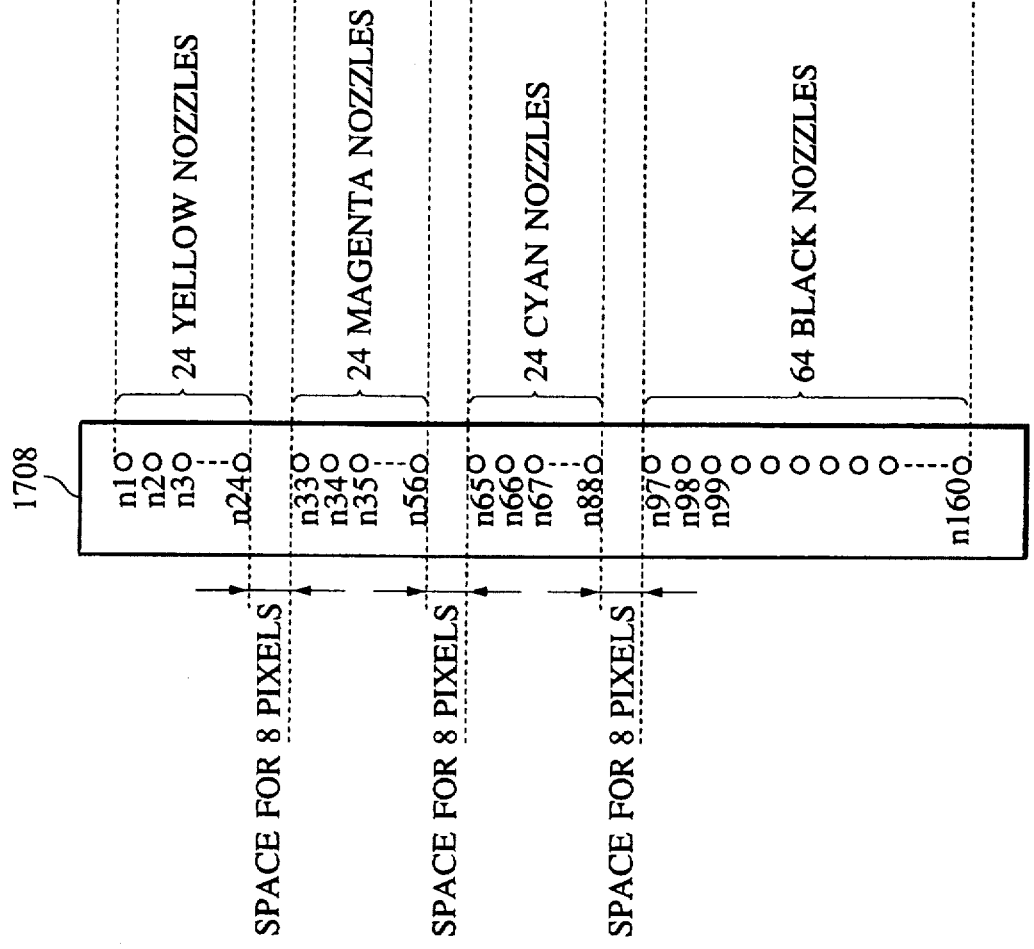

WHERE (-96≦n) (n IS AN INTEGER)

FIG. 24(a)
FIG. 24(b)
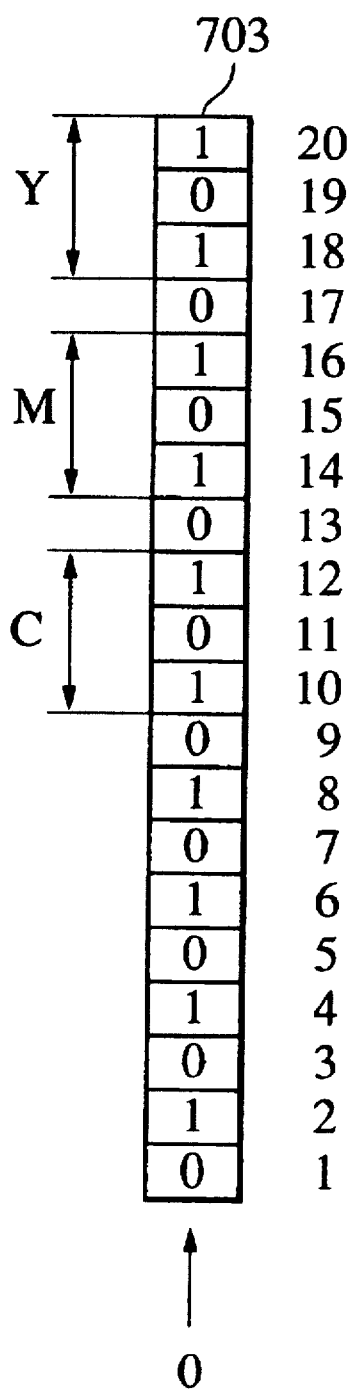
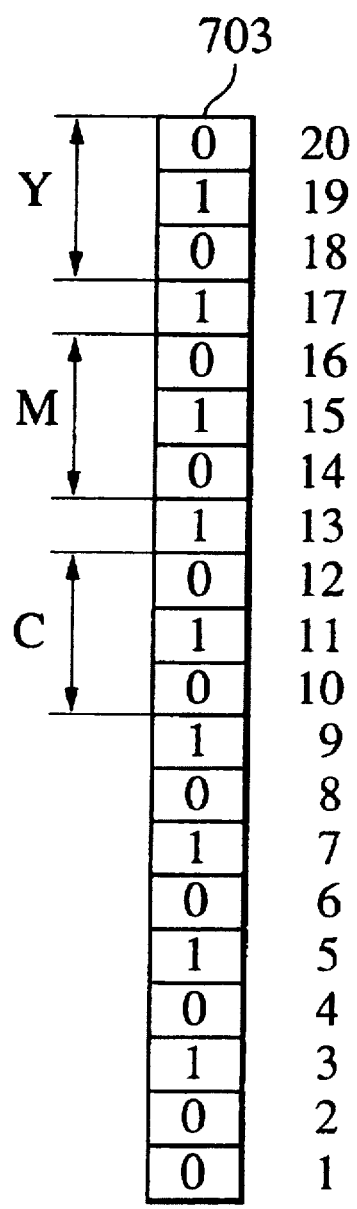

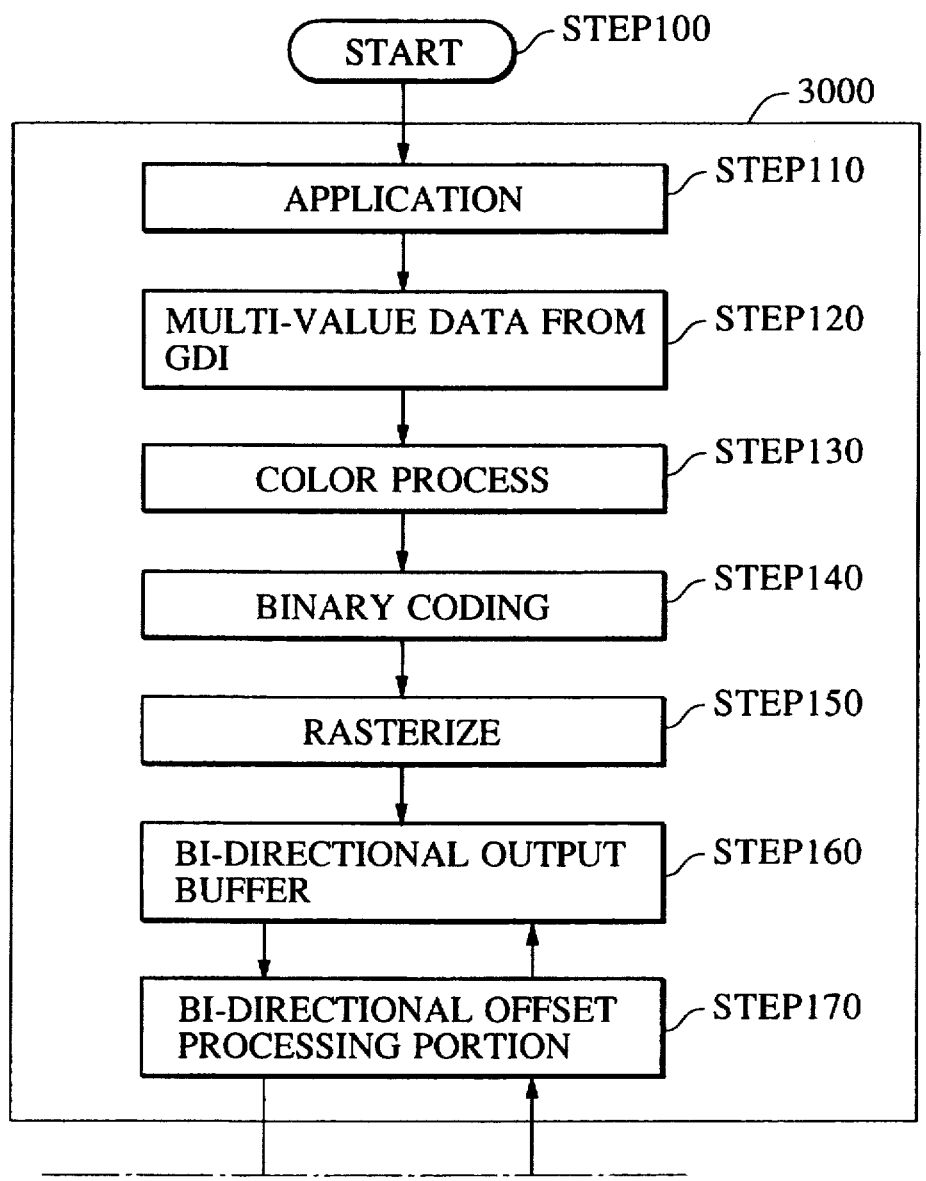

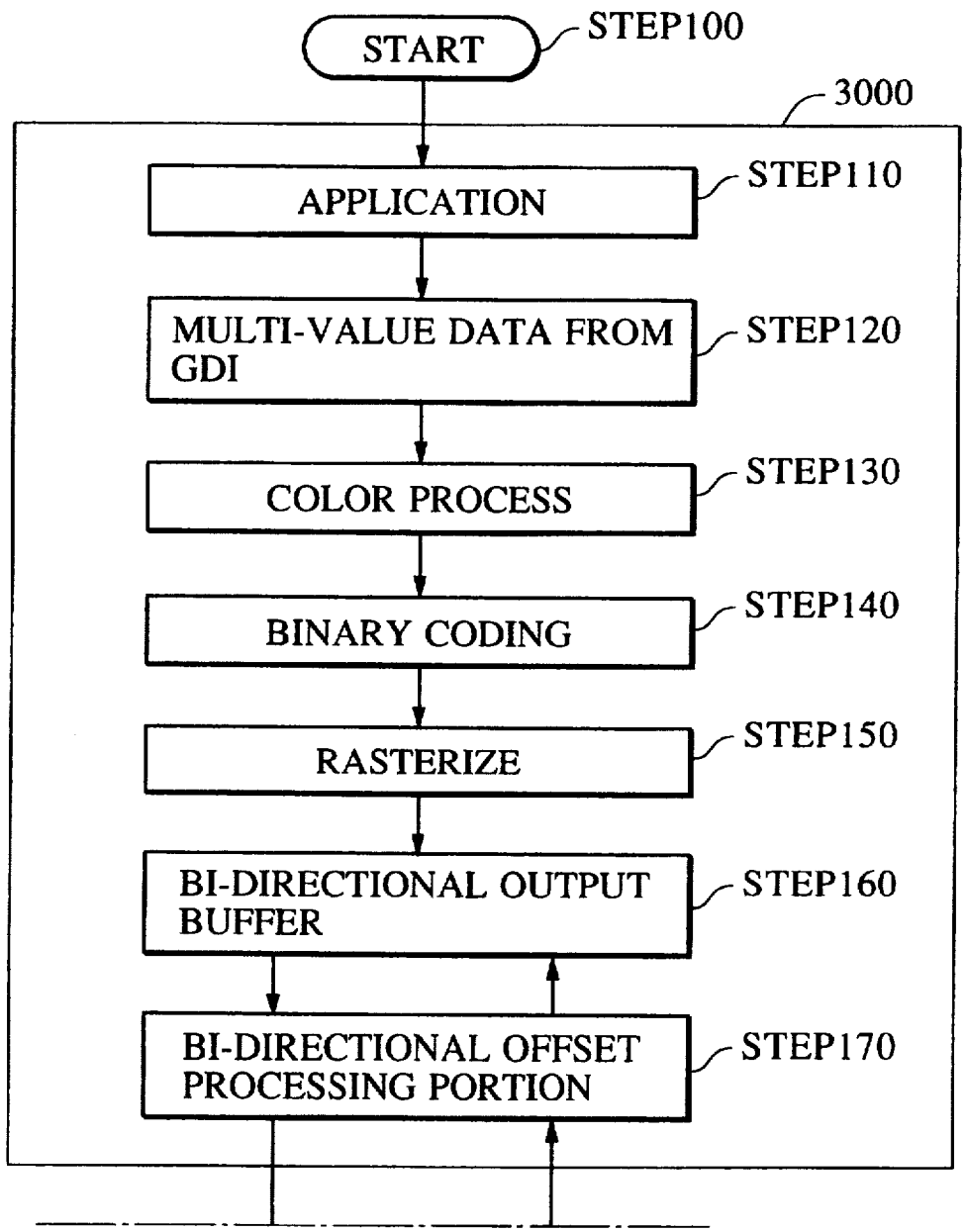

RECORDING SYSTEM FOR TRANSFERRING OFFSET DATA TO BE RECORDED

BACKGROUND OF THE INVENTION

1. Field of the Invention

The present invention relates to a method of transferring data to be recorded, a recording apparatus and a recording system, and more particularly to a method of transferring data to be recorded which is adaptable to a recording apparatus having a vertical-type recording head comprising recording elements arranged to record a plurality of colors and disposed in a direction in which nozzles of the recording head are disposed, and to a recording apparatus and a recording system having the foregoing recording head to record an image.

2. Related Background Art

In recent years, office automation equipment, such as personal computers, word processors and the like, has been widely used. To print out information input from the foregoing equipment, a variety of recording methods and recording apparatuses have been developed. Information to be printed out is in a trend of being formed into color images as the performance of the office automation equipment has been improved. Under the foregoing circumstance, low cost color recording apparatuses and recording apparatuses capable of performing both color-image recording and high speed black-image recording have been developed.

A method of transferring color data when a color recording operation is performed in a serial recording apparatus for recording data by scanning a recording head will now be described. In the main scanning direction (hereinafter called as a "raster direction") of the recording head, image information for each color for each raster or in line units collecting a plurality of rasters is transferred. That is, yellow, magenta, cyan and black image data for the same raster or the same line is transmitted/received, and then yellow, magenta, cyan and black image data for the next raster is transmitted/received.

Data is, in the foregoing case, usually transmitted/received in parallel by a Centronics Interface method. Although the present Centronics Interface method is a one-directional transmitting/receiving method from a host computer to the recording apparatus, a bidirectional Centronics Interface method has been established with which data can be transmitted/received bidirectionally.

Recording means of a color recording apparatus for recording images in a plurality of colors are generally disposed in a lateral direction such that respective recording colors are disposed in parallel in the raster direction. The lateral configuration method suffers from a problem in that the size of the recording apparatus in the raster direction is enlarged excessively, a problem in that the order of superimposing the recording colors when the recording head moves forward for recording data and that when the same moves back are inverted and, therefore, the color tone of the recorded image is displaced, and a problem in that colors are undesirably mixed with each other or bleeding takes place because next color recording liquid reaches before the previously recorded recording liquid is fixed.

To overcome the foregoing problems, a countermeasure is taken such that the boundary of images to be recorded in different colors is detected; if a boundary exists, then printing is performed in such a manner that intermittent pausing is performed or one dot in the boundary portion is omitted in printing, or if the boundary portion is a boundary from a black image, then the boundary with the black image is converted (PCBk converted) into a combination with another color image.

Another method may be employed in which the recording means for the respective colors are disposed in the sub-scanning direction (in the vertical direction) to prevent bleeding of an image in the boundary portion. With the foregoing method, the time taken to record dots in the different colors to be printed with the same raster is elongated, thus preventing bleeding of an image in the boundary portion. Since the respective colors are offset in the sub-scanning direction in the foregoing method, the order of superimposing recording liquids is not changed between the case where the recording head moves forward and the case where the recording head moves back. Thus, an advantage can be realized in that the color tone cannot be displaced if images are recorded in the two directions. As a result, heads of a type having the vertical configuration have been widely used.

The vertical-configuration recording head comprising the yellow, magenta, cyan and black recording devices, which are disposed in the sub-scanning direction, inevitably has a large size in the sub-scanning direction. Accordingly, a black recording device, which is required to be capable of recording images at high speed and which is used frequently to print characters, has a multiplicity of nozzles and the yellow, magenta and cyan recording devices, which are required to be capable of recording high quality images and which are not required to be capable of recording images at high speed as compared with the black recording device, has a small number of nozzles so that the specification, cost and size are balanced.

However, the vertical-configuration head has a bit map, in which image data is developed, and which has a memory area (hereinafter called as a "print buffer") that requires a significantly larger region as compared with that of a lateral-configuration head. The required print buffer area of a vertical-configuration head will now be described with reference to the drawings.

FIG. 1 is a diagram showing a print buffer area of a vertical-configuration head. A recording head 1708 having 24 recording devices for recording yellow, magenta and cyan images and 64 recording devices for recording black images. A gap corresponding to 8 devices (pixels) is formed between recording device groups for recording different color images. The recording devices for the respective colors are arranged in the main scanning direction in an order of yellow, magenta, cyan and black.

When the recording head 1708 having the recording devices for recording a yellow image records a yellow image from (n) raster to (n+23) raster, the recording devices for recording a magenta image record a range from (n+32) raster to (n+55) raster, the recording devices for recording a cyan image record a range from (n+64) raster to (n+87) raster, and the recording devices for recording a black image record a range from (n+96) raster to (n+159) raster.

Since recording pixel data for each color is, in raster units or line units, transferred from an external apparatus, such as a host computer, to the recording apparatus, start of the recording operation is inhibited until transference of yellow, magenta, cyan and black data to be recorded to at least (n+159) raster is completed and as well as development of black recording data to (n+159) raster is completed in the print buffer. Although the recording devices for recording a yellow image is able to record the same if development of the image signal in the print buffer from the (n) raster to the (n+23) raster is completed, the recording devices for recording a yellow image must have the recording information to the (n+159) raster. Thus, a memory corresponding to 160 rasters is required as shown in FIG. 1.

If the recording resolution of the recording apparatus is 360 DPI, the image to be recorded has a size of an A4 sheet and the number of pixels in one raster is 2,880 pixels, the 160 rasters require a memory capacity of 460,800 (=160 rasters×2,880 pixels) bits. Similarly, the recording devices for recording a magenta image requires 368,640 bits (=128 rasters×2,880 pixels), the recording devices for recording a cyan image requires 276,480 bits (=96 rasters×2,880 pixels) and the recording devices for recording a black image requires 184,320 bits (=64 rasters×2,880 pixels). As a result, the yellow, magenta, cyan and black recording devices require a total memory area of 1,290,240 bits.

The print buffer area, to which a reference is made during one recording scanning operation, for each of the yellow, magenta and cyan recording devices is 69,120 bits (=24 rasters×2,880 pixels), whereas that for the black recording devices is 184,320 bits (=64 raster×2,880 pixels). The recording devices for recording yellow, magenta, cyan and black images require a total print buffer area of 391,680 bits, which is smaller than the half of the foregoing required bits of 1,290,240 bits.

The recording devices for recording a black image, which must record black characters at high speed, has a large number of recording elements as compared with those of the yellow, magenta and cyan recording devices. In a case where a color image is printed, only 24 recording elements for black are used because only 24 yellow, magenta and cyan recording elements are provided. Thus, 24 yellow, magenta, cyan and black recording elements are used to print the image and the paper is moved for a distance corresponding to the 24 nozzles. The foregoing recording operation is repeated. Although any recording element group may be used because 64 nozzles are provided for the black recording device, recording elements farthest from the yellow, magenta and cyan image are usually used to prevent bleeding occurring between different color images.

Although all of the 64 nozzles for a black image can be used only when a black image is printed, frequency of use varies among nozzles because only 24 specific nozzles are used when a color image is printed. Since deterioration of the nozzle occurring due to the time lapse changes depending upon the frequency of use, difference in the density arises between an image recorded by the nozzles used frequently and that recorded by the nozzle which are not used frequently. Thus, a desired image quality cannot be obtained. If the life of any one of the nozzles is closed, the life of the recording head is closed. Therefore, the offset in the frequency of use shortens the life of the recording head.

Although the vertical-configuration of the heads allows the time for fixing an image to be maintained and therefore bleeding in the boundary region can be prevented, bleeding cannot be prevented completely. Therefore, another bleeding preventive means is required to improve the quality of the image.

As described above, the conventional recording apparatus comprising the vertical-configuration recording head requires a print buffer (a memory) having a large capacity. Thus, the overall cost cannot be reduced. Furthermore, the time required to start recording from start of transference of data to be recorded from a host computer can be elongated. Thus, the time required to complete the recording operation is elongated excessively.

SUMMARY OF THE INVENTION

In view of the foregoing, an object of the present invention is to provide a method of transferring data to be recorded, a recording apparatus and a recording system which is capable of improving efficiency in using a memory in a case where a recording head is used which has a plurality of recording elements for recording a plurality of colors, the recording elements being offset in a predetermined direction.

Another object of the present invention is to provide a method of transferring data to be recorded, a recording apparatus and a recording system which is capable of shorting time required to record data if a vertical-configuration head is used.

Another object of the present invention is to provide a method of transferring data to be recorded, a recording apparatus and a recording system with which use of the recording elements can be uniformed, the life of the recording head can be elongated and a high-quality image can be recorded at high speed.

Another object of the present invention is to provide a method of transferring data to be recorded, a recording apparatus and a recording system which is capable of preventing bleeding in a boundary portion between different-color regions to enable an image exhibiting high quality to be recorded.

According to one aspect of the present invention, there is provided a method of transferring data to be recorded in such a manner that the data to be recorded is transferred to a recording apparatus having a recording head including a plurality of recording elements offset in a predetermined direction for recording a plurality of colors, the method of transferring data to be recorded comprising the steps of: obtaining quantities of offset of the recording elements for the plurality of colors in the predetermined direction relative to recording elements for any one of the plurality of colors; and transferring, to the recording apparatus, the data which is offset in the predetermined direction in accordance with the obtained quantity of offset and which corresponds to the plurality of colors.

According to another aspect of the present invention, there is provided a recording apparatus having a recording head including a plurality of recording elements offset in a predetermined direction for recording a plurality of colors, the recording apparatus comprising: storage means for storing data to be recorded, which corresponds to the recording elements for the plurality of colors in quantities corresponding to the number of the recording elements; and receiving means for receiving the data, which is offset in a predetermined direction in accordance with quantities of offset of the recording elements for the plurality of colors in the predetermined direction relative to recording elements for any one of the plurality of colors, and which corresponds to the plurality of colors.

According to another aspect of the present invention, there is provided a recording system having a recording apparatus for recording data by using a recording head including a plurality of recording elements offset in a predetermined direction for recording a plurality of colors and a host computer for transferring, to the recording apparatus, the data to be recorded, the recording system comprising: obtaining means for obtaining quantities of offset of the recording elements for the plurality of colors in the predetermined direction relative to recording elements for any one of the plurality of colors; and transferring means for transferring the data which is offset in the predetermined direction in accordance with the obtained quantity of offset and which corresponds to the plurality of colors, to the recording apparatus, wherein the recording apparatus has receiving means for receiving the data transferred by the transferring means and corresponding to the plurality of colors.

According to another aspect of the present invention, there is provided a method of transferring data to be recorded in such a manner that the data to be recorded is transferred to a recording apparatus having a recording head including a plurality of recording elements offset in a sub-scanning direction for recording a plurality of colors, the method of transferring data to be recorded comprising the steps of: obtaining quantities of offset of the recording elements for the plurality of colors in the sub-scanning direction relative to recording elements for any one of the plurality of colors; changing the quantity of offset to change the positions of the recording elements to be used; offsetting, in the sub-scanning direction, the data corresponding to the plurality of colors in accordance with the changed quantity of offset, and transferring the offset data corresponding to the plurality of colors to the recording apparatus.

According to another aspect of the present invention, there is provided a method of transferring data to be recorded in such a manner that the data to be recorded is transferred to a recording apparatus having a recording head including a plurality of recording elements offset in a sub-scanning direction for recording a plurality of colors, the method of transferring data to be recorded comprising the steps of: obtaining quantities of offset of the recording elements for the plurality of colors in the sub-scanning direction relative to recording elements for any one of the plurality of colors; thinning data to be recorded for at least one color so as to be complemented and completed by a plurality of scanning operations for recording; offsetting, in the sub-scanning direction, the data corresponding to the plurality of colors in accordance with the changed quantity of offset, and transferring the offset data corresponding to the plurality of colors to the recording apparatus.

According to another aspect of the present invention, there is provided a recording apparatus having a recording head including a plurality of recording elements offset in a sub-scanning direction for recording a plurality of colors, the recording apparatus comprising: storage means for storing data to be recorded which corresponds to the recording elements for the plurality of colors; receiving means for receiving the data, which is offset in the sub-scanning direction in accordance with quantities of offset of the recording elements for the plurality of colors in the sub-scanning direction relative to recording elements for any one of the plurality of colors, and which corresponds to the plurality of colors; and thinning means for thinning data to be recorded for at least one color so as to be complemented and completed by a plurality of scanning operations for recording.

According to another aspect of the present invention, there is provided a recording system comprising: a recording apparatus for recording data by using a recording head including a plurality of recording elements offset in a sub-scanning direction for recording a plurality of colors; and a host computer for transferring, to the recording apparatus, the data to be recorded, wherein the host computer has obtaining means for obtaining quantities of offset of the recording elements for the plurality of colors in the sub-scanning direction relative to recording elements for any one of the plurality of colors; changing means for changing the quantity of offset to change the positions of the recording elements to be used; and transferring means for transferring the data which is offset in the sub-scanning direction in accordance with the obtained quantity of offset and which corresponds to the plurality of colors, to the recording apparatus, and the recording apparatus has receiving means for receiving the data transferred by the transferring means and corresponding to the plurality of colors.

According to another aspect of the present invention, there is provided a recording system comprising: a recording apparatus for recording data by using a recording head including a plurality of recording elements offset in a sub-scanning direction for recording a plurality of colors; and a host computer for transferring, to the recording apparatus, the data to be recorded, wherein the host computer has obtaining means for obtaining quantities of offset of the recording elements for the plurality of colors in the sub-scanning direction relative to recording elements for any one of the plurality of colors; thinning means for thinning data to be recorded for at least one color so as to be complemented and completed by a plurality of scanning operations for recording; and transferring means for transferring the data which is offset in the sub-scanning direction in accordance with the obtained quantity of offset and which corresponds to the plurality of colors, to the recording apparatus, and the recording apparatus has receiving means for receiving the data transferred by the transferring means and corresponding to the plurality of colors.

According to another aspect of the present invention, there is provided a recording apparatus having a recording head including a plurality of recording elements offset in a sub-scanning direction for recording a plurality of colors, the recording apparatus comprising: storage means for storing data to be recorded which corresponds to the recording elements for the plurality of colors; receiving means for receiving the data, which is offset in the sub-scanning direction in accordance with quantities of offset of the recording elements for the plurality of colors in the sub-scanning direction relative to recording elements for any one of the plurality of colors, and which corresponds to the plurality of colors; detection means for detecting an image boundary portion between different-color regions in accordance with the data received by the receiving means; and bleeding preventive means for preventing bleeding occurring in the boundary portion in accordance with a result of detection performed by the detection means.

According to another aspect of the present invention, there is provided a recording system comprising: a recording apparatus for recording data by using a recording head including a plurality of recording elements offset in a sub-scanning direction for recording a plurality of colors; and a host computer for transferring, to the recording apparatus, the data to be recorded, wherein the host computer has transferring means for transferring the data offset in the sub-scanning direction in accordance with the quantities of offset of the recording elements for the plurality of colors in the sub-scanning direction relative to recording elements for any one of the plurality of colors and corresponding to the plurality of colors to the recording apparatus, and the recording apparatus has receiving means for receiving the data transferred by the transferring means and corresponding to the plurality of colors, detection means for detecting an image boundary portion between different-color regions in accordance with the data received by the receiving means, and bleeding preventive means for preventing bleeding occurring in the boundary portion in accordance with a result of detection performed by the detection means.

According to another aspect of the present invention, there is provided a method of transferring data to be recorded in such a manner that the data to be recorded is transferred to a recording apparatus having a recording head including a plurality of recording elements offset in a sub-scanning direction for recording a plurality of colors, the method of transferring data to be recorded comprising the steps of: offsetting and transferring the data in such a manner that the data offset in the sub-scanning direction in accordance with the quantities of offset of the recording elements for the plurality of colors in the sub-scanning direction relative to recording elements for any one of the plurality of colors and corresponding to the plurality of colors is transferred to the recording apparatus; and transferring non-offset data corresponding to the plurality of the other colors together with the data which is transferred in the offset and transferring step.

According to another aspect of the present invention, there is provided a method of transferring data to be recorded in such a manner that the data to be recorded is transferred to a recording apparatus having a recording head including a plurality of recording elements offset in a sub-scanning direction for recording a plurality of colors, the method of transferring data to be recorded comprising: a first transferring process for transferring the data corresponding to the plurality of colors and stored in storage means to the recording apparatus without offsetting the data in the sub-scanning direction; a receiving process for receiving the data processed by the recording apparatus; a conversion process for, in accordance with received data, converting the data stored in the storage means; and a second transferring process for offsetting the converted data in accordance with the quantities of offset of the recording elements for the plurality of colors in the predetermined direction relative to recording elements for any one of the plurality of colors and transferring the offset data.

According to another aspect of the present invention, there is provided a recording system in which communication between a recording apparatus for recording data by using a recording head including a plurality of recording elements offset in a sub-scanning direction for recording a plurality of colors; and a host computer for transferring, to the recording apparatus, the data to be recorded is performed by a bidirectional interface, wherein the host computer has first transferring means for transferring the data corresponding to the plurality of colors and stored in storage means to the recording apparatus without offsetting the data in the sub-scanning direction; receiving means for receiving the data processed by the recording apparatus; conversion means for, in accordance with received data, converting the data stored in the storage means; and second transferring means for offsetting the converted data in accordance with the quantities of offset of the recording elements for the plurality of colors in the predetermined direction relative to recording elements for any one of the plurality of colors and transferring the offset data, and the recording apparatus has discrimination means for discriminating whether or not data received from the host computer has been offset, processing means for processing the data if the received data has not been offset, transmission means for transmitting the processed data to the host computer, and control means for recording the received data if the received data has been offset.

According to another aspect of the present invention, there is provided a recording apparatus having a recording head including a plurality of recording elements offset in a sub-scanning direction for recording a plurality of colors, the recording apparatus comprising: bidirectional interface means for communication with an external apparatus; discrimination means for discriminating whether or not the data received from the bidirectional interface has been offset in the sub-scanning direction in accordance with quantities of offset of the recording elements for the plurality of colors in the sub-scanning direction relative to recording elements for any one of the plurality of colors; processing means for processing the data if the received data has not been offset; transmission means for transmitting the processed data to the external apparatus through the bidirectional interface; and control means for recording the received data if the received data has been offset.

According to the present invention, offset data to be recorded is transferred in accordance with the quantity of offset in the predetermined direction so that the required capacity for the storage means of a recording apparatus is reduced.

In a case where a vertical-configuration head is used in which recording elements for different colors are arranged in the sub-scanning direction, the color superimposing order is not changed when the bidirectional printing operation is performed so that the time required to record pixels on previous pixels or adjacent to the previous pixels is shortened significantly.

Since the frequency of use of the recording elements can be uniformed, the effect of the vertical-configuration head, with which the color superimposing order is not changed when the bidirectional printing operation is performed and the effect of delaying the time taken to record a pixel adjacent to the previous pixel can be obtained, and the problem of the vertical-configuration head in that the unsatisfactory efficiency in using the memory, irregular densities of the recorded images because the nozzles are not used concentrically and unsatisfactorily short life of the recording head can be improved.

Even if data is offset and transferred, the image boundary portion can be detected. Therefore, the efficiency in using the memory can be improved and bleeding in the boundary portion, which cannot be prevented by simply employing the vertical-configuration head, can be prevented.

The bidirectional communication function is used to temporarily transmit data corresponding to the position on the same raster on a recording medium, the boundary is detected in the printer, required data is processed, the processed data is returned to a printer driver in the host computer, and the data to be printed is again transmitted if the positions of the nozzles and the position of the data to be printed coincide with one another so that the printing operation is controlled to prevent bleeding while improving the efficiency in using the memory.

Other and further objects, features and advantages of the invention will be evident from the following detailed description of the preferred embodiments taken in conjunction with the attached drawings.

BRIEF DESCRIPTION OF THE DRAWINGS

FIGS. 4(A and B) are diagrams showing a recording head according to a first embodiment of the present invention;

FIGS. 24(A and B) are diagrams showing a state of data to be stored in the memories according to the seventh embodiment of the present invention;

FIGS. 34A and 34B are flow charts showing the flow of data according to a twelfth embodiment of the present invention; and FIGS. 35A and 35B are flow charts showing the flow of data according to a thirteenth embodiment of the present invention.

DESCRIPTION OF THE PREFERRED EMBODIMENTS

Preferred embodiments of the present invention will now be described with reference to the drawings.

First Embodiment

Figure 2:
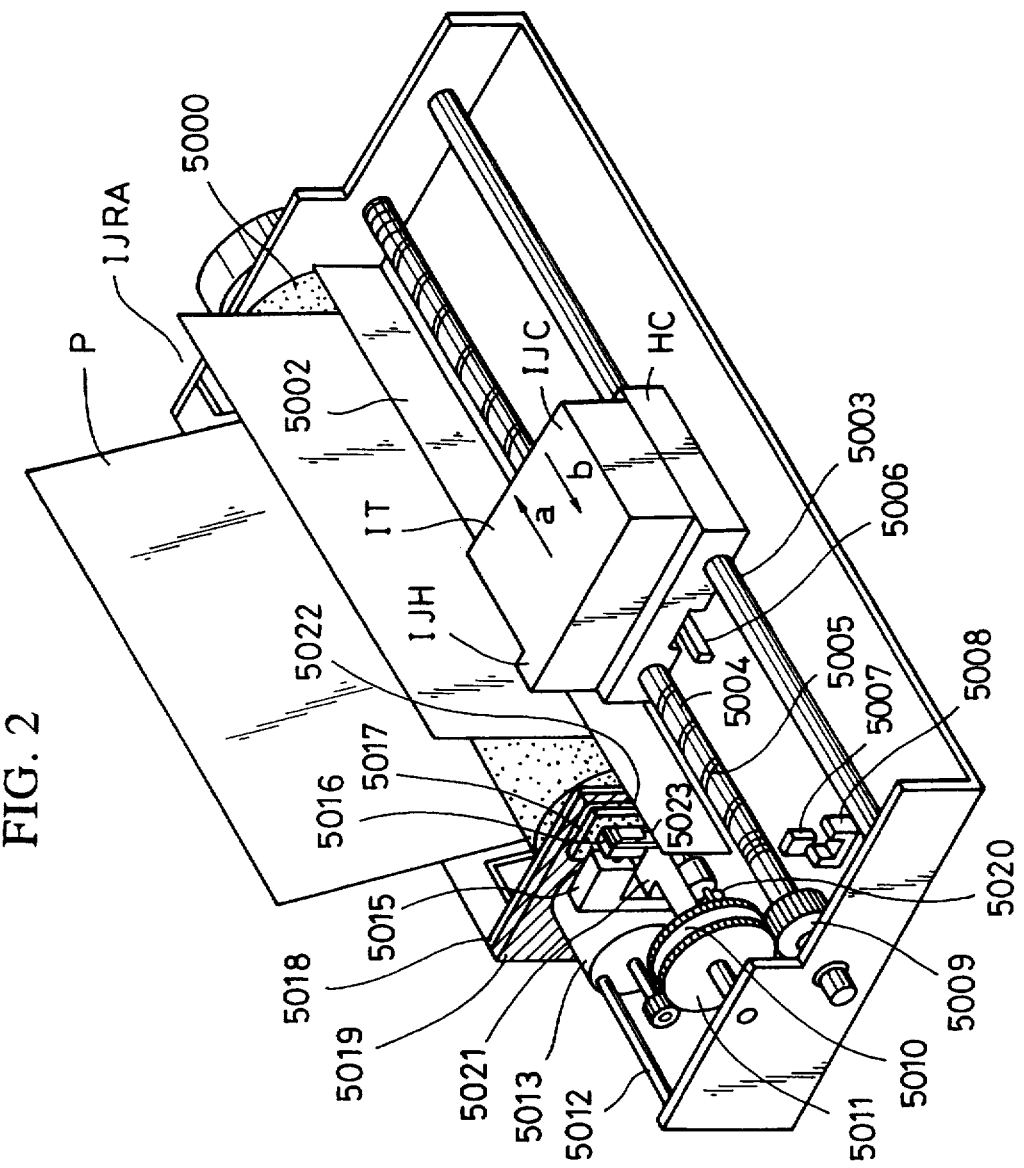
FIG. 2 is a perspective view showing an ink jet recording apparatus adaptable to the present invention.

FIG. 2 is a perspective view showing an ink jet recording apparatus (IJRA) to which the present invention can be adapted.

Referring to FIG. 2, a carriage HC engaged to a spiral groove 5004 of a lead screw 5005, which is, through rotational-force transmission gears 5011 and 5009, rotated in synchronization with forward/reverse rotations of a drive motor 5013 has a pin (not shown) so that the carriage HC is reciprocated in directions indicated by arrows a and b. The carriage HC has an ink jet cartridge IJC mounted thereon. Reference numeral 5002 represents a paper retaining plate which presses paper against a platen 5000 in the direction, in which the carriage HC is moved. Reference numerals 5007 and 5008 represent photocouplers to serve as a home position detecting means which confirms existence of a lever 5006 of the carriage HC in the regions thereof to, for example, switch the rotational direction of a motor 5013. Reference numeral 5016 represents a member for controlling a capping member 5022 which caps the overall surface of the recording head. Reference numeral 5015 represents a suction means for sucking the inside portion of the capping member 5022, the suction means 5015 being arranged to recover the sucking performance of the recording head through an opening 5023 in the capping member 5022. Reference numeral 5017 represents a cleaning blade being enabled to move forward/rearwards by a member 5019. Reference numeral 5018 represents a support blade so integrally formed with the body of the ink jet recording apparatus as to support the cleaning blade 5017 and the member 5019. Reference numeral 5012 represents a lever for starting the sucking operation for the suction recovery, the lever 5012 being moved when a cam 5020 engaged to the carriage HC is moved so that the rotational force of the drive motor 5013 is used to control the movement of the carriage HC by a known transmission means, such as a clutch means.

The foregoing capping, cleaning and suction recovery operation can be performed by corresponding positions by the operation of a lead screw 5005 when the carriage HC has been brought to the home position region. The foregoing operations are required to be performed at known timings.

Figure 3:
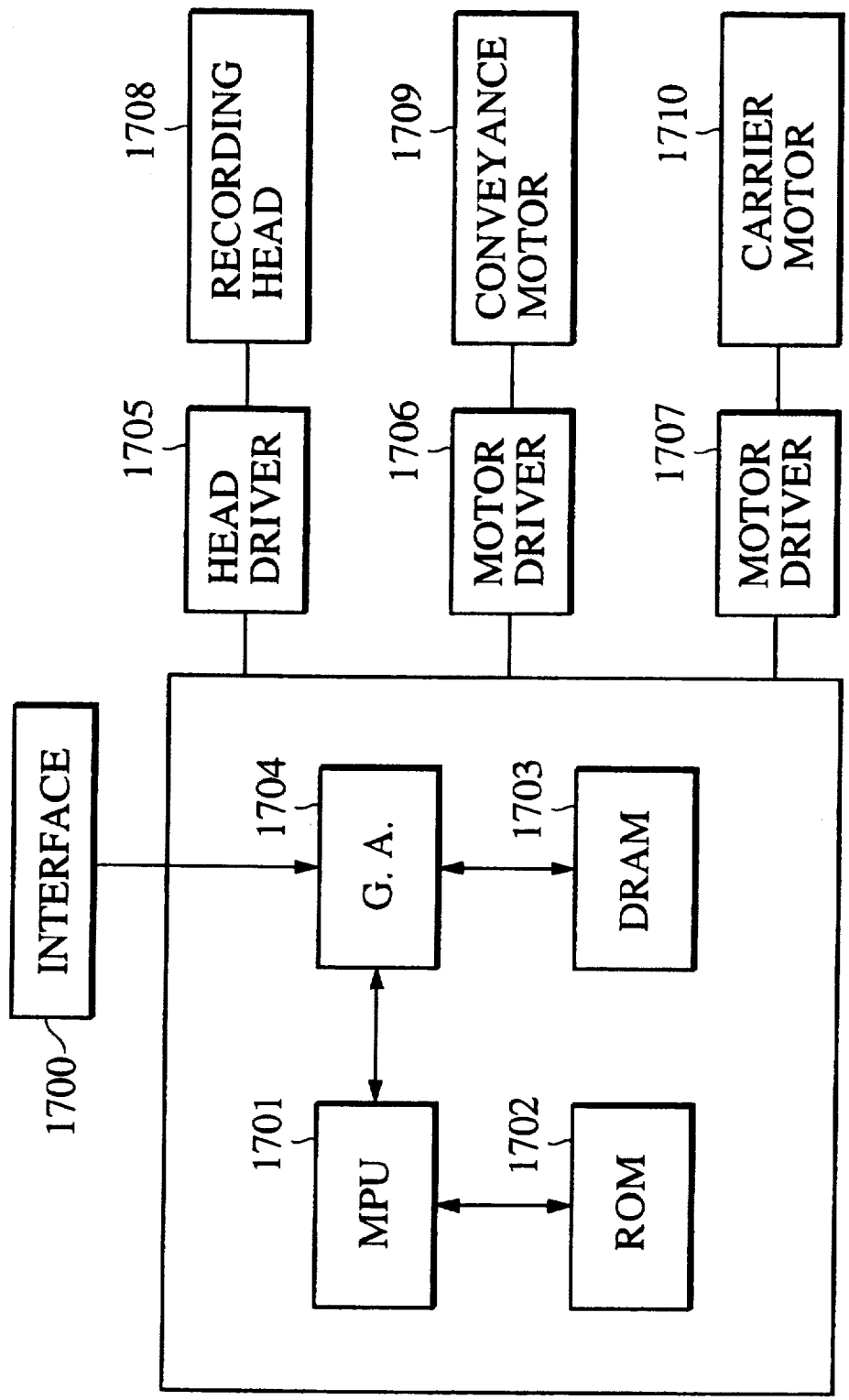
FIG. 3 is a block diagram showing the logic of a recording head adaptable to the present invention.

FIG. 3 is a block diagram showing a structure for controlling the ink jet recording apparatus shown in FIG. 2.

Referring to FIG. 2, reference numeral 1700 represents an interface through which recording signals are received, 1701 represents an MPU, 1702 represents a ROM for storing a control program to be executed by the MPU 1701, printing information supplied from a host computer so as to be printed and the like, reference numeral 1703 represents a DRAM for storing a variety of data items (the foregoing recording signals and data to be supplied to the recording head so as to be recorded and the like). Reference numeral 1704 represents a gate array for controlling supply of data to be transmitted to a recording head 1708, the gate array 1704 also controlling data transference among the interface 1700, the MPU 1701 and the DRAM 1703. Reference numeral 1710 represents a carrier motor for moving the recording head 1708. Reference numeral 1709 represents a conveyance motor for conveying recording paper, and 1705 represents a head driver for operating the recording head 1708. Reference numeral 1706 represents a motor driver for rotating the conveyance motor 1709. Reference numeral 1707 represents a motor driver for rotating the carrier motor 1710.

In the recording apparatus structured as described above, when information is, through the interface 1700, supplied from a host computer 300 to be described later, the supplied information is, between the gate array 1704 and the MPU 1701, converted into information to be printed out. As a result, the motor drivers 1706 and 1707 are operated, and as well as the recording head 1708 is operated in accordance with the information supplied to the head driver 1705 so that printing is performed.

The recording head according to the present invention is formed into one chip including 24 recording elements for recording each of yellow, magenta and cyan images and 64 recording elements for recording a black image. Furthermore, a gap corresponding to 8 elements (pixels) is formed between recording element groups for recording different color images. FIG. 4 is a diagram showing the recording head 1708. As shown in FIG. 4A, nozzles n1 to n160 are formed in the vertical direction in the order as yellow, magenta, cyan and black. FIG. 4B is a diagram showing a chip of the recording head having the foregoing structure. As shown in FIG. 4B, heaters H serving as yellow, magenta, cyan and black recording elements are disposed vertically in this sequential order. Furthermore, a gap corresponding to 8 pixels (8 nozzles) is formed between different-color recording element groups. Although the foregoing gap is not an essential portion for the present invention, the gap between the different-color recording element groups simplifies the structure in which different-color ink chambers are formed on the chip of the recording head.

The ink chambers, nozzles and ink flow passages for the respective colors according to this embodiment are formed by molding. The molded members are pressed against the recording head chip by springs (not shown), and then the molded members and springs are sealed by a sealing material. Since a method of forming the ink chambers and nozzles by dry films or another forming method may be adapted to the present invention, their detailed descriptions are omitted here.

In the case where recording is performed by using a so-called vertical head, in which the nozzles for the respective colors are arranged in the direction in which the nozzles are arranged, the print buffer requires an excessively large capacity as described with reference to FIG. 1. Thus, there is a risk that a low-cost recording apparatus cannot be provided.

Figure 5:
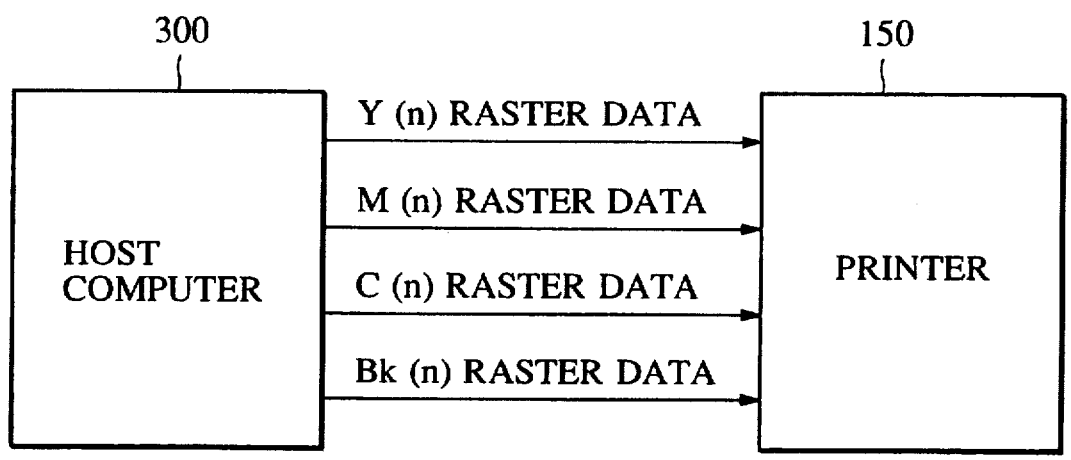
FIG. 5 is a block diagram showing conventional transference of data to be recorded.
Figure 6:
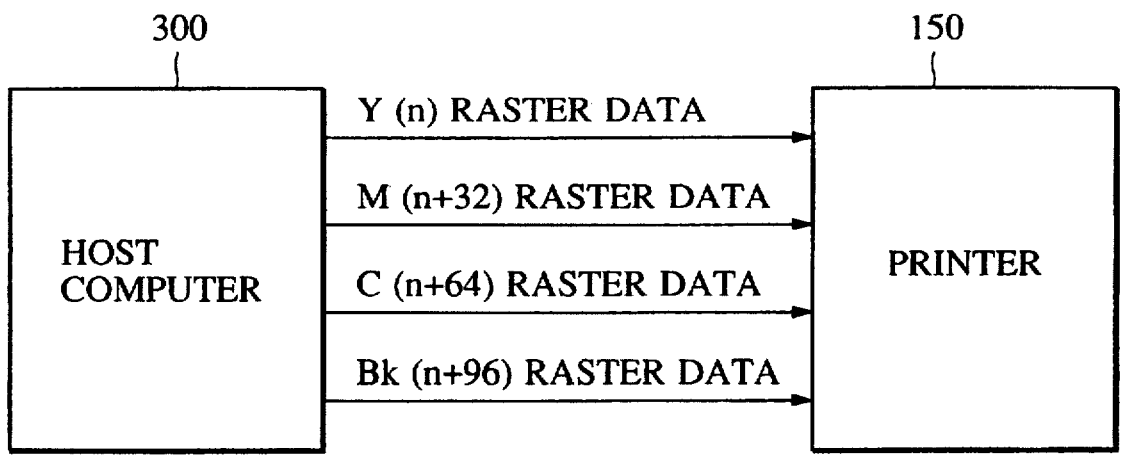
FIG. 6 is a diagram showing data transference according to the first embodiment of the present invention performed in such a manner that data to be recorded is offset for each color.

Since data of an image to be recorded is, in the same raster units, transferred from the host computer 300 to a printer 150 as shown in FIG. 5, cyan nozzles must print a portion from (n+64) raster to (n+87) raster, magenta nozzles must print a portion (n+32) raster to (n+55) raster and yellow nozzles must print a portion from (n) to (n+23) raster when black nozzles are printing a portion from (n+96) raster to (n+159) raster. Although only 136 rasters (64+24×3) are simultaneously used in printing, data for 400 rasters must be stored. Data for the cyan nozzles from (n+88) raster to (n+159) raster, that for the magenta nozzles from (n+56) raster to (n+159) raster and that for the yellow nozzles from (n+24) raster to (n+159) raster are unnecessary data during printing of the foregoing region.

Since the recording resolution of the recording apparatus according to the present invention is 360 DPI and the image to be recorded has a size of a A4 sheet, the number of pixels for one raster is 2,880 pixels. Thus, the 264 (400−136) rasters, that is, 760,320 bits, must be unnecessarily stored. As a result, an excessively large memory loss takes place.

However, since this embodiment has the arrangement that yellow, magenta, cyan and black image data is offset when the data is transferred, the foregoing memory efficiency loss can be prevented.

Specifically, when the host computer 300 transfers (n) raster yellow image data, it offsets data in such a manner that (n+32) rasters of magenta data, (n+64) rasters of cyan image data and (n+96) rasters of black image data are transferred. That is, the host computer 300 offsets data before transference of the same to the printer 150 (offset transference). Since n is −96 or more in this embodiment, data of the subject color is not transferred if the raster to be transferred is less than 0 or larger than the maximum rasters.

Figure 7:
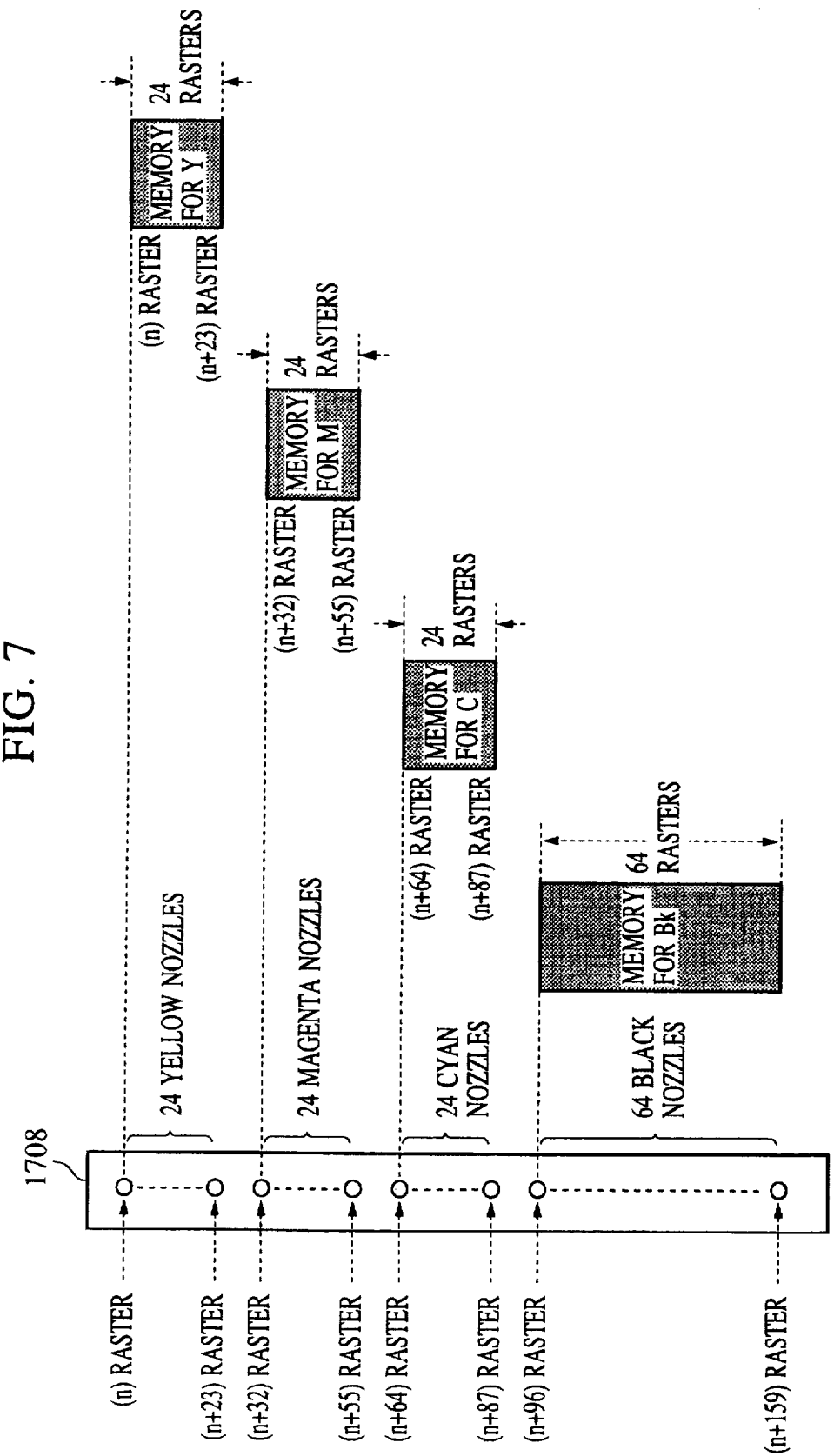
FIG. 7 is a diagram showing the structure of the memory employed in the first embodiment of the present invention in a case where offset for each color is performed.

Since data corresponding to the configuration of the color nozzles of the recording head can be transferred, the memory for the image to be recorded is not required to store the rasters, which are not printed simultaneously, as shown in FIG. 7. As a result, the memory efficiency can significantly be improved.

As a matter of course, image data to a plurality of forward rasters than the rasters, which are being printed simultaneously, may be read previously to perform bit development. Also in the foregoing case, the efficiency in using the memory can significantly be improved as compared with the conventional method in which only image data for a portion of colors must be stored in a large quantity.

Figure 8:
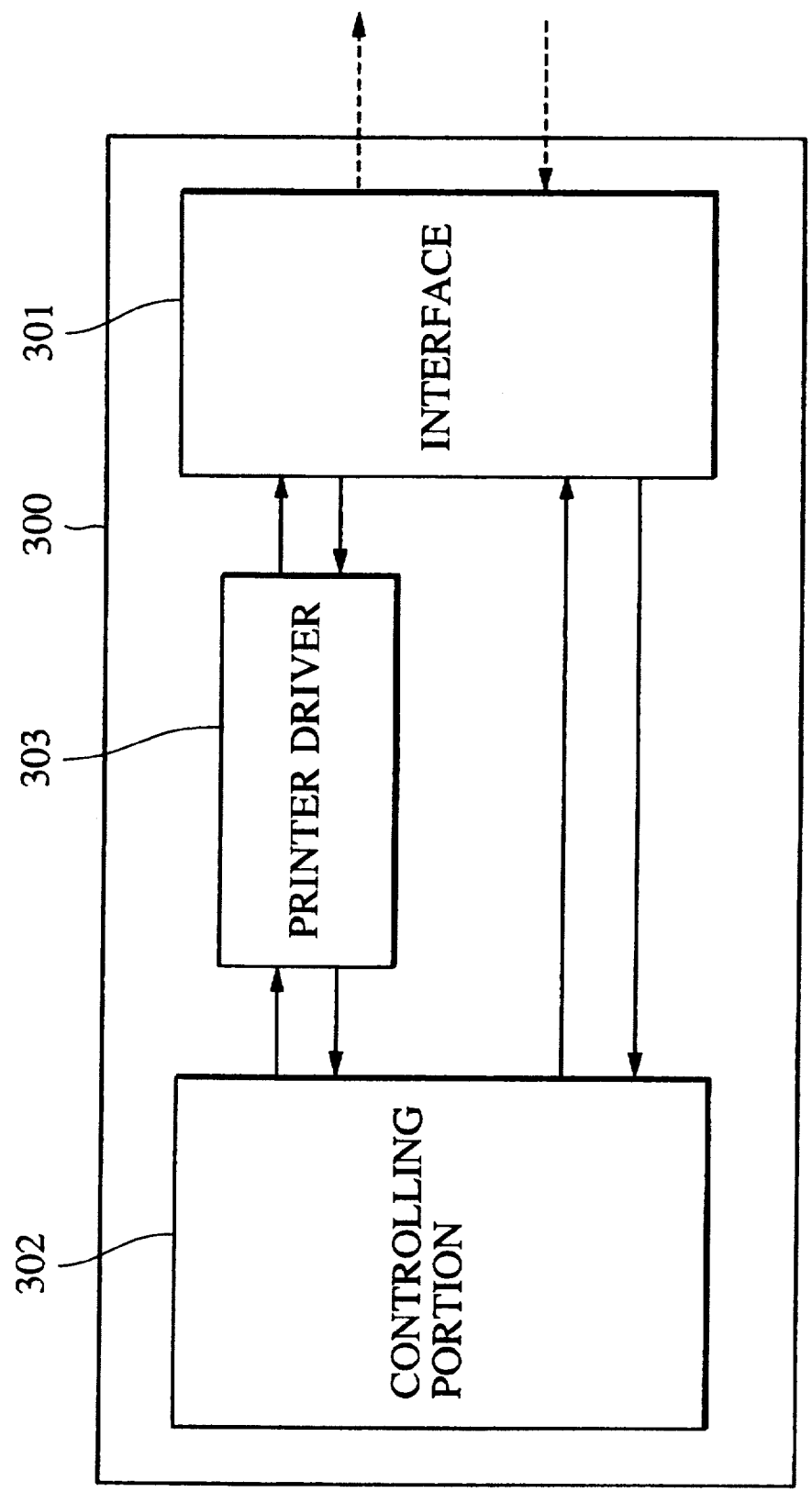
FIG. 8 is a block diagram showing the structure of a host computer according to the first embodiment of the present invention.

The offset transference of image data from an external apparatus is performed by software, in particular, a printer driver, in the external apparatus. The external apparatus (the host computer 300), as shown in FIG. 8, transmits/receives data to and from the recording apparatus and transmits/receives an image to be recorded to and from an image input apparatus through an interface 301. Data supplied through the interface 301 is controlled by a control portion 302. When the data is transmitted to the recording apparatus (the printer 150), the controlled image data is formed into transference data adaptable to the specification of the recording apparatus by a specific printer driver 303 for the recording apparatus, that is, set to be adaptable to the recording apparatus. Then, the data is offset before it is transferred to the recording apparatus.

The conversion of the transference data into a form adaptable to the specification of the recording apparatus is performed by, for example, color correction, γ-correction of the output, binary-coding, resolution conversion or transference encoding of image data adaptable to the recording apparatus. After the foregoing process has been performed, the printer driver 303 as well as performs the offset transference of data to the recording apparatus.

Figure 9:
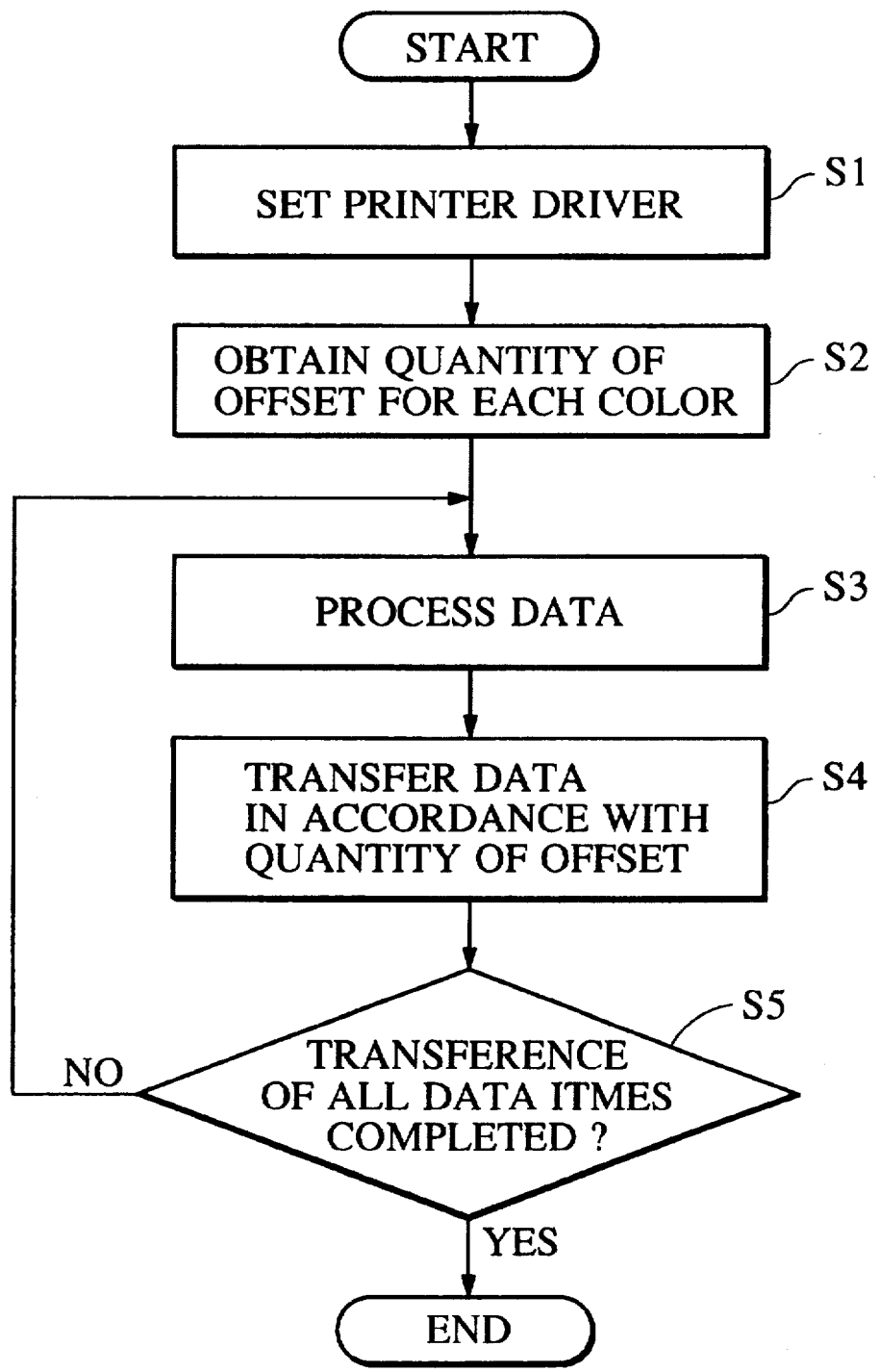
FIG. 9 is a flow chart of the operation of the first embodiment.

The process to be performed by the host computer 300 will now be described with reference to a flow chart shown in FIG. 9.

In step S1 the printer driver is set, and in step S2 the quantity of offset for each color in the recording head mounted on the recording apparatus is obtained. In this embodiment, the quantity of offset for magenta is 32, that for cyan is 64 and that for black is 96 with respect to yellow. In step S3 data is processed, and in step S4 the processed data is transferred to the recording apparatus in a quantity determined in accordance with the quantity of offset obtained in step S4. The foregoing process is repeated until all data items are transferred (step S5).

After the transferred data has been stored in the memory in a quantity (for 24 rasters in this embodiment) required for one main scanning operation, the printer performs main scanning to record data for one line. In this embodiment, recording starts by recording a black image and recording ends by recording a black image to correspond to the configuration of the offset nozzles.

Since the quality of the printed image can be improved and the time required to output the recorded image thanks to the improvement in the performance of the printer driver, version of the printer driver is usually performed. Since an environment has been established, in which the printer driver can be updated regardless of the application, because general-purpose operating systems have been widely used, a further improvement in the printer driver is expected.

According to the present invention, the arrangement of the image transference raster process among the specifications of the printer driver and the recording apparatus is optimized to be adaptable to the specification of the recording head, the memory efficiency of the recording apparatus can significantly be improved.

Although the description has been made about the structure in which the transference of image data for each color is performed in raster units, a similar effect can be obtained from a structure in which transference is performed in line units collecting a plurality of rasters so far as the lines to be transferred are offset.

The transference of data to be recorded may be performed by serial transference for each color or by parallel transference of data of a plurality of colors to be transferred.

As described above, according to this embodiment, the transference raster offset means for offsetting rasters for each color to be transferred attains an effect to be obtained in that the color superimposing order cannot be changed when a vertical-configuration head having different-color recording elements arranged in the main scanning direction performs the bidirectional recording operation, which is the advantage for the vertical-configuration head. Furthermore, while attaining another effect in that the time required for the pixels to be recorded on or adjacently to previous pixels can significantly be delayed, inefficiency in using the memory, which is the disadvantage for the vertical-configuration head, can be improved so that data to be recorded is transferred at high speed with an excellent image quality.

Second Embodiment

A method of transferring data to be recorded for optimizing the offset of the data to correspond to the recording head and a recording apparatus adapted to the foregoing transference method will now be described.

Although the foregoing embodiment has the arrangement in that the memory efficiency of the recording apparatus is improved by providing, for the transference rasters of image data, a specific offset width determined previously for each color, another method may be employed in which information of the offset of the width of data to be transferred is specified from the recording apparatus.

The performance of each of recording apparatuses employing the thermal transfer method, the wire dot method, the ink jet method and the like is considerably affected by the performance of the recording head, which is the main component of the recording apparatus. The recording head is sometimes formed into a replaceable structure which enables a user to change the recording head. That is, a structure enabling a recording head to be selected from plural types of prepared recording heads to meet the purpose of use of the recording apparatus results in recording apparatuses having different performances and characteristics without change of the apparatus (although a head for only recording a black image and a color head are generally made to be changeable, the combination is not limited to this).

Although the performance of the recording head is improved after the recording apparatus has been supplied by employing novel techniques in the recording head in order to provide a recording apparatus having improved performance as compared with the performance at the moment the recording apparatus has been supplied, the recording apparatus, in which one method of transferring image data to be recorded is determined, encounters limitation in freely designing the structure. Since this embodiment has the structure in which information about the offset of rasters of image data is transferred from the recording apparatus to the host computer, the foregoing problem can be prevented.

Figure 10:
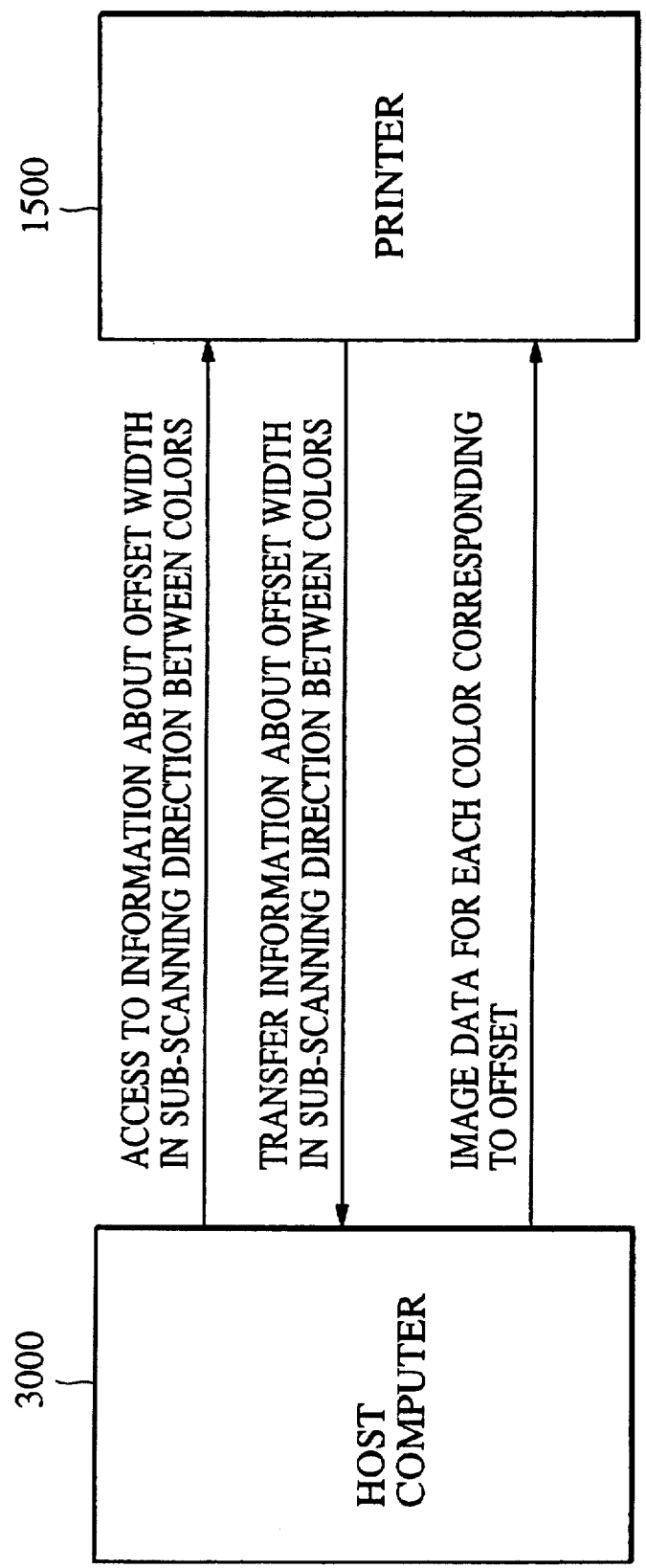
FIG. 10 is a diagram showing data transference according to a second embodiment of the present invention performed such that data to be recorded is offset for each color.

FIG. 10 is a diagram showing transmission/receipt of information about the transference. A host computer 3000, which is the external apparatus according to this embodiment, transmits, to a recording apparatus 1500, a signal requiring transference of information about the offset width for each color in the sub-scanning direction. In response to the signal, the recording apparatus 1500 transfers information about the offset width for each color in the sub-scanning direction to the host computer 3000. In accordance with the information, the host computer 3000 offsets each color image data in the sub-scanning direction when it transfers the image data.

Figure 11:
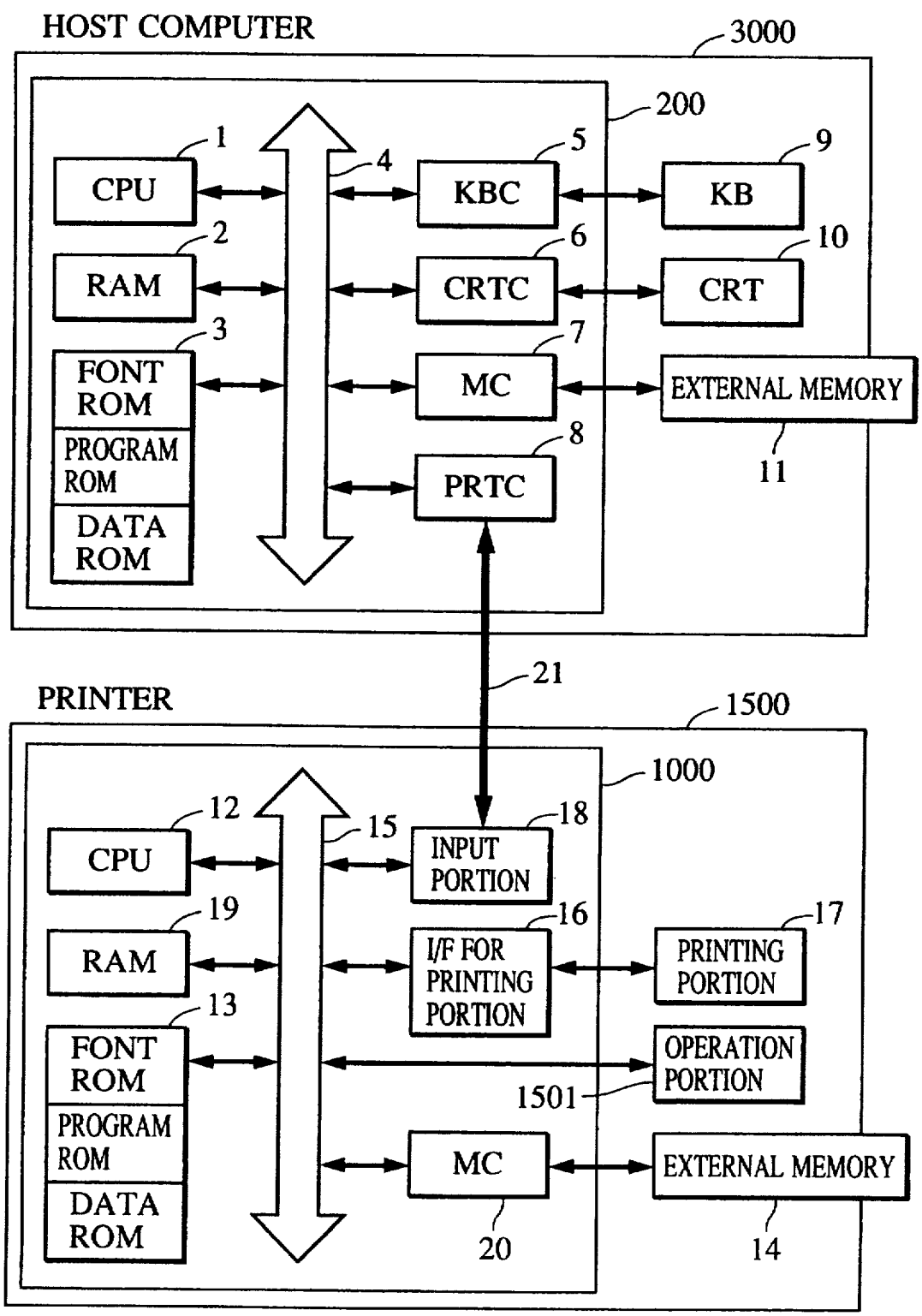
FIG. 11 is a block diagram showing the structures of a host computer and a recording apparatus according to the second embodiment of the present invention.

FIG. 11 is a block diagram showing the structures of the host computer 3000 and the recording apparatus (the printer) 1500. Note that the present invention may be employed to any system comprising one component or a plurality of components or a system for performing the process through a network, such as LAN if the function of the present invention can be performed.

Referring to FIGS. 10 and 11, reference numeral 3000 represents a host computer comprising a CPU 1 for processing a document including graphics, images, characters, tables (spreadsheets included) mixed therein in accordance with a document processing program or the like stored in a program ROM of a ROM 3. The CPU 1 totally controls each of devices connected to a system device 4.

The program ROM of the ROM 3 stores a control program to be executed by the CPU 1, a font ROM of the ROM 3 stores font data for use when the document process is performed, and data ROM of the ROM 3 stores data for use when the document process is performed. Reference numeral 2 represents a RAM to serve as a main memory, a working area and the like for the CPU 1. Reference numeral 5 represents a keyboard controller (KBC) for controlling data input by using keys of a keyboard 9 or a pointing device (not shown). Reference numeral 6 represents a CRT controller (CRTC) for controlling display on a CRT display (CRT) 10. Reference numeral 7 represents a disk controller (DKC) for controlling access to a hard disk (HD) for storing a boot program, a variety of applications, font data, user files, edited files and the like and to an external memory 11, such as a floppy disk (FD). Reference numeral 8 represents a printer controller (PRTC) connected to the printer 1500 through a predetermined bidirectional interface 21 so as to control communication with the printer 1500. Note that the CPU 1 performs a development process (rastering) of outline font to a display information RAM set on, for example, the RAM 2 so as to enable WYSIWYG on the CRT 10. The CPU 1 is able to open a variety of registered windows in accordance with a command issued with a mouse cursor (not shown) on the CRT 10 to perform a variety of data processes.

In the printer 1500, reference numeral 12 represents a printer CPU for totally controlling accesses to a variety of devices connected to a system bus 15 in accordance with a control program stored in a program ROM of a ROM 13 or a control program stored in an external memory 14 to transmit an image signal as output information to a printing portion (a printer engine) connected through a printer interface 16. Furthermore, a program ROM of the ROM 13 stores a control program to be executed by the CPU 12. The font ROM of the ROM 13 stores font data and the like for use when the foregoing output information is produced. A data ROM of the ROM 13 stores information and the like for use in the host computer 3000 if the printer system has no external memory 14, such as a hard disk. The CPU 12 is able to communicate with the host computer 3000 through an input portion 18 so that the CPU 12 is able to transmit information in the printer and the like to the host computer 3000. Reference numeral 19 represents a RAM serving as a main memory, a working area and the like for the CPU 12 and having a structure such that its memory capacity can be enlarged by option RAMs which are connected to extension ports (not shown). Note that the RAM 19 is used to serve as a region in which output information is developed, a region for storing environment data, an NVRAM and the like. The access of the external memory 14, such as the hard disk (HD), an IC card or the like, is controlled by a disk controller (DKC) 20. The external memory 14 is, as an option unit, connected so as to store font data, emulation program, form data and the like. Reference numeral 1501 represents the foregoing control panel having switches, LED display units and the like.

The number of the foregoing external memories is not limited to one, thus permitting a structure to be employed in which a plurality of external memories can be connected, each of which stores an option font card and a program for interpreting printer control languages in different language systems, in addition to the included fonts. An NVRAM (not shown) may be provided to store information about the mode of the printer 1500 supplied from the control panel 1501.

Figure 12:
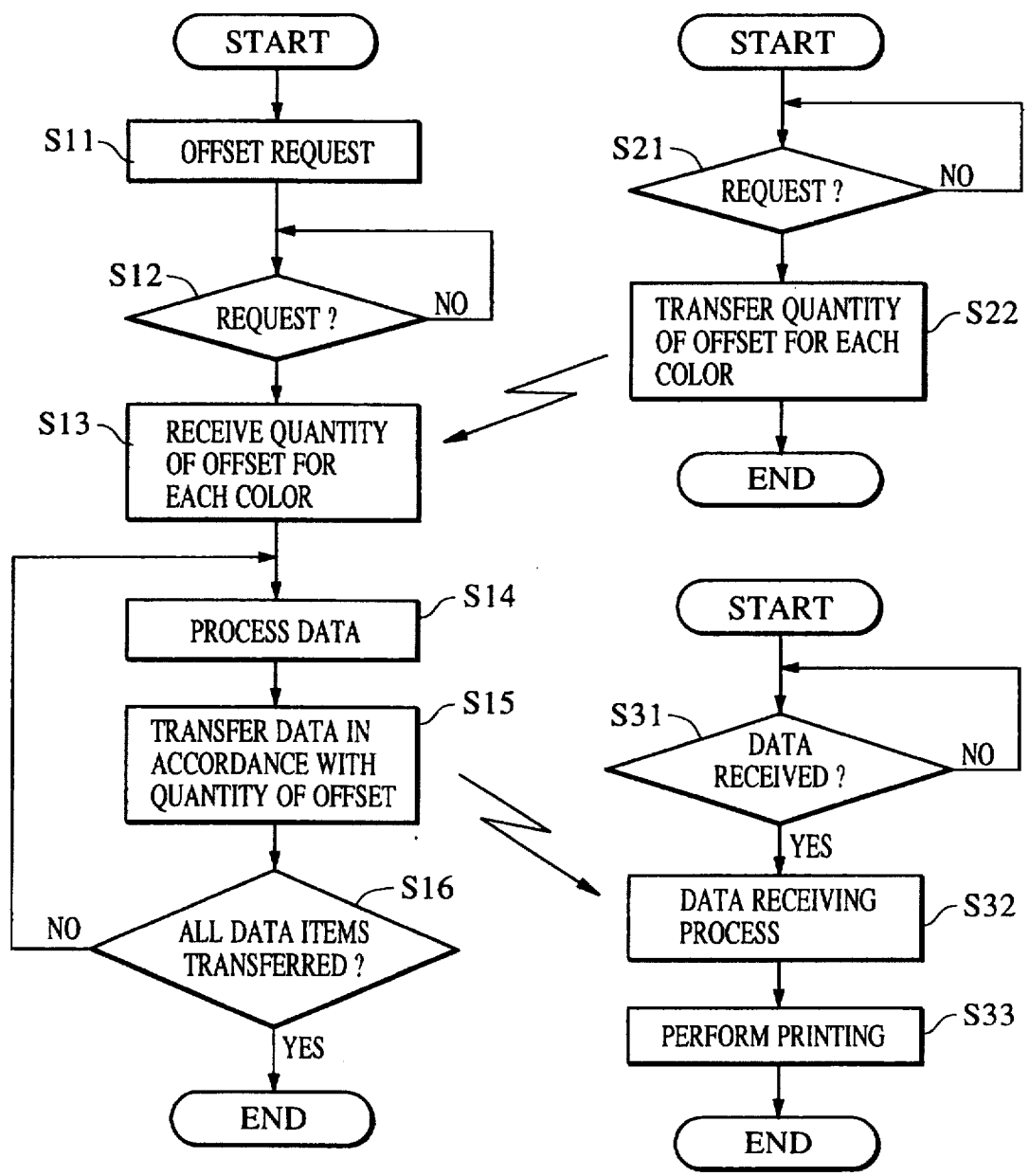
FIG. 12 is a flow chart of the operation according to the second embodiment of the present invention.

A process to be performed by the host computer 3000 will now be described with reference to a flow chart shown in FIG. 12.

In step S11 the printer driver of the host computer 3000 issues a request to the printer 1500 to transfer offset. In step S12 the request is waited for. If a request is confirmed in step S21, the printer 1500 transfers the quantity of offset for each color to the host computer 3000 in step S22. In response to this, the host computer 3000 receives the quantity of offset in step S13. If a predetermined time has passed in step S12, a discrimination is, in this embodiment, performed that the printer 1500 has no bidirectional interface and no offset is set as default setting.

In step S14 data is processed, and in step S15 data processed in accordance with the received quantity of offset (in the case where the printer has a head similar to that according to the foregoing embodiment, the quantity of offset is 32 for magenta, 64 for cyan and 96 for black) is transferred to the recording apparatus. The foregoing process is repeated until all data items are transferred (step S16).

The printer waits for transference of data from the host computer 3000 in step S31. In step S32 the printer processes the received data. When transferred data is stored in the memory in a quantity required to perform one main scanning operation (data for 24 rasters in the case of a head similar to that according to the foregoing embodiment), the printer performs main scanning to record data for one line. Note that the recording operation according to this embodiment starts by recording a black image and the same is completed by recording a black image in accordance with the configuration of offset nozzles.

Although this embodiment has an arrangement that the host computer 3000 transmits, to the recording apparatus 1500, a signal for requiring transference of information about the offset width whenever page break is performed, the signal transference timing is determined in accordance with the type of the recording apparatus. For example, the signal may be transferred whenever the head is changed or the same may be transferred for each line. Thus, the present invention is not limited to the transference timing.

In place of the foregoing structure in which the recording apparatus returns information in response to the signal supplied from the host computer, another structure may be employed in which the recording apparatus spontaneously transfers information to the host computer if necessary.

The information about offset may be obtained in such a manner that a memory or the like is mounted on the recording head and information in the memory is read as the information about offset or the same may be obtained from information about opening/closing of a terminal or the same may be obtained from information about the resistance value between terminals.

Hitherto, the interface between a personal computer and a printer is generally established by the parallel control program of Centronics Interface. Although the Centronics Interface causes signals from a personal computer to a printer through one way, wide use of the bidirectional Centronics Interface causes the communication between the host computer and the recording apparatus to be performed usually in the field of the personal computer. Thus, detailed description about the specification of the bidirectional transference of data is omitted here.

Since the structure, operation and effect of this embodiment are the same as those of the foregoing embodiment except the offset information transfer means for instructing information about offset of the rasters of image information to be transferred from the recording apparatus to the host computer, they are omitted from description.

Third Embodiment

An embodiment of image information will now be described which is employed in a case where the recording elements of the recording head for each color are offset in the main scanning direction as well as in the sub-scanning direction.

All of the recording elements of the recording head are not arranged straight due to limitations involving during the manufacturing process. If the recording elements are offset in the main scanning direction, data to be recorded is usually offset in the main scanning direction by the recording apparatus. Another structure may be employed in which data to be recorded is offset also in the sub-scanning direction when the data is transferred.

Figure 13:
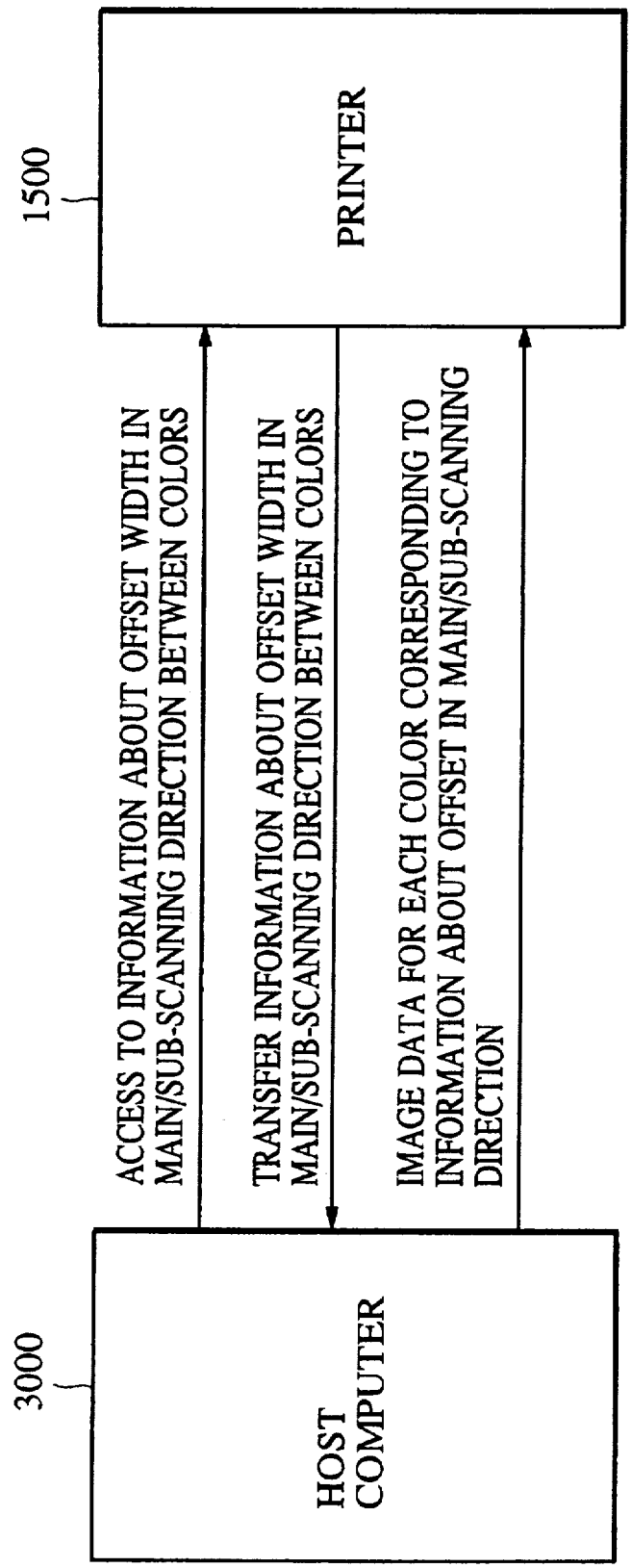
FIG. 13 is a diagram showing data transference according to a third embodiment of the present invention performed such that data to be recorded is offset for each color.

FIG. 13 is a diagram showing a structure for transmitting/receiving information about offset in the main scanning direction and the sub-scanning direction. A host computer 3000, which is an external apparatus according to this embodiment, transmits, to a recording apparatus 1500, a signal for requiring for information about transference of information about offset width between colors in the main scanning direction and information about offset width between colors in the sub-scanning direction. The recording apparatus 1500 transfers, to the host computer 3000, information about offset width between colors in the main scanning direction and the sub-scanning direction. In accordance with the foregoing information, the host computer 3000 offsets image data for each color in the main scanning direction and sub-scanning direction before it transfers the image data.

Although this embodiment has an arrangement that the host computer transmits, to the recording apparatus, a signal for requiring transference of information about the offset width whenever page break is performed, the signal transference timing is determined in accordance with the type of the recording apparatus. For example, the signal may be transferred whenever the head is changed or the same may be transferred for each line. Thus, the present invention is not limited to the transference timing.

Figure 14:
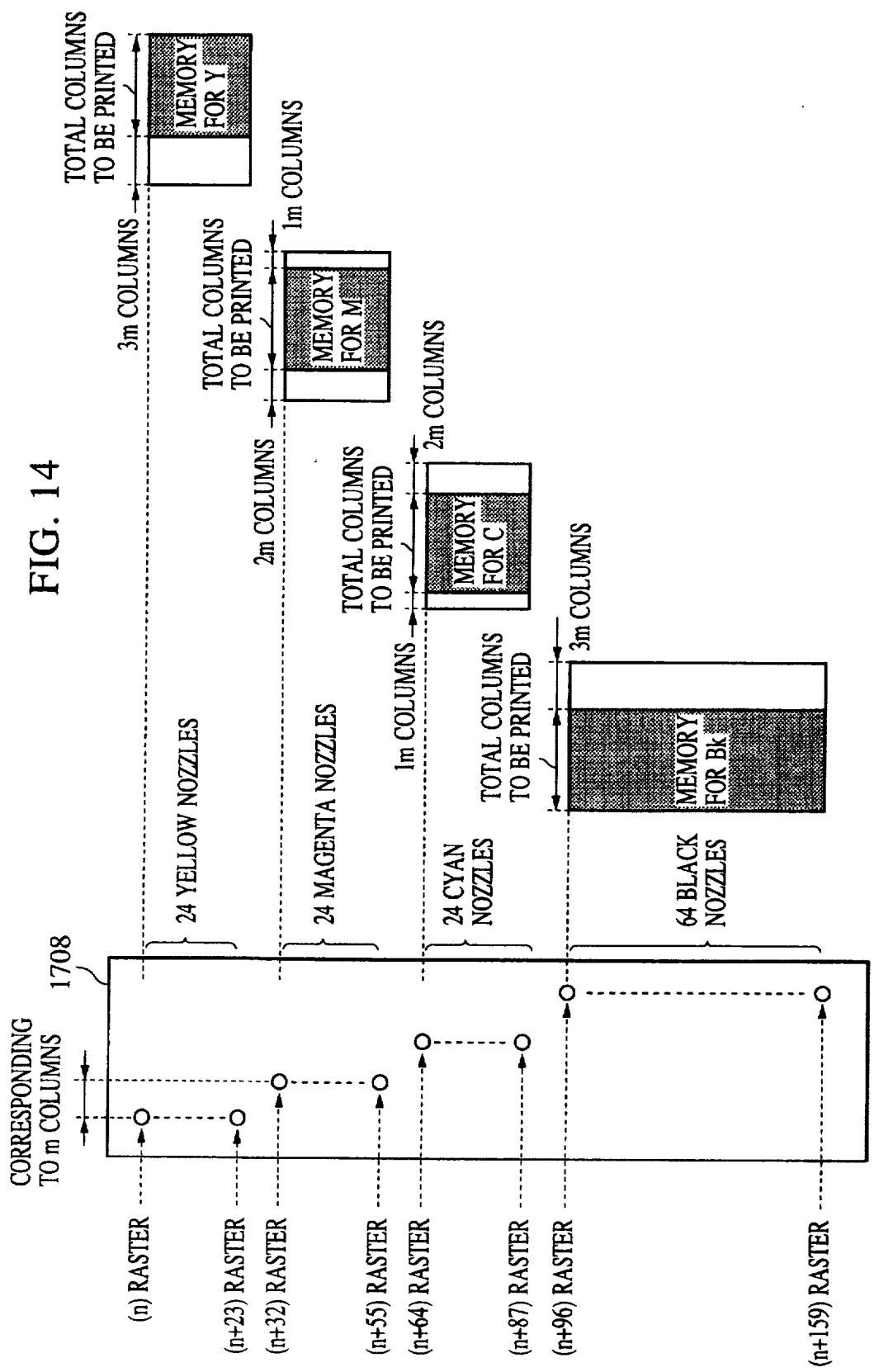
FIG. 14 is a diagram showing the structure of a memory according to a third embodiment of the present invention employed in a case where offset for each color is employed.

FIG. 14 is a diagram showing a state of a memory when data offset in the main scanning direction and sub-scanning direction is transferred. The state of offset for each color of the recording head in the sub-scanning direction is made to be similar to that according to the foregoing embodiment. On the other hand, the offset width in the main scanning direction is, as shown in FIG. 14, an offset of m columns (corresponding to m-resolution dots) is provided between colors.

Assuming that the recording head scans to the right of the drawing sheet, the black recording elements first reach the image to be recorded. When the black recording elements have been brought to the input points, at which image data is input, the yellow, magenta and cyan recording elements are positioned out of the printing area and thus have no corresponding data to be recorded. Therefore, recording information indicating no pixel data is transmitted. As a result, in the case of a cyan image, image data for m columns is transmitted as no recording data before the cyan recording elements reach the recording start point. In the case of a magenta image, image data for 2 m columns is transmitted as no recording data before the magenta recording elements reach the recording start point. In the case of a yellow image, image data for 3 m columns is transmitted as no recording data before the yellow recording elements reach the recording start point.

On the other hand, as for the black image, data to be recorded for 3 m columns is transmitted as no recording data after the black recording elements have passed the recording completion point. As for the cyan image, data to be recorded for 2 m columns is transmitted as no recording data after the cyan recording elements have passed the recording completion point. As for the magenta image, data to be recorded for m columns is transmitted as no recording data after the magenta recording elements have passed the recording completion point. Half dot memories shown in FIG. 14 are memories for data to be printed actually, whereas non-half-dot memories are memories for dummy data.

In the foregoing case, memories for 12 m columns which are not required for program are required. If m is sufficiently small, an effect can be obtained in terms of practical use as compared with a structure in which a specification for performing printing while offsetting data in the printer is added.

Since the structure, operation and effect of this embodiment are the same as those of the foregoing embodiment except the offset information transfer means for instructing information about offset of image information in the sub-scanning direction to be transferred from the recording apparatus to the host computer, they are omitted from description.

According to the first to third embodiments, data offset in a quantity in a predetermined direction is transferred so as to be recorded. Therefore, the storage capacity required for the storage means of a recording apparatus can be reduced.

In the case where the vertical-configuration head having recording elements arranged in the sub-scanning direction is used, the color superimposing order is not changed during the bidirectional printing operation. Thus, the time required to record pixels on or adjacent to the previous pixels can significantly be shortened.

Fourth Embodiment

This embodiment a structure including a color recording mode (data including color images and black images exist in a mixed manner) in which black nozzles for use are shifted in page units to uniformly use the black nozzles so as to prevent irregular densities of recorded images. Similar structures to those according to the first embodiment are omitted from description.

The recording head according to this embodiment has 24 yellow, magenta and cyan nozzles and 64 black nozzles. Furthermore, a gap corresponding to 8 nozzles are formed between colors, and the foregoing nozzles are disposed vertically in the foregoing sequential order.

The capacity of the print buffer for storing data to be recorded for each of yellow, magenta and cyan is 69,120 (24×2,880) bits, whereas that for black is 184,320 (64×2,880) bits.

Figure 15:
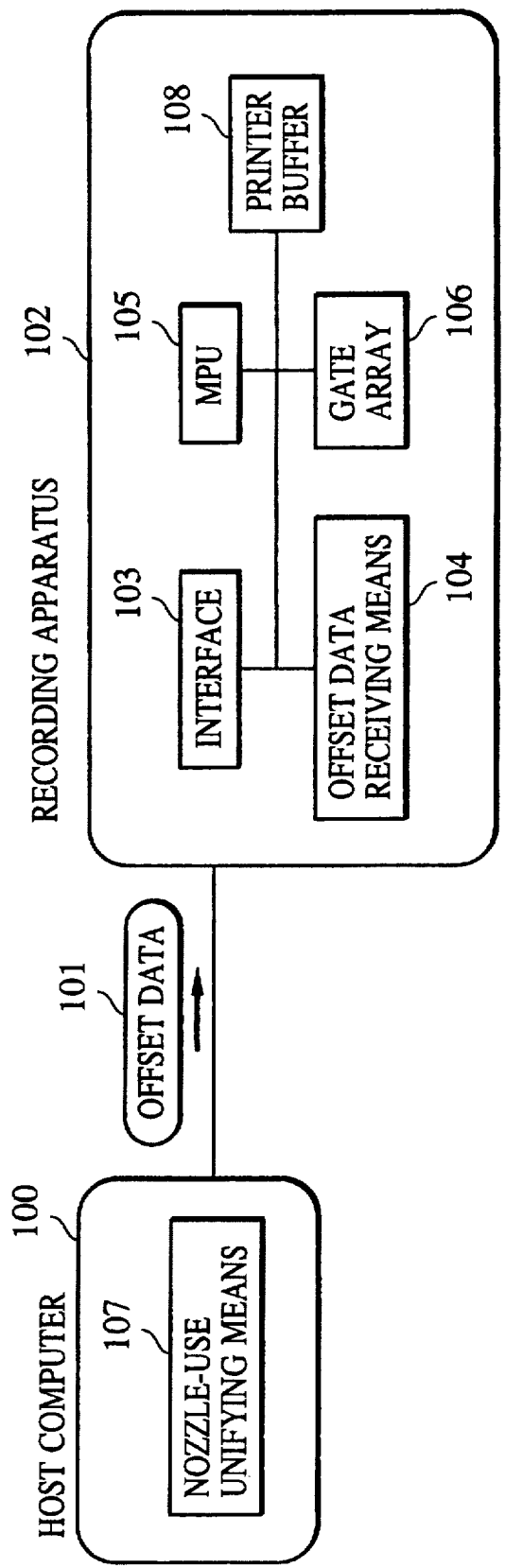
FIG. 15 is a diagram showing the structure of a recording system according to a fourth embodiment of the present invention.

FIG. 15 is a block diagram showing a recording system according to this embodiment. FIGS. 16A to 16D show the structures of memories of the recording apparatus and developed data for each color.

The recording system according to this embodiment comprises a nozzle-use uniforming means 107 for offsetting, in a predetermined quantity, an image for each page processed by a host computer 100 to produce data to be transferred in order to prevent the same black nozzles being always used, an offset data receiving means 104 for, through an interface 103, receiving offset data 101 for each color from the host computer 100, an MPU 105 for converting received offset data 101 into output data to be printed, a gate array 106 and a print buffer 108 for storing the output data.

The host computer 100 causes the nozzle-use uniforming means 107 to produce data to be transferred in such a manner that the quantity of offset corresponding to the state of use and the structure of the recording head is considered, the host computer 100 then transferring offset data to the recording apparatus. The nozzle-use uniforming means 107 is generally realized by the printer driver 303 shown in FIG. 8.

In a case where a black image is printed by 24 nozzles farthest from the cyan nozzles (see FIG. 16A), the quantity of offset of data for black and cyan images is 64+8=72 rasters, the quantity of offset of data for black and magenta images is 64+8+24+8=104 rasters and the quantity of offset of data for black and yellow images is 64+8+24+8+ 24+8= 136 rasters. Therefore, the host computer 100 offsets data for each color in a quantity of the foregoing rasters before it transfers the data. The quantity of transference in one operation may be a quantity for each raster.

Figures 16A, 16B, 16C, 16D, 16E, 16F:
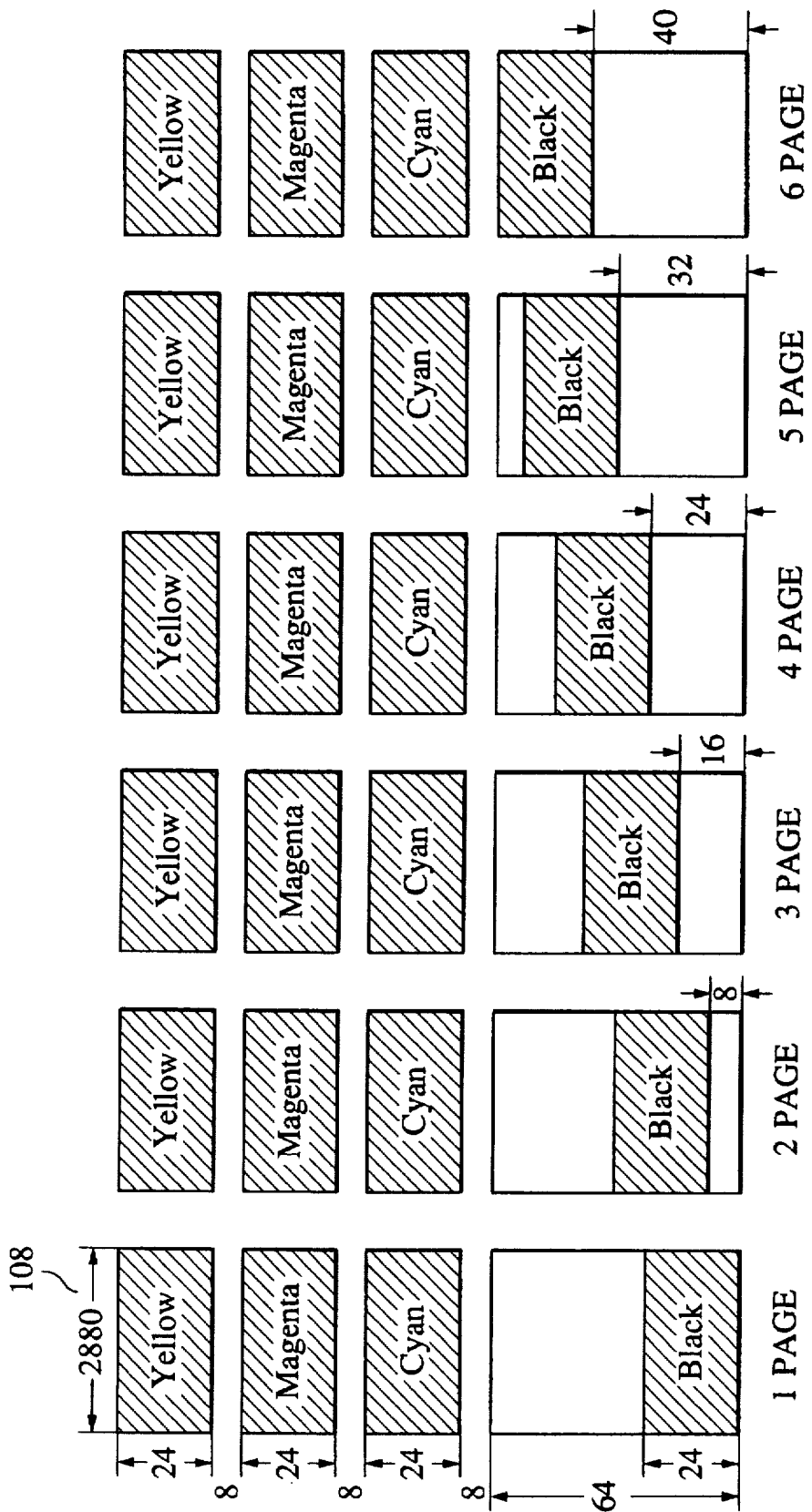
FIGS. 16(A–F) are diagrams showing a state of use of memories of a recording apparatus according to the fourth embodiment of the present invention.

The transferred data to be recorded for one line is developed in the print buffer 108. As a result, data to be recorded exists for 24 lower nozzles of 64 rasters corresponding to the black nozzles, whereas null data exists for 40 upper nozzles as shown in FIG. 16A. Therefore, during an operation of recording data for one page, the 24 lower nozzles are used to record data.

After one page has been recorded, the host computer 100 writes the number of pages to be printed by the recording apparatus in an external memory or the like. In a case where a command of recording data by the same recording apparatus has been issued, the number of pages stored in the external memory is read to determine the quantity of offset for data to be recorded this time.

If the number of read pages is 1 for example, data for the second sheet to be recorded this time is transferred in such a manner that the quantity of offset for black data is 8 rasters, that for cyan data is (64−8)+8=64 rasters, that for magenta data is (64−8)+8+24+8=96 rasters and that for yellow data is (64−8)+8+24+8+24+8= 128 rasters. The transferred data to be recorded for one line is, as shown in FIG. 16B, developed in the print buffer.

Since data for black image for 8 lower rasters and 32 upper rasters are developed as null data in the print buffer, the page, which is being recorded at present, is always recorded by 24 nozzles corresponding to data indicated by hatched lines and apart by 8 lower nozzles.

By repeating the foregoing operation, all of 64 nozzles are used when 6 sheets have been printed. After 6 sheets have been printed, zero is written in the external memory and the foregoing operation is repeated. Thus, the frequency of use of the black nozzles is uniformed.

As a matter of course, the black nozzles may be switched except the page break timing, but the same may be switched at a timing at which a predetermined quantity of null rasters exists or a timing after a predetermined number of sheets have been printed. The quantity of shifting of the black nozzles to be used is not limited to 8 nozzle units.

Figure 17:
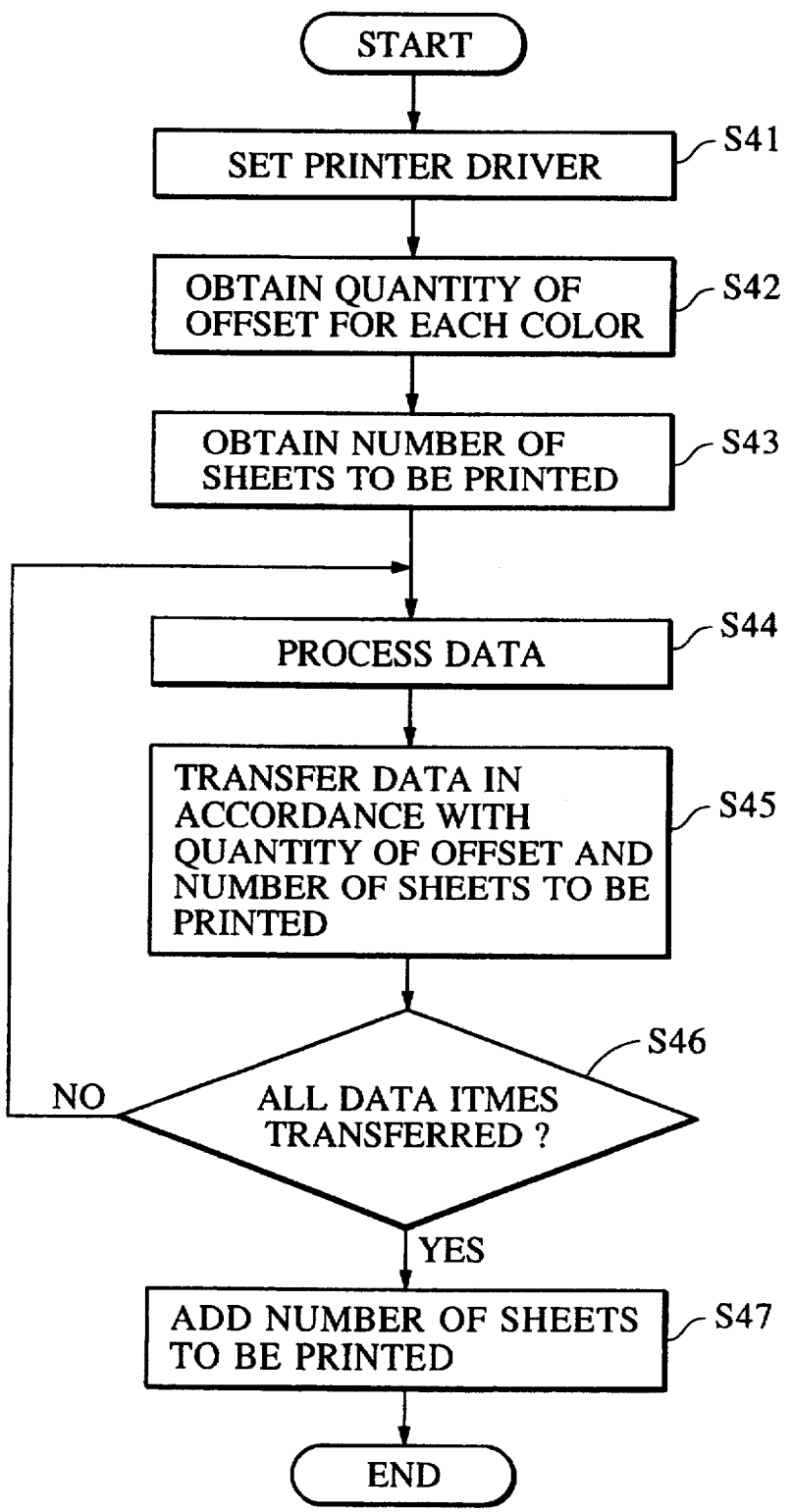
FIG. 17 is a flow chart of the operation according to the fourth embodiment of the present invention.

A process to be performed by the host computer 100 will now be described with reference to a flow chart shown in FIG. 17.

In step S41 the printer drive is set, and in step S42 the quantity of offset for each color of the recording head mounted on the recording apparatus is obtained. In this embodiment, the quantity of offset for cyan is 72, that for magenta is 104 and that for yellow is 136 with reference to black. In step S43 the number of sheets to be printed is obtained. In step S44 data is processed, and in step S45 data processed in accordance with the obtained quantity of offset and the number of sheets to be printed is transferred to the recording apparatus. The foregoing process is repeated (step S46) until transference of data for one sheet is completed. Then, the number of sheets to be printed is added (step S47), and the operation is completed.

When transferred data is stored in the memory in a quantity required to perform one main scanning operation (data for 24 rasters in this embodiment), the printer performs main scanning to record data for one line. Note that the recording operation starts by recording a black image and the same is completed by recording a black image in accordance with the configuration of offset nozzles.

In the recording apparatus 102, offset data 101 supplied from the host computer 100 is received by the offset data receiving means 104 through the interface 103. Then, the received offset data 101 is, by the MPU 105 and the gate array 106, developed into data to be recorded, and then the data to be recorded is stored in the print buffer 108. After data for one line (24 yellow, magenta and cyan rasters and 64 black rasters) has been developed, the recording operation starts. After data for one line has been recorded, paper is fed by a length corresponding to 24 rasters, and the data is sequentially recorded. The recording apparatus 102 does not perform special control, but it receives the offset data 101 supplied from the host computer 100, develops the offset data 101 before it records data, and feeds the paper by a degree corresponding to 24 rasters.

Although a print buffer for 64 rasters are provided for the black nozzles in this embodiment, provision of only a print buffer for 24 nozzles, which are actually used, is permitted. In the foregoing case, a structure may be employed in which the present quantity of offset is transferred from the host computer 100, the offset data receiving means 104 in the recording apparatus 102 recognizes this, data in the print buffer and black nozzles to be used are correlated to offset the data supplied from the print buffer to the recording head so as to be supplied to correspond to predetermined nozzles.

As described above, black nozzles to be used are uniformed so that a high quality image free from irregular density is recorded and the life of the recording head can be lengthened.

The configuration of the nozzles of the recording head may be arranged in such a manner that the same numbers of the yellow, magenta, cyan and black nozzles are disposed. For example, a vertical-configuration head may be employed in which 48 yellow, magenta, cyan and black nozzles are disposed. In the case where color mixture is prevented by using all of the 48 nozzles when a multi-pass recording operation is performed and by using only 24 nozzles when a one-pass recording operation is performed, the nozzles for each color to be used are shifted by a predetermined timing when the one-pass recording operation is performed to uniformly use the nozzles.

Fifth Embodiment

A fifth embodiment will now be described in which a color image recording operation is performed by using recording elements consisting of 24 yellow nozzles, 24 magenta nozzles, 24 cyan nozzles and 64 black nozzles with a gap of 8 nozzles between colors, the nozzles being offset in the sub-scanning direction in such a manner that use of the black nozzles is made to be uniform.

In this embodiment, a multi-pass printing operation is performed in which 24 color nozzles and 48 black nozzles are used to record an image by a plurality of passes.

Figure 18:
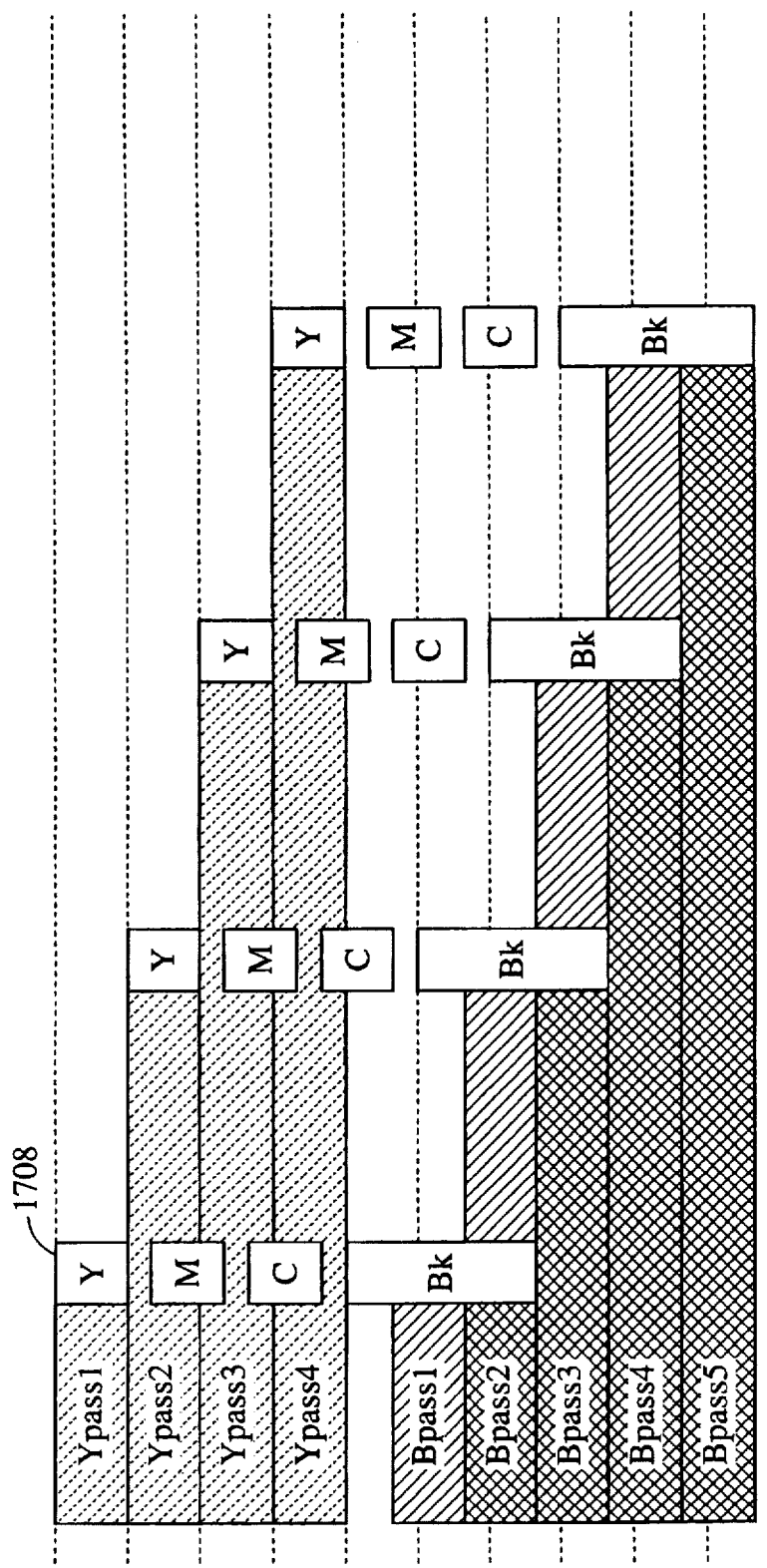
FIG. 18 is schematic view showing a scanning operation for recording and an image forming operation according to a fifth embodiment of the present invention.

The printing operation according to this embodiment will now be described with reference to FIG. 18. Referring to FIG. 18, Ypass1 to Ypass4 indicate raster regions created by scanning with the yellow nozzles, and Bpass1 to Bpass5 indicate raster regions created by scanning with the black nozzles. Ypass1 to Ypass4 are created in such a manner that data in the print buffer is as it is scanned one time. The black image is formed in such a manner that image Bpass2 is formed by first and second scanning operations, image Bpass3 is formed by second and third scanning operations, image Bpass4 is formed by third and fourth scanning operations, and image Bpass5 is formed by fourth and fifth scanning operations.

The method of use of data in the print buffer for performing the foregoing control of program will now be described with reference to FIG. 19.

Figure 19:
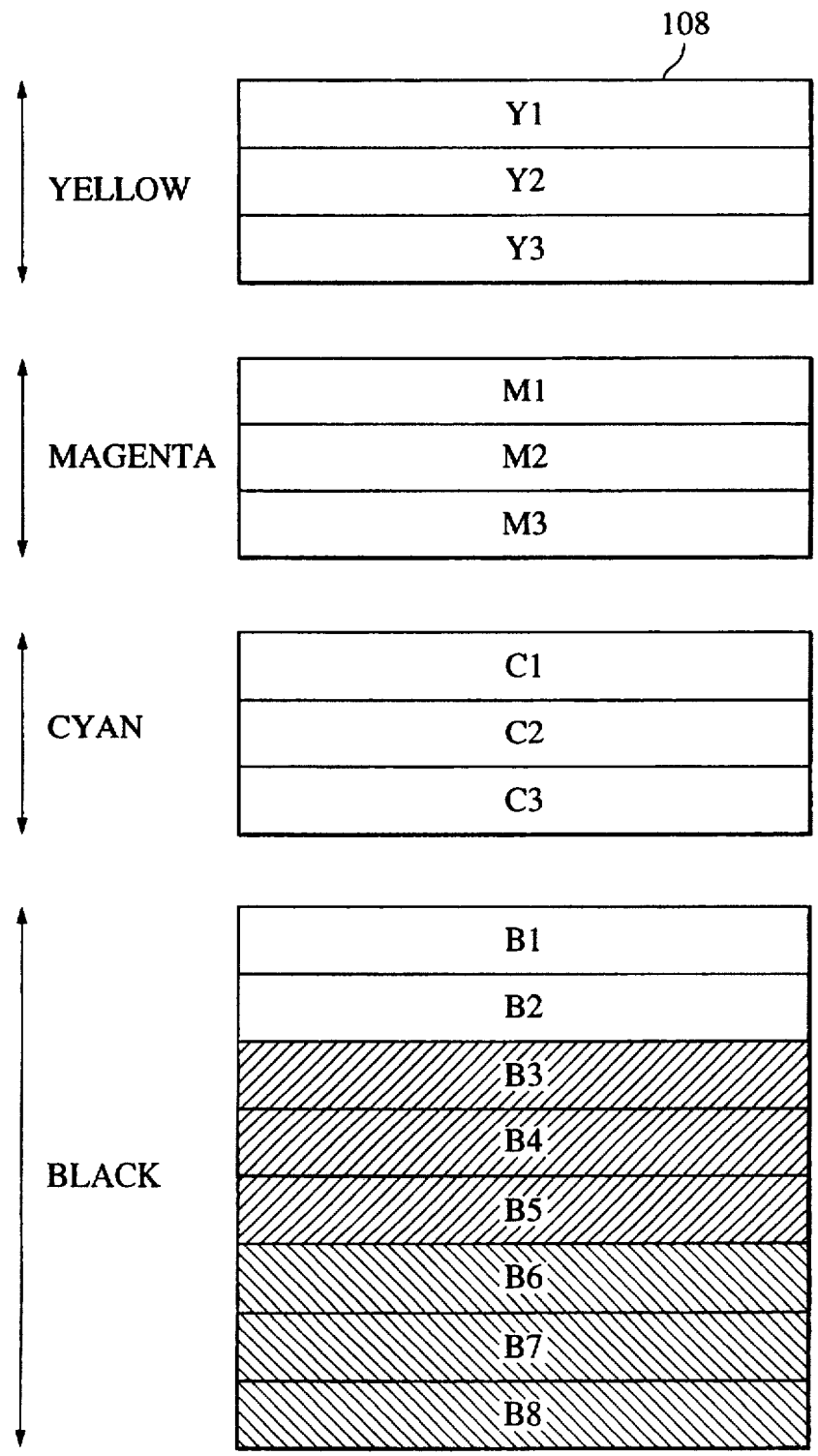
FIG. 19 is a schematic view showing the structure of a print buffer according to the fifth embodiment of the present invention.

FIG. 19 is a diagram showing a recording buffer 108 having a storage capacity of 24 yellow rasters, 24 magenta rasters, 24 cyan rasters and 64 black rasters. Referring to FIG. 19, the buffer for each color is formed in 8 raster units for convenience.

In each of the print buffers for yellow, magenta and cyan, offset image data for each color to be recorded is, at each scanning operation for recording, developed in Y1 to Y3, M1 to M3 and C1 to C3 each having a storage capacity of 24 rasters.

In the print buffer for a black image, data for only 24 rasters on the print buffer is shifted at each scanning operation for recording. That is, data stored in the print buffers B1 to B3 is deleted, data stored in the print buffer B4 is stored in the print buffer B1, that in print buffer B5 is stored in the print buffer B2, that in print buffer B6 is stored in the print buffer B3, that in print buffer B7 is stored in the print buffer B4, and that in print buffer B8 is stored in the print buffer B5. Then, offset black image data to be recorded is developed in print buffers B6 to B8, each of which is a printer buffer region having a storage capacity of 24 rasters.

Then, raster data stored in the foregoing print buffers is recorded by using the recording head. The 24 yellow, magenta and cyan nozzles, which are recording elements, as it is use raster data in the print buffers Y1 to Y3, M1 to M3 and C1 to C3 to record images. A black image is recorded by using raster data in the print buffers B3 to B8 and by operating the recording elements n113 to n160 shown in FIG. 1. At this time, a specific mask pattern 1 is used for each of the print buffers B3 to B5 to thin pixel data, the thinned data being used to operate drive elements for the recording elements n113 to n136. Furthermore, a mask pattern 2 for complementing the specific mask pattern 1 is used for each of the print buffers B6 to B8 to operate drive elements of the recording elements n137 to n160. The mask pattern 1 and the mask pattern 2 may be any patters if they can complement each other.

FIG. 20 is a diagram showing typical mask patterns. If a mask pattern shown in FIG. 20A is employed as the mask pattern 1, a mask pattern shown in FIG. 20B is employed as the mask pattern 2. If a mask pattern shown in FIG. 20C is employed as the mask pattern 1, a mask pattern shown in FIG. 20D is employed as the mask pattern 2. If a mask pattern shown in FIG. 20E is employed as the mask pattern 1, a mask pattern shown in FIG. 20F is employed as the mask pattern 2.

By using the foregoing mask patterns, an image to be recorded is formed by using the recording elements n113 to n160.

By employing the method of using data in the print buffers and the method of using the recording elements, recording of a black image, which has been performed by using 24 nozzles, can be performed by 48 nozzles. Thus, non-uniform deterioration in the recording elements can be prevented. Since the same rasters for an image to be recorded are created by a plurality of recording elements, non-uniform characteristics of recorded images occurring due to the image characteristic of each of the recording elements can be prevented.

Sixth Embodiment

In the case of the fifth embodiment in which specifics masks are used to an image to be recorded to uniform the state of use of the nozzles, there arises a problem in that the mask patterns and the image to be recorded synchronize with each other.

Figure 20A:
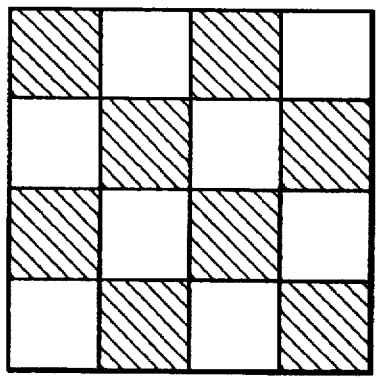
FIGS. 20(A–F) are diagrams showing typical mask patterns to which reference is performed in the fifth embodiment of the present invention.
Figure 20B:
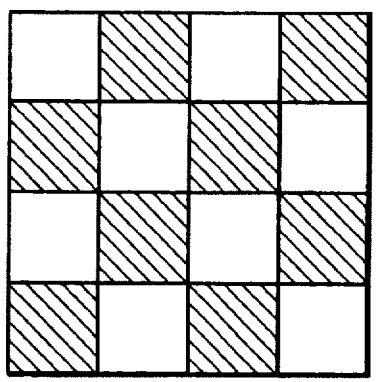
Figure 21A:
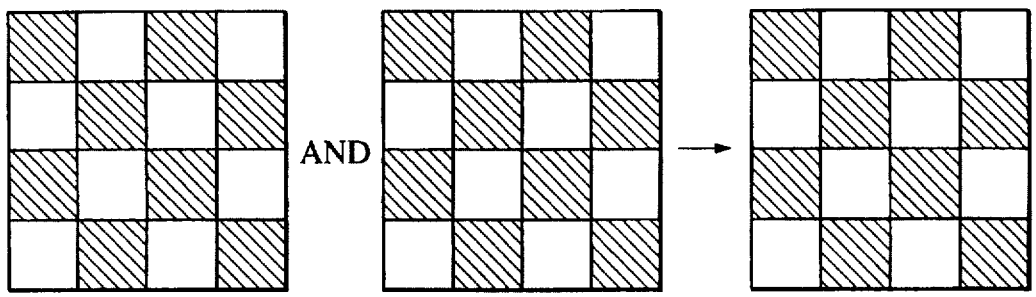
FIGS. 21(A–D) are diagrams showing synchronization with an image to be recorded in a case where mask patterns are used.
Figure 21B:
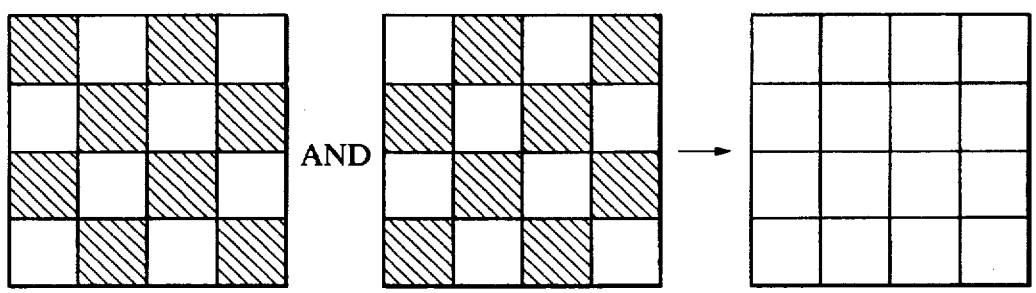

If a mask shown in FIG. 20A is, as shown in FIG. 21A, employed as a mask pattern 1 with respect to an image pattern, which is the same as that shown in FIG. 20A, the results of a recording operation using recording elements n113 to n136 is the same as that shown in FIG. 20A. If a mask pattern shown in FIG. 20B is employed as the mask pattern 2, a recording operation using the recording elements n137 to n160 is not performed. That is, the recording elements n113 to n136 are used in all operations for recording the images, whereas the recording elements n137 to n160 are not used.

Figure 20C:
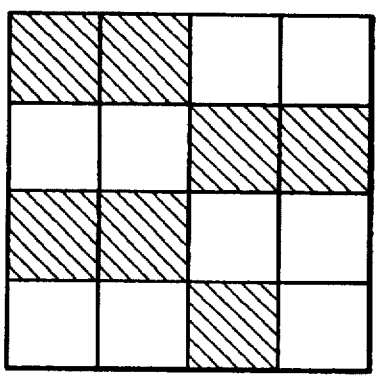
Figure 20D:
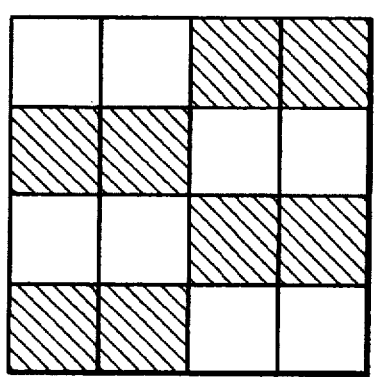
Figure 20E:
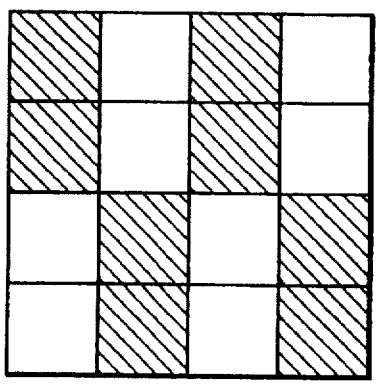
Figure 20F:
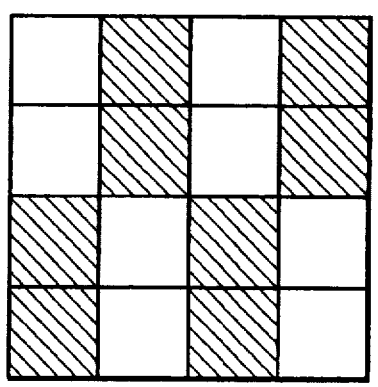
Figure 21C:
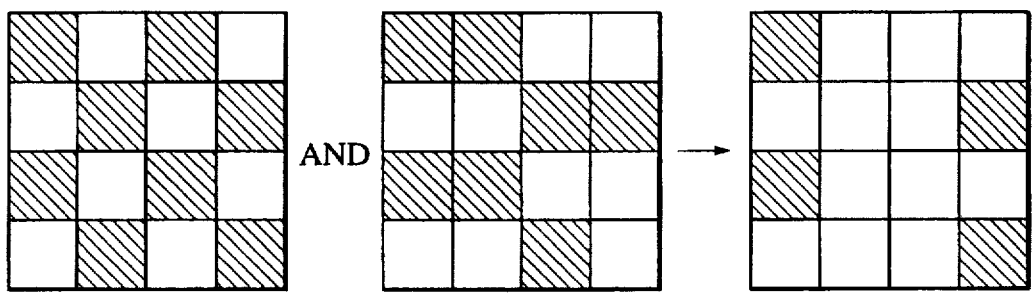
Figure 21D:
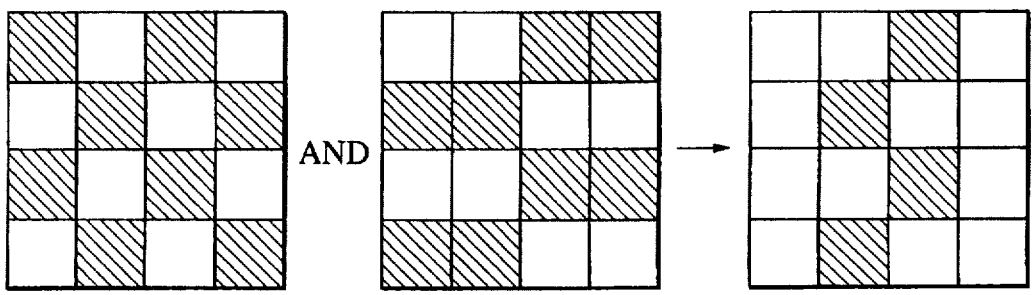

Similarly, if a mask pattern shown in FIG. 20C is used as the mask pattern 1 for the image pattern shown in FIG. 20A, the recording operation using the recording elements n113 to n136 results in as shown in FIG. 21C. If a mask pattern shown in FIG. 20D is used as the mask pattern 2, the recording operation using the recording elements n137 to n160 results in as shown in FIG. 21F. In the foregoing case, the recording is performed in a different manner from that in the case where the mask patterns shown in FIGS. 20A and 20B such that the recording elements to be used are divided into the recording elements n113 to n136 and those n137 to n160. That is, if the image pattern is as shown in FIG. 20A, it is preferable that the mask patterns shown in FIGS. 20C and 20D be used.

However, there arises a difficulty for the recording apparatus to discriminate the synchronization between the image pattern and the mask patterns.

Accordingly, there is provided a recording system having a structure in which the image to be recorded is masked by the portion for transferring the image to be recorded and the masked image is transferred to the recording apparatus.

In this embodiment, all of the print buffers Y1 to Y3, M1 to M3, C1 to C3 and B1 to B8 are updated by received image data to be recorded whenever the recording scanning operation is performed. All of the recording elements n1 to n160 are operated to correspond to image data developed in the print buffers at each recording scanning operation. Furthermore, the quantity of conveyance of the recording medium between the scanning operations is determined in accordance with data transferred from the portion for transferring the image data.

Figure 22:
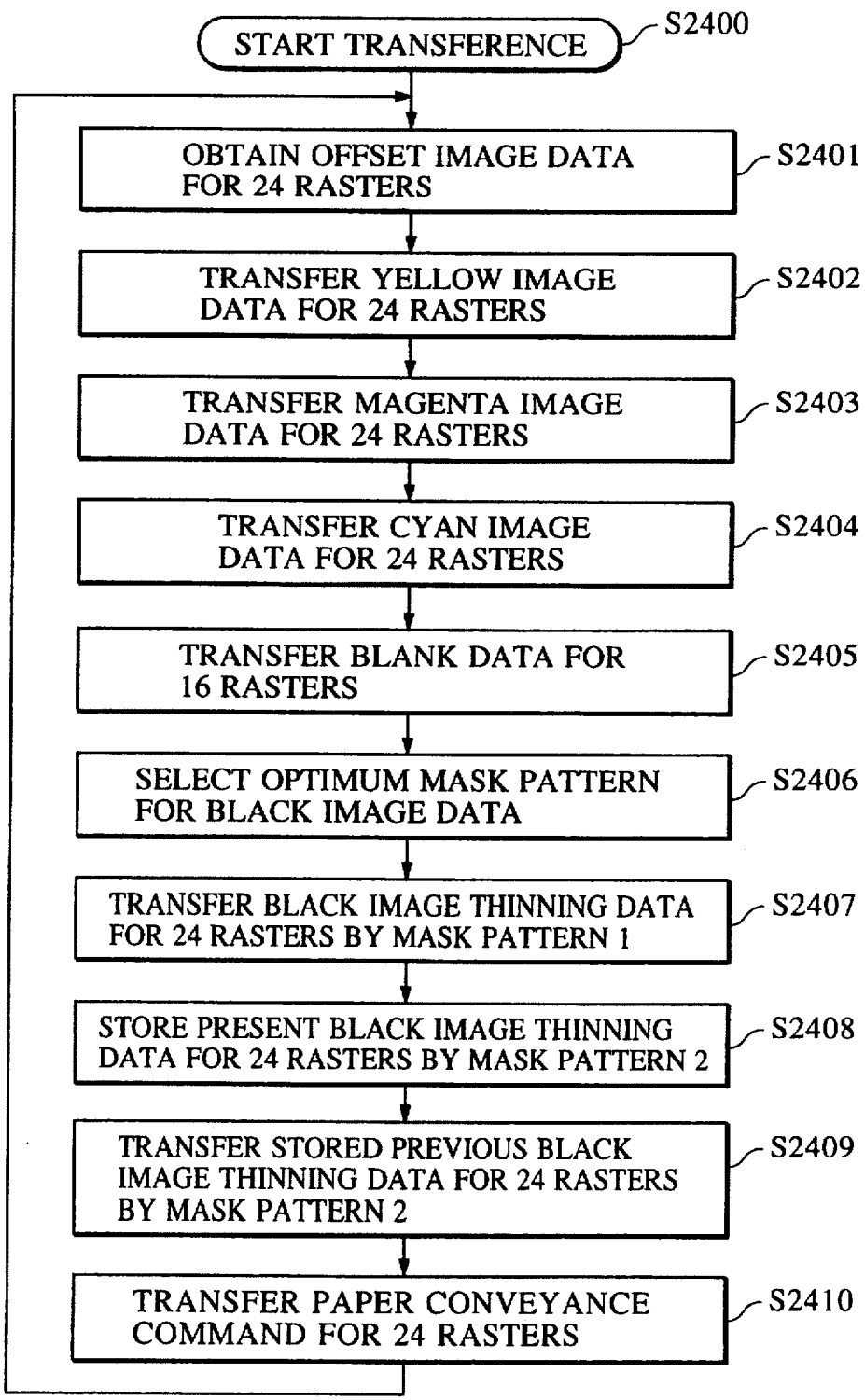
FIG. 22 is a flow chart of a process for transferring offset data according to a sixth embodiment of the present invention.

A process for transferring image data according to this embodiment to be performed by the portion for transferring the image to be recorded will now be described with reference to FIG. 22.

In step S2401 offset image data for each color to be recorded for 24 rasters is obtained. Then, all of yellow image data items for 24 rasters are transferred in step S2402. In step S2403 all of magenta image data items for 24 rasters are transferred in step S2403. In step S2404 all of cyan image data items for 24 rasters are transferred. In step S2405 blank data for 16 rasters is transferred.

Then, appropriate mask patterns 1 and 2 are selected in accordance with the image data in step S2406. In step S2407 image data obtained by thinning image data for 24 rasters obtained in step S2401 with the mask pattern 1 is transferred. In step S2408 image data obtained by thinning image data for 24 rasters obtained in step S2401 with the mask pattern 2 is stored.

In step S2409 all of image data items for 24 rasters stored in the previous routine process and thinned by the mask pattern 2 are transferred. At a first operation during the routine process above, blank data for 24 rasters is transferred in step S2409. In step S2410 a command to move the recording medium for a length corresponding to the 24 rasters is transferred.

According to the present invention, the portion for transferring image to be recorded is able to discriminate the degree of synchronization between data to be recorded and the mask patterns when the image to be recorded is obtained. As a result, an image can be recorded by optimum plural scanning operations (multi-pass printing operations) without a load on the recording apparatus.

The recording apparatus as it is develops the transmitted image in the print buffers, operates the recording elements in accordance with the data in the print buffers, and transfers the received information about the quantity of conveyance of the recording medium between the recording scanning operations. As a result, the recording apparatus is able to simply perform discriminations required when the printing operation is performed.

According to the fourth to sixth embodiments, the memory of the recording apparatus having the vertical-configuration recording head can be saved and the frequency of use of the recording elements can be uniformed. Furthermore, the quality of an image recorded by the recording elements can be improved.

Seventh Embodiment

By performing the offset transfers according to the first embodiment, the efficiency in using the memories can significantly be improved. However, the unresolved problem of bleeding of ink occurring in the image boundary portion between different color regions remains. Accordingly, it might be considered feasible to employ a method in which the content of a surface active agent in the solvent for ink is raised to improve the degree of penetration into the recording medium so as to prevent bleeding of ink in the boundary portion.

Also in the foregoing case, the dye can be introduced deeply into the recording medium, thus generally causing an image suffering from a low contrast to be formed. Although the allowable contrast level is relatively low in the case of a color image and therefore no critical problem arises, the high penetration ink cannot easily be used to form a black image mainly consisting of characters which require high contrast. Although the problem of bleeding can be prevented among the yellow, magenta and cyan images, bleeding among the black image and the color image (yellow, magenta and cyan images) cannot easily be prevented.

This embodiment is directed to prevent bleeding between a color image and a black image. If the offset transference is not performed, the state of boundaries of images can be detected in all of regions to be printed prior to performing the program operation. Therefore, by using the foregoing PCBk conversion method or the like, the foregoing detection can be performed before the program operation is performed.

However, if image data is offset-transferred, all data items cannot be obtained until all color image are recorded and, therefore, the boundary portion cannot be detected before printing. Since the recorded data is deleted, a reference to the previous data cannot be performed when recording using following ink colors is performed. As a result, the boundary portion between the images cannot be detected when an image is being recorded regardless of the color.

Accordingly, this embodiment has a structure that the following control of bleeding prevention is performed so that bleeding in the boundary portion is prevented.

Figure 23:
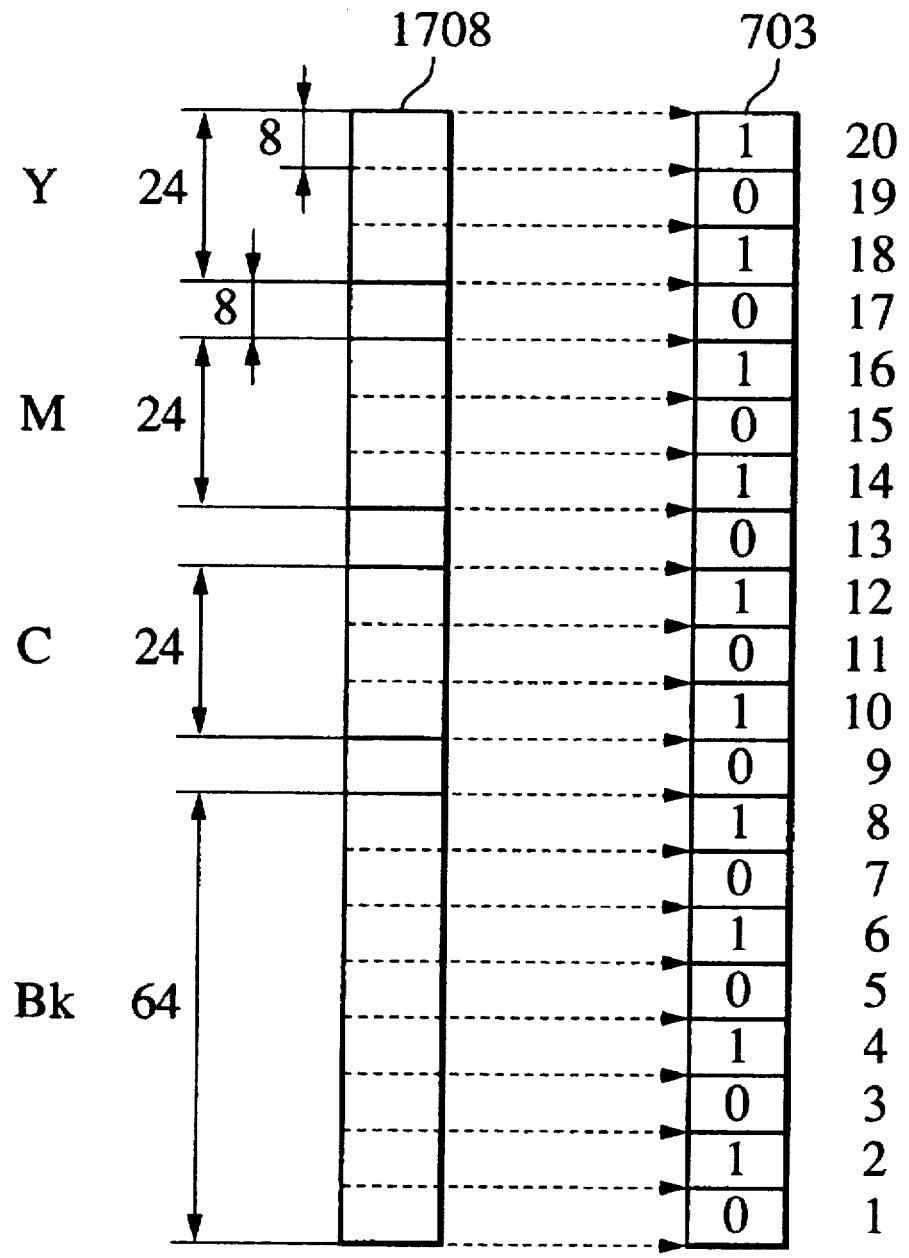
FIG. 23 is a diagram showing the structures of memories according to a seventh embodiment of the present invention.

FIG. 23 is a diagram showing an embodiment of control for preventing bleeding by means of the offset transference. As described with reference to FIG. 1, the recording head 1708 comprises 24 yellow, magenta and cyan nozzles and 64 black nozzles in the foregoing sequential order when viewed from an upper portion. Furthermore, a gap corresponding to 8 nozzles is formed between colors. Assuming that the printing region is divided in 8 raster units, the recording head, as described above, comprising the nozzles disposed to cover the region corresponding to 160 rasters has a printable region for 20 units as shown in FIG. 23.

Then, a 20-bit memory 703 is provided for the DRAM 1703 shown in FIG. 3 to store whether not a black image exists in the 20 unit region in the printable region for the head. If a black image exists in the printable unit region (that is, in the corresponding 8 rasters), 1 is set at a corresponding position in the 20-bit memory 703. If black images have existed in alternate one units (8 rasters) in the 20 printing units, 1 and 0 are alternately stored in the 20-bit memory 703 as shown in FIG. 23.

If no black image exists in next one unit in the program direction, 0 is input to the 20-bit memory 703 as shown in FIG. 24. Referring to FIG. 24A, the conventional contents (data indicating whether or not a black pixel exists) for 20 bits are rotated upwards so that 0, which is the present data, is input from a lower portion, thus resulting in a state shown in FIG. 24B to be realized. By repeating the foregoing process, whether or not a black image to be recorded exists in the 160 rasters for which data is printed by the recording head by one scanning operation can be discriminated in at least 8 raster units.

In this embodiment, the foregoing memory 703 is used to prevent bleeding in the boundary between a color image and a black image. That is, a reference is performed to information whether 1 or 0 is set in the 20-bit memory 703 at a position corresponding to the recording area in which the recording operation is performed by the yellow, magenta and cyan nozzles so as to detect a black image has been recorded in the corresponding recording area. If yellow, magenta or cyan image is printed in the area, in which the black image has been recorded, waiting for 2 seconds is performed.

To prevent bleeding in the boundary portion, a satisfactory result can be obtained by lengthening the waiting time. However, the too long waiting time encounters generation of cockling (wrinkles of paper), thus causing a problem to arise in the image to be recorded in the following operation. In general, it is preferable that the waiting time be 5 seconds or shorter, and it is determined to be 2 seconds in this embodiment.

Figure 25:
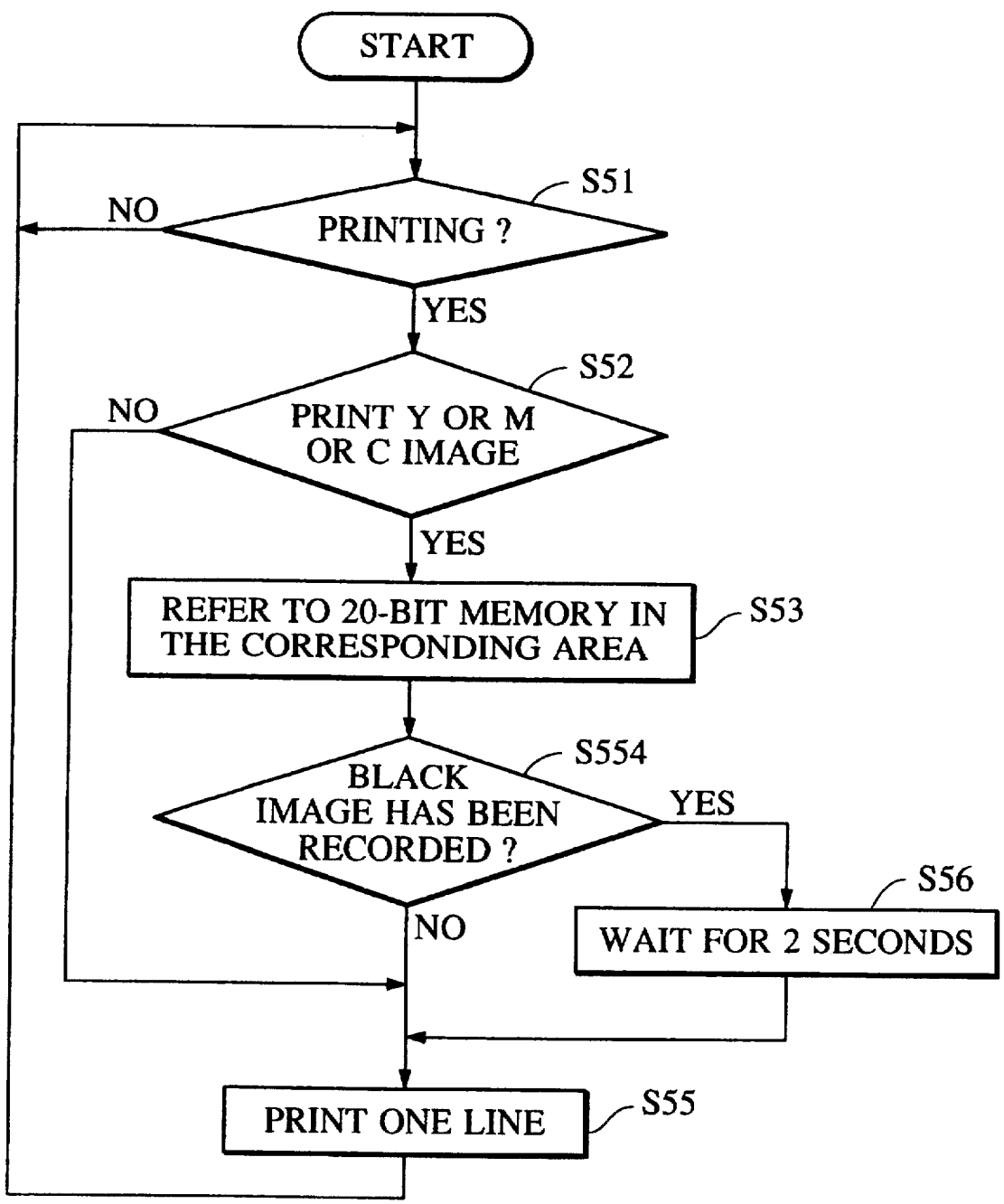
FIG. 25 is a flow chart showing a control method according to the seventh embodiment of the present invention.

FIG. 25 is a flow chart of an operation for discriminating whether or not the wait printing operation is performed. If a command of printing is received in step S51, whether or not data to be printed exists on the lines to be printed in yellow, magenta and cyan is discriminated in step S52. If data to be printed exists, a reference to the bits of the corresponding 20-bit memory 703 is performed in step S53 to discriminate, in step S54, whether or not a black image has been printed in the area, in which a yellow, magenta or cyan image is printed. If no black image has been printed, one line is printed in step S55. If a black image has been printed, waiting for 2 seconds is performed prior to performing the subject scanning operation in step S56.

Since the head 1708 according to this embodiment comprises yellow, magenta, cyan and black nozzles in one unit thereof, all of the printing operations are caused to wait for the lapse of the predetermined time if any of yellow, magenta and cyan images is printed in the same area in which a black image has been printed.

Although the subject areas for the yellow, magenta and cyan images are 3-unit areas each of which is a capacity of 24 rasters in which the yellow, magenta, cyan and black nozzles are disposed, another method may be employed in which one area margin is provided in the forward and rearward portions and the detection is performed in 5 areas. Although 8 rasters are collected into one unit, the present invention is not limited to the 8 rasters.

As described above, according to this embodiment, the vertical-configuration head is used so that the color superimposing order is not changed during the bidirectional printing operation, and the time taken to record different-color pixels in the same region is delayed, so that bleeding can be prevented. Since transference rasters for each color is offset when the vertical-configuration head is used, the memory can be saved.

Since this embodiment has the structure that a memory for storing a fact that a black image has been recorded in the printing unit region in 8-raster units is provided to detect the boundary portion between black image and a yellow, a magenta or a cyan image in accordance with the transferred offset data, the time to print the boundary portion is delayed if there is a possibility that a boundary portion exists. As a result, bleeding in the boundary can be prevented. As a result, an image exhibiting an excellent quality can be recorded at high speed.

Eighth Embodiment

An eighth embodiment will now be described which is another embodiment for preventing bleeding in the boundary portion. In the seventh embodiment, if a boundary portion required to be subjected to the bleeding preventive operation is detected, the recording operation is paused for two seconds, fixation of ink previously discharged is waited, and then recording of the boundary portion with latter ink is performed. In this embodiment, a multi-pass printing operation is performed in place of the structure in which waiting is simply performed in which one line is formed by a plurality of scanning operations to reduce the quantity of ink to be discharged in a unit time so as to prevent bleeding.

Figure 1:
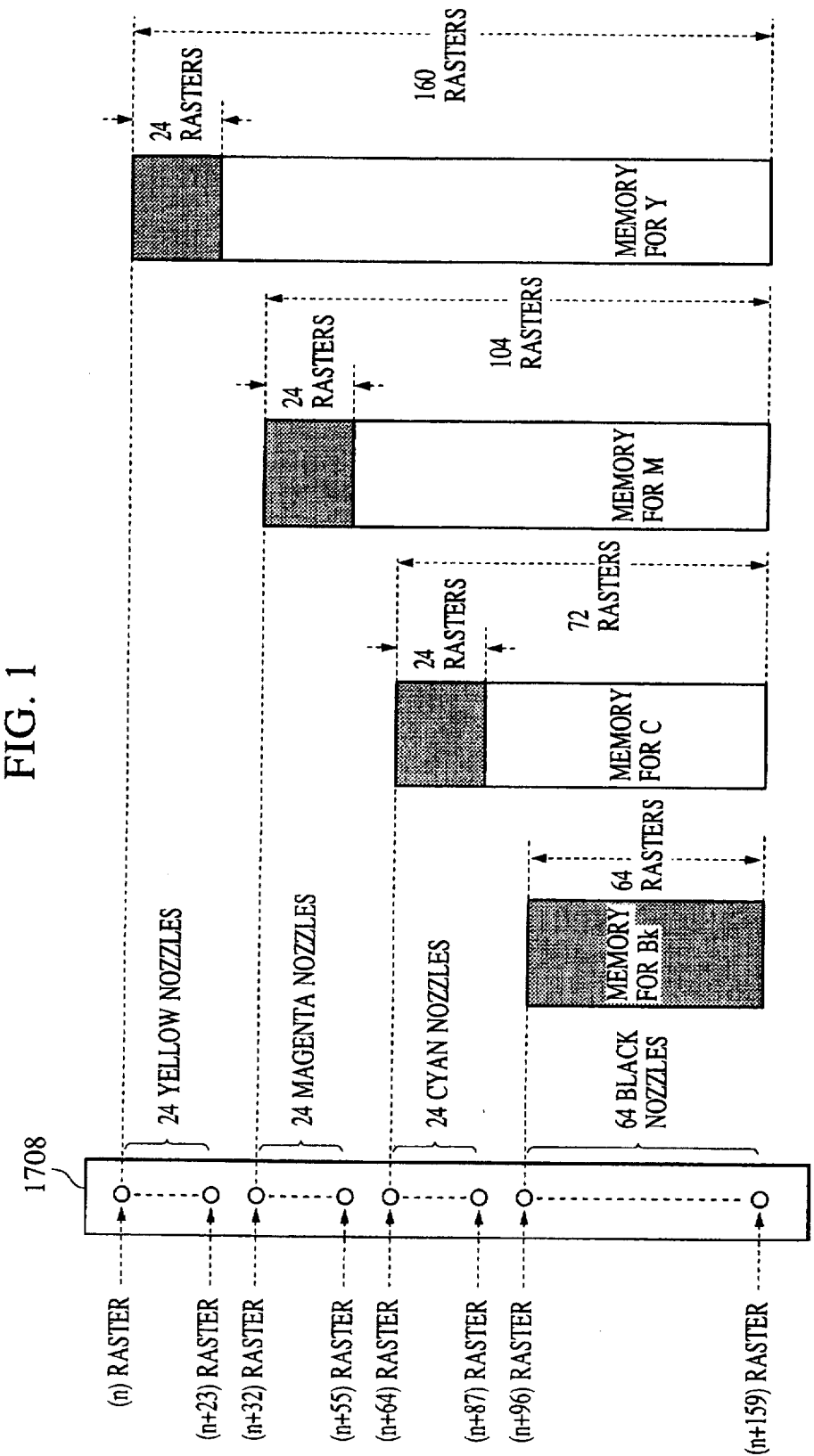
FIG. 1 is a diagram showing the configuration of a conventional recording head and the structure of a memory for storing an image to be recorded.

In this embodiment, the head shown in FIG. 1 is employed and the image region is divided into 8-raster units to administrate whether or not a black image has existed by the 20-bit memory. Although the foregoing embodiment has the structure in which waiting for 2 seconds is performed if a black image has existed in the region in which yellow, magenta or cyan image will be printed, and then the printing operation restarts, this embodiment has the structure for performing the multi-pass printing operation.

Since 24 yellow, magenta and cyan nozzles are provided in this embodiment, the printing mode is changed to a 3-pass printing mode in which all pixels are printed by scanning the 24-nozzle printing areas with masks. Although another structure may be employed in which conveyance of the paper is not performed and the same area is scanned three times, this embodiment employs a 3-pass overlap printing method in which the paper is conveyed by 8 nozzles. The recording method, in which printing is performed by a plurality of passes with providing masks, is a known printing method which is capable of preventing irregularly printed images occurring due to an accuracy error during paper conveyance at each step and that occurring due to an error in the quantity of ink discharged from each nozzle of the recording head.

Although employment of the multi-pass printing method causes the printing time to be elongated as compared with the time taken in the case where one-pass printing is performed, the quality of the image can reliably be improved as compared with a simple waiting method if a boundary portion exists in which there is a risk of bleeding. Since any raster of the usual offset transference method has no region, in which all of yellow, magenta, cyan and black image data items remain, the boundary cannot be discriminated and, therefore, the boundary control cannot be performed.

In this embodiment, a detection means, such as the 20-bit memory 703, is used to detect whether or not a black image has existed so that the possibility of existence of a boundary portion is detected. Thus, bleeding in the boundary portion can be prevented.

Figure 26:
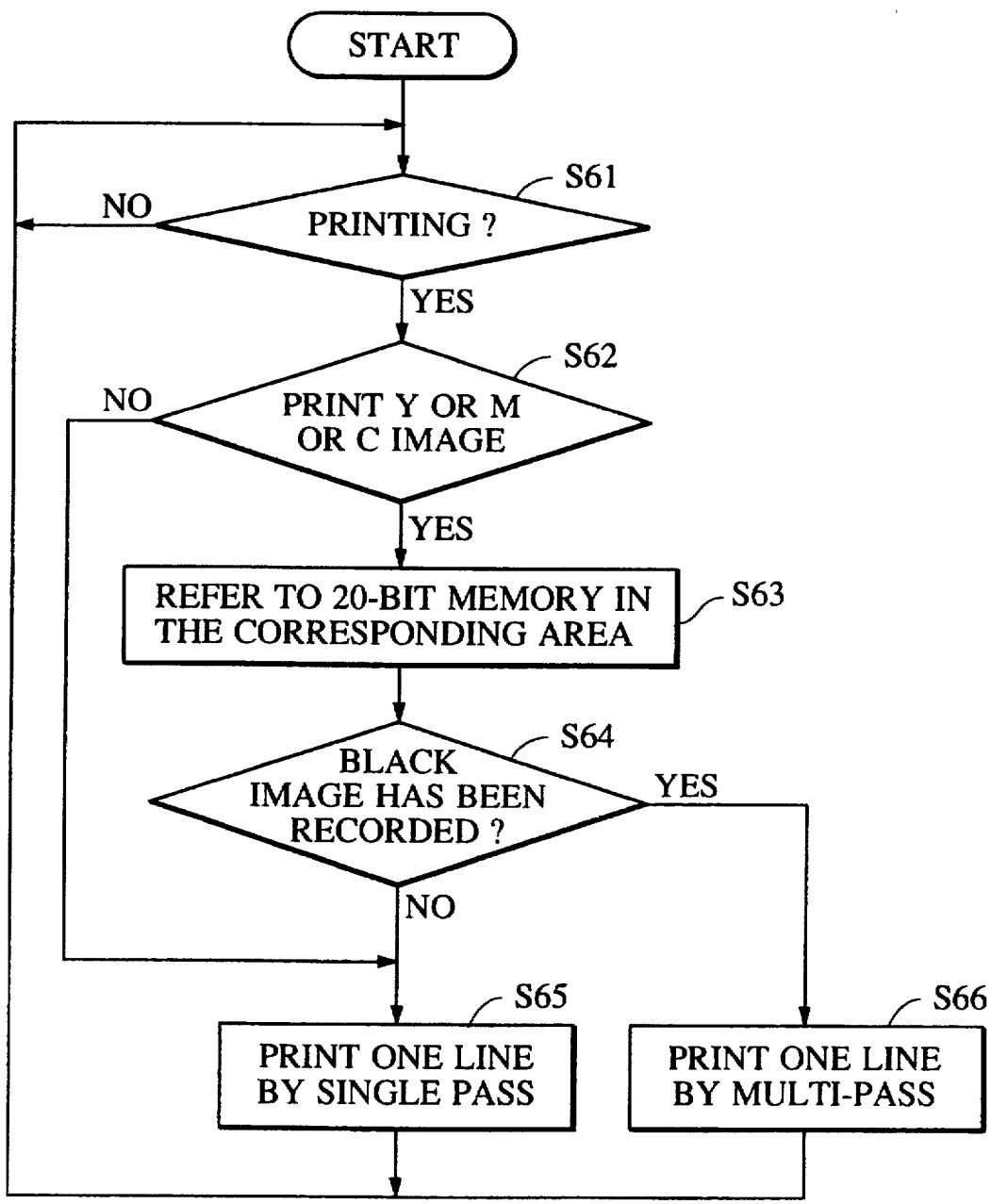
FIG. 26 is a flow chart showing a control method according to an eighth embodiment of the present invention.

FIG. 26 is a flow chart of an operation for discriminating whether or not multi-pass printing is performed. If a command of printing is received in step S61, whether or not data to be printed exists on the yellow, magenta and cyan lines is discriminated in step S62. If data to be printed exists, a reference to the bits of the corresponding 20-bit memory 703 is performed in step S63 to discriminate whether or not a black image has been printed in the yellow, magenta and cyan printing area is discriminated in step S64. If no black image has been printed, one line is printed by one pass (a single pass printing operation) in step S65. If a black image has been printed, the one line is printed by three passes (a multi-pass printing operation) in step S66.

Since the structures, operations and effects are the same as those according to the foregoing embodiments except the bleeding preventive means for detecting the boundary portion between images in which bleeding must be prevented, to perform the multi-pass printing of the detected portion so as to prevent both bleeding and irregularly formed images, they are omitted from detailed description.

Ninth Embodiment

A ninth embodiment will now be described with which the boundary portion between images can be detected more accurately.

In the seventh and eighth embodiments, the 20-bit memory 703 is used to discriminate whether or not a black image has been printed previously in the regions, in which yellow, magenta and cyan images will be printed so as to prevent bleeding. However, the foregoing embodiments have the structure in which whether or not a black image exists in the unit area (a divided area of 8 rasters in the foregoing embodiments) is discriminated and in which the approximation to the yellow, magenta and cyan images is not discriminated in the strict sense. Although the bleeding preventive control is performed reliably if a region in which bleeding is able to take place is printed and therefore a high-quality image can be realized, there is a risk that a region, which is not required to be subjected to the bleeding preventive process can be subjected to the same.

Accordingly, this embodiment has a structure in which a boundary portion, in which bleeding is able to take place, can be detected.

Figure 27:
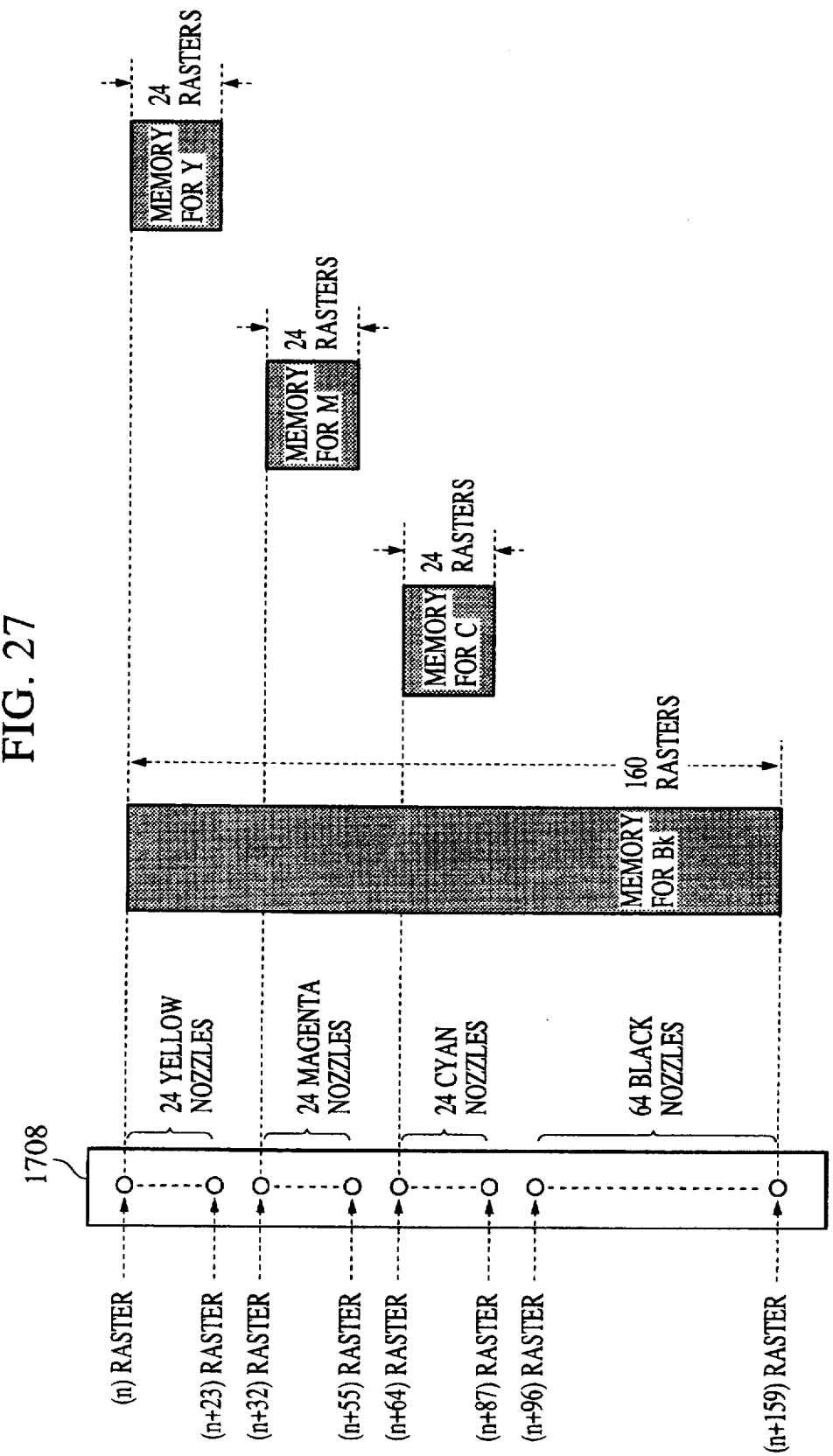
FIG. 27 is a diagram showing the structures of memories according to a ninth embodiment of the present invention.

In this embodiment, a memory for a black image stores data for 160 rasters from (n) raster to (n+159) raster as shown in FIG. 27. Therefore, the total capacity of memories for yellow, magenta, cyan and black images is a capacity corresponding to 232 rasters (160+24x3) in this embodiment, which is considerably larger than the memory capacity corresponding to 136 rasters required when the offset transference described with reference to FIG. 7 is fully employed. However, the memory capacity can be significantly saved as compared with the memory capacity corresponding to 400 rasters required in the case where the offset transference is not performed as shown in FIG. 1.

Since storage of data of a black image in a quantity corresponding to 160 rasters, which is the width of the recording head, enables the position relationship among the black image and the cyan, magenta and yellow images to be completely recognized. Therefore, the necessity of performing the bleeding preventive operation can correctly be discriminated. Since the necessity of performing the bleeding preventive operation is different for each recording apparatus, the necessity cannot simply be discriminated.

In a case where a discrimination has been performed that the bleeding preventive control is necessary if yellow, magenta and cyan images exist in a region of a black image corresponding to a pixels, there is a detection method in which a pixels are made bold in the periphery of pixels of either color to obtain the logical product with another color image, and if a pixel is left, then discrimination is performed that two color pixels exist in the region of the pixels. In this embodiment, a is made to be 4 (a=4) and if the images approach within 4 pixels, then a discrimination is performed that bleeding will take place.

Since the memory control method for an image to be recorded according to this embodiment shown in FIG. 27 employs the offset transference, the required memory capacity can be reduced to half of the capacity required for the conventional method. Thus, the efficiency in using the memory can satisfactorily be improved. Although the reduction in the memory capacity is smaller than that realized in the seventh and eighth embodiments shown in FIG. 7, the same advantage in terms of the cost can sometimes be realized if the memory efficiency cannot be improved as realized in the method according to the seventh and eighth embodiments shown in FIG. 7 because the memory size of a prevail-type memory (RAM) in the form in units of 1 Mbit/piece or 4 Mbit/piece can be reduced in one unit by the method according to this embodiment shown in FIG. 27. Thus, the method according to this embodiment is sometimes the optimum method in terms of cost reduction and performance improvement.

Tenth Embodiment

Although the ninth embodiment has the structure that black pixel is previously formed, the present invention may be adapted to a structure in which a black pixel is formed later.

That is, this embodiment has a structure that all of the transferred offset yellow, magenta and cyan data are not stored but a logical sum image (OR image) of yellow, magenta and cyan image data is stored, in accordance with the position relationship between the logical sum image and the black image the boundary portion is detected similarly to the ninth embodiment, and the mode is changed to the multi-pass printing mode if a discrimination has been performed that the bleeding preventive control is required.

Figure 28:
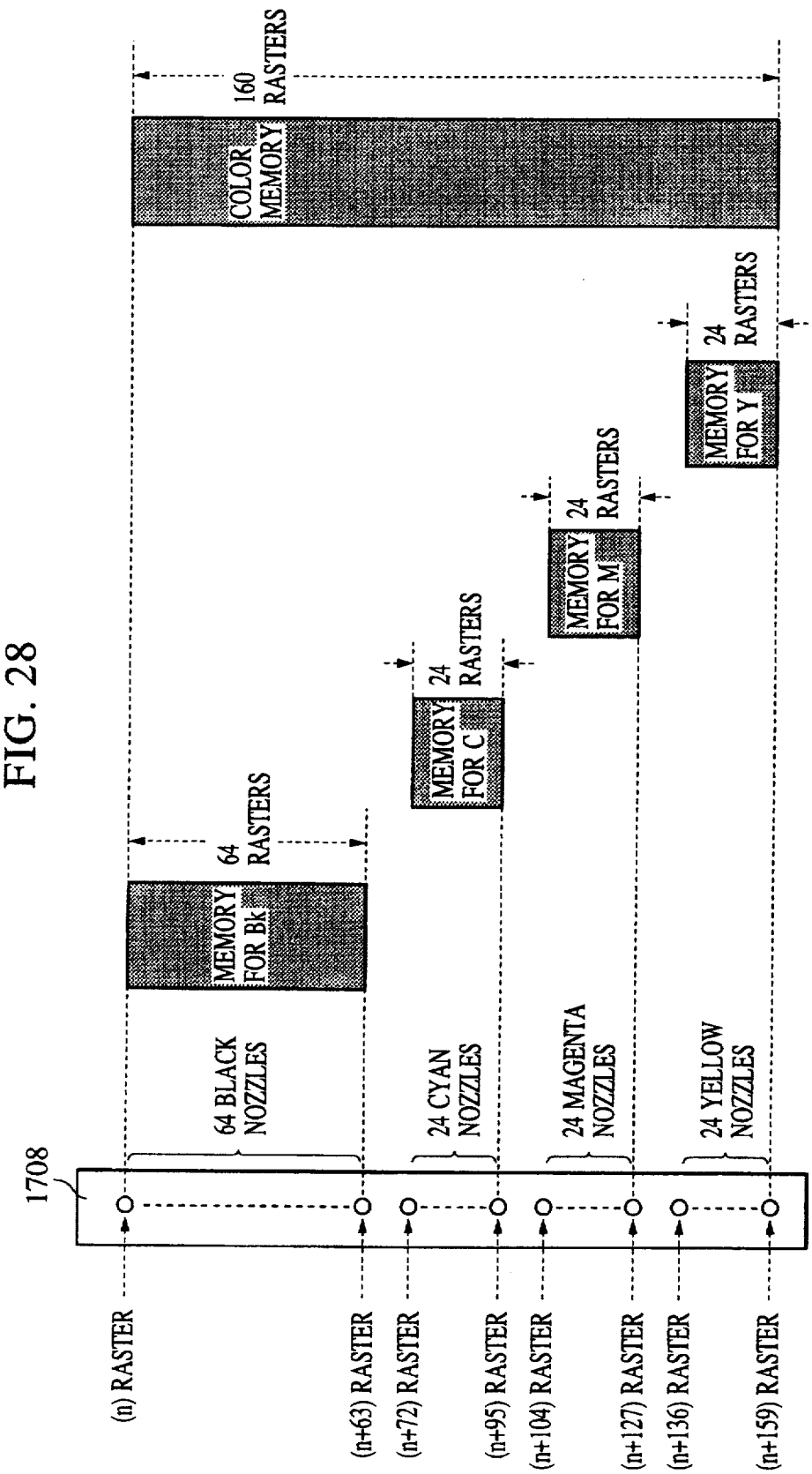
FIG. 28 is a diagram showing the structures of memories according to a tenth embodiment of the present invention.

FIG. 28 is a diagram showing the memory configuration according to this embodiment. Referring to FIG. 28, the logical sum image of transferred offset yellow, magenta and cyan image data is stored in the memories for the color image data to detect the color boundary portion in accordance with the position relationship between the logical sum image and the black image.

Similarly to the foregoing embodiments, this embodiment has a structure to use yellow, magenta, cyan and black inks that will arise a problem of bleeding between a black image and yellow, magenta and cyan images. Therefore, the boundary from the black image is detected. If ink which will arise a problem of bleeding with another ink is used, the boundary may be detected between colors, which will arise the problem of bleeding, to prevent bleeding.

Since the structure, operation and effect except the boundary detection means for detecting the boundary portion between images in which bleeding will take place are the same as those of the foregoing embodiments, they are omitted from detailed descriptions.

Eleventh Embodiment

An eleventh embodiment will now be described with which the efficiency of using the memory can further be improved and as well as the image boundary portion, in which bleeding is able to take place, can be detected accurately.

In the foregoing embodiment, if a black image is formed previously, the black image corresponding to the width of the nozzles must be stored whereas if yellow, magenta and cyan images are formed previously, then the logical sum image of the yellow, magenta and cyan images must be stored. Therefore, although the efficiency in using the memory can significantly be improved as compared with the structure in which the offset transference is not performed, data for detecting the boundary, which is not required as data to be printed, must be stored wastefully.

In this embodiment, the memory for detecting the boundary is significantly reduced to improve the efficiency in using the memory.

In this embodiment, a head similar to that described with reference to FIG. 1 and having a structure in which a black image is previously formed is employed. If the offset transference is performed, the boundary control cannot be performed when a black image is printed because yellow, magenta and cyan image data does not exist.

In this embodiment, yellow, magenta and cyan image data in the region, in which a black image is printed, is transferred as well as offset yellow, magenta, cyan and black image data required to print an image. As a result, the boundary between the black image and the yellow, magenta and cyan images is detected and, in this embodiment, a black image in the boundary portion is thinned partially, so that bleeding is prevented. Since the previously transferred yellow, magenta and cyan image data items are again transferred at the yellow, magenta and cyan printing positions, they are not required to be stored. Therefore, the yellow, magenta and cyan image data may be deleted when detection of the boundary portion has been completed.

As a result, the memory is required only as the yellow, magenta and cyan image data regions which are the actual printing regions. Therefore, the efficiency in using the memory can significantly be improved.

Although the region for temporarily storing the yellow, magenta and cyan images for detecting the boundary may be individually provided from the regions for storing the yellow, magenta and cyan image data, the logical sum data of yellow, magenta and cyan is able to achieve the object of this embodiment. Therefore, the individual storage is not required.

Although the yellow, magenta and cyan image data or the logical sum data of the yellow, magenta and cyan image data for the portion, in which a black image is printed, is transferred, another structure may be employed in which black image data corresponding to the regions, in which yellow, magenta and cyan images are printed, is again transferred for the purpose of detecting the boundary individually from the transference for the purpose of actually printing the black image.

According to this embodiment, the image boundary portion is detected between a black image and yellow, magenta and cyan images from the transferred offset data by transferring image data by a plurality of times as well as the transference for performing the actual printing operation. Thus, the efficiency in using the memory can be improved and bleeding can reliably be prevented.

Since the structure, operation and effect except the data transference means for transferring image data plural times are the same as those of the foregoing embodiment, they are omitted from detailed description.

Twelfth Embodiment

If a color image is recorded, different color inks are mixed with one another in the boundary portion between different color regions and, thus, bleeding takes place in the boundary portion. In this embodiment, the boundary portion is detected and dot replacement process is performed to prevent bleeding from being contrasted so that the foregoing problem of bleeding is overcome. The detailed structure of this embodiment will now be described.

Initially, recording inks for use in this embodiment will now be described. In this embodiment, four types of inks, that is, yellow, magenta, cyan and black inks are employed as described above. As for the composition of the inks, the black ink is composed of a solvent mainly consisting of water and containing nonvolatile component, the black ink having a surface tension of about 50 dyn/cm.

Each of the yellow, magenta and cyan inks is prepared by adding acetylenol is added to a solvent containing dye and a nonvolatile component and mainly composed of water to improve wettability and to cause the surface tension to be about 27 dyn/cm. The critical surface tension of usual recording paper is about 35 dyn/cm and the black ink cannot easily wet the paper and a long time is required to be fixed. Since the dye is not moved (fixed) into only a depth range of about 20 μm from the upper surface of the recording paper, a relatively high density and excellent color development characteristic. Thus, the black ink exhibits a high contrast with respect to recording paper and improved quality.

The yellow, magenta and cyan inks are inks having a low surface tension and therefore they easily wet the recording paper so that the inks are fixed on the recording paper at high speed. However, since the inks penetrate into a deep portion of the recording paper, the color development characteristic is somewhat unsatisfactory. However, no practical problem arises if the color inks (the yellow, magenta and cyan inks) cannot enable contrast, which can be realized by the black ink, to be realized with respect to the recording paper. Therefore, the inks have the compositions with which bleeding in the boundary portion can be prevented.

Although the yellow, magenta and cyan inks, which are the penetration-type inks, do not generate bleeding in the boundary, the black ink is an evaporation-type ink in order to improve the image quality and, therefore, bleeding takes place in the boundary between the black ink region and the color ink (yellow, magenta and cyan ink) portions.

Figure 29A:
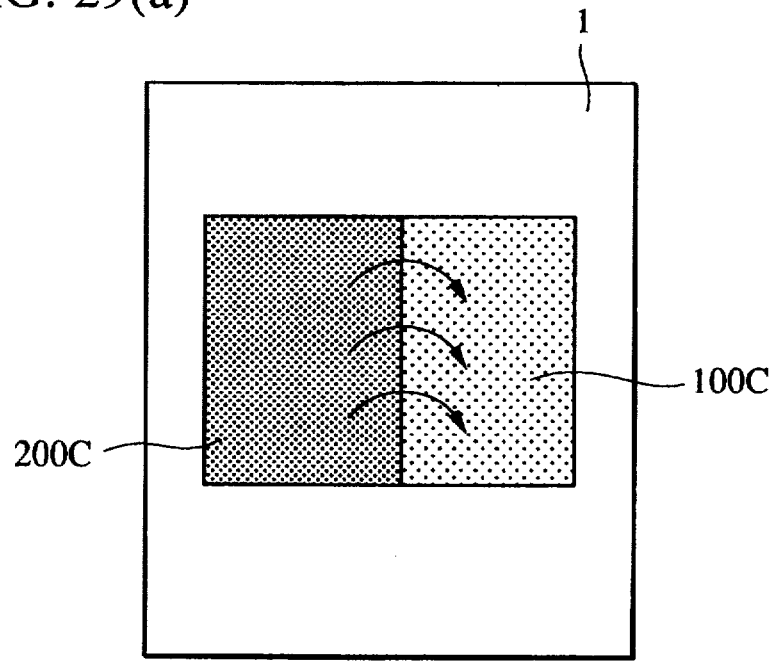
FIGS. 29(A and B) are diagrams showing bleeding taking place between inks having different characteristics.
Figure 29B:
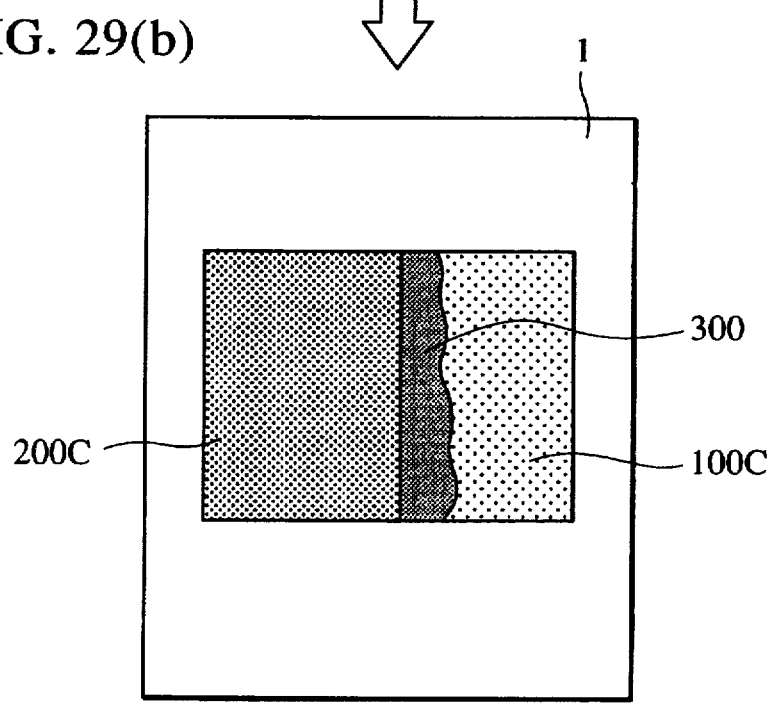

Bleeding in the boundary will now be described with reference to FIG. 29. Referring to FIG. 29, reference numeral 1 represents a recording medium, which is usual recording paper, 200c represents an image region recorded by the black ink, which is the evaporation-type ink, and 100c represents an image region recorded by the color ink, which is the penetration-type ink. If the image region recorded by the evaporation-type ink and the image region recorded by the penetration-type ink are located adjacently, ink bleeding takes place in the boundary portion regardless of the ink discharge order. Thus, even if recording is performed as shown in FIG. 29A, the evaporation-type ink 200c flow into the image region recorded by the penetration-type ink 100c as shown in FIG. 29B as the time passes. As a result, a bleeding region as indicated by reference numeral 300 can be formed, and therefore the recorded image degrades.

To prevent this, a first means for detecting the boundary portion between the black ink and the color ink will now be described.

(Detection of Boundary Portion)

Initially, the boundary is, in this embodiment, defined as a region in which the black ink and the color ink are located adjacently. Although the boundary region becomes different depending upon a variety of factors, such as, the accuracy in the position of the dot, to which the ink is discharged, the diameter of the ink droplet and easiness of bleeding of the ink with respect to the recording medium, this embodiment has a structure such that the boundary is detected in a case where a black ink pixel exists within 4 pixels from a color ink pixel.

In the recording apparatus, prior to performing the recording operation, data for each color to be recorded is developed into bit drawing data consisting of 1 and 0 with which whether or not recording is performed is discriminated (hereinafter the memory in which the development is performed is called a "print buffer").

To detect whether or not a black pixel exists within 4 pixels from the color pixel, the logical sum of the print buffers for recording yellow, magenta and cyan images is developed in a working buffer 1 so that a color pixel buffer, with which the color image is recorded, is created. Then, a working buffer 2 is prepared in which data obtained by calculating the 4-bit logical sum of data in the buffer 1 in the lateral direction (in the direction X) is developed in the buffer 1 so that a pixel buffer, in which color pixel data for 4 pixels is boldfaced in the direction X, is made. Furthermore, data obtained by calculating the logical sum for 4 bits in the longitudinal direction (in the direction Y) is developed in a buffer 3 so that a pixel buffer, in which color pixel data for 4 pixels is boldfaced in the direction Y, is made. As a result, pixel data in the form obtained by extending the color pixel data in the four directions, can be obtained in a working buffer 3.

Then, a working buffer 4 is prepared in which data obtained by calculating the logical sum of the buffer 3, which is the bold data of the foregoing color, and the black printer buffer, which is the black pixel data, is developed.

Pixel data left on the buffer 4 is the boundary pixel at which the black pixel exists within 4 pixels from the color pixel.

Although four working buffers are used to cause the method to be understood easily, a method may, of course, be employed in which all processes are performed on one buffer.

The longitudinal and lateral dot size (the bit map size) serving as a unit for one buffer is not limited particularly if it is larger than the number of dots (in this embodiment, the size is 9 pixels ×9 pixels because the four pixels from the periphery are used) to be detected for the purpose of detecting the boundary. In many cases, it is preferable that the lateral size corresponds to one line of the recording size and the vertical size corresponds to the nozzles of the head.

The logical sum and the logical product may be processed by a hard logic by using the function of the CPU. If the hard logic method is employed, the expansion is allowed in both the lateral and vertical directions so that a high speed process is realized. Although the process may be performed in bit units, byte units or word units, the process can, of course, be performed at high speed by performing the process in larger units.

Although the dots were extended in, for example, the lateral direction by 4 dots by calculating the logical sum of the 4 right and left dot pixels, dots may be extended in one direction in such a manner that, for example, dots are extended to the right by a degree corresponding to 8 pixels (a logical sum corresponding to 8 pixels is given from the interest dot to the right). Assuming that the buffer, from which the development is performed, is a data area in the direction X having a size corresponding to n pixels, the working buffer, in which the development is performed, is a data area having a size of n+8 pixels which is larger than the buffer, from which the development is performed, by 8 pixels to the right. By deleting the end area corresponding to 4 pixels in the direction X and by extracting data at the position of the (n+4) pixel from the fifth pixel in the direction X, data can be obtained which is similar to that obtainable in a case where the logical sum of 4 right and left pixels is taken.

Depending upon the algorithm on the software or the structure of the hard logic, an advantage is sometimes realized when the reference to the address is limited to the front reference or the rear reference as compared with the front and rear references. In the foregoing case, the foregoing method is effective.

(Replacement of Pixels in Boundary Portion)

If the boundary region, in which bleeding is able to take place between black pixels and color pixels, has been detected by the foregoing method, control is performed so that no visual problem arises even if bleeding takes place in the boundary region. A control means will now be described in detail.

Theoretically, a block pixel can be produced by superimposing yellow, magenta and cyan inks (hereinafter a black pixel produced by mixing yellow, magenta and cyan inks is called "PCBk"). Since yellow, penetration-type inks are penetration-type inks as described above, PCBk produced from the penetration-type inks is not mixed with yellow, magenta and cyan pixels. Therefore, if all colors including black are produced from the yellow, magenta and cyan inks, the problem of bleeding in the boundary portion due to the different-color inks can be overcome. However, a PCBk black image produced from the yellow, magenta and cyan inks cannot easily made to be deep black desired by users. The foregoing problem is not limited to the ink for use in the ink jet recording apparatus but it can be understood from a fact that an exclusive black ink is usually used in an industrial field of printing of photogravure and the like.

Since deep black ink exhibiting excellent contrast is desired, the penetration-type ink, which can be introduced deeply into the recording medium is not suitable and use of evaporation-type ink causes the problem of bleeding in the boundary portion to arise.

Although PCBk cannot develop the desired by users, if the area of PCBk is very small, then it cannot be identified visually. That is, all of black images are not recorded by PCBk but a minimum area required to be recorded by PCBk is recorded by PCBk in place of using the black ink so that the problem of bleeding is prevented.

In this embodiment, only pixels adjacent to a color image and having a risk that bleeding takes place are recorded by PCBk in place of the black ink so that a deep-black image is formed by the black ink exhibiting strong contrast and only 4 pixels adjacent to a color image are formed by PCBk pixels. The resolution of the recording apparatus according to this embodiment is 360 DPI (dot/inch) and therefore the 4 pixels correspond to 0.28 mm. If a region correspond to 0.28 mm is a black region having somewhat different tone, no visual problem arises.

The inventor of the present invention carried out experiments to examine the thickness of the PCBk region that forms the outline of a black ink image region having a size of 10 mm×10 mm which give incongruity. As a result, incongruity is usually given if the thickness of the PCBk outline is thicker than 1 mm. The foregoing fact indicate that no practical problem arises if a very small PCBk region exists in a black ink region.

Thus, the boundary portion between color pixels and black pixels is detected by the means for detecting the boundary portion, and then only the black data in the boundary portion is replaced by PCBk data so that the quality of the black image is improved and disorder of the image in the boundary portion between different-type inks is prevented.

Since all of the pixels to be replaced are black pixels, deletion of the black pixels, which are subject of the replacement, from the original black pixels and addition of yellow, magenta and cyan pixels corresponding to the deleted black pixels to take the logical sum of the original print buffers, which are the original images of yellow, magenta and cyan and the added pixels so as to realize addition of the foregoing pixels.

As described above, correction by adding/deleting pixels to and from data in the print buffers, which are the original images formed for each of yellow, magenta, cyan and black enables the problem of bleeding in the boundary to be overcome.

A schematic image formed due to the foregoing control is shown in FIG. 30. Referring to FIG. 30, reference numeral 1 represents a recording medium, 200c represents an image region recorded by an evaporation-type black ink, 100c represents an image region recorded by a penetration-type color ink, 300 represents a region in which the ink in the region 200c bleeds into the ink in the region 100c, and 400 represents an image region in the recorded region 200c which is the boundary portion with the recorded region 100c, in which conversion to PCBk is performed to record data and in which the penetration-type ink for the region 100c is used while realizing a tone of the black ink for use in the region 200c.

Figure 30A:
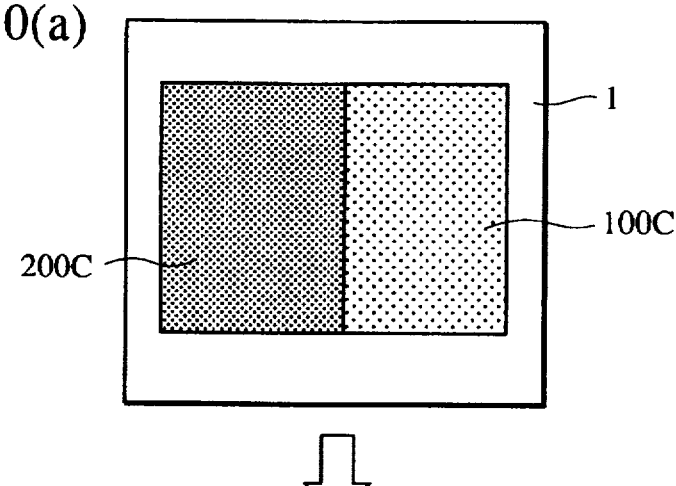
FIGS. 30(A–C) are diagrams showing control for preventing bleeding taking place between inks having different characteristics.
Figure 30B:
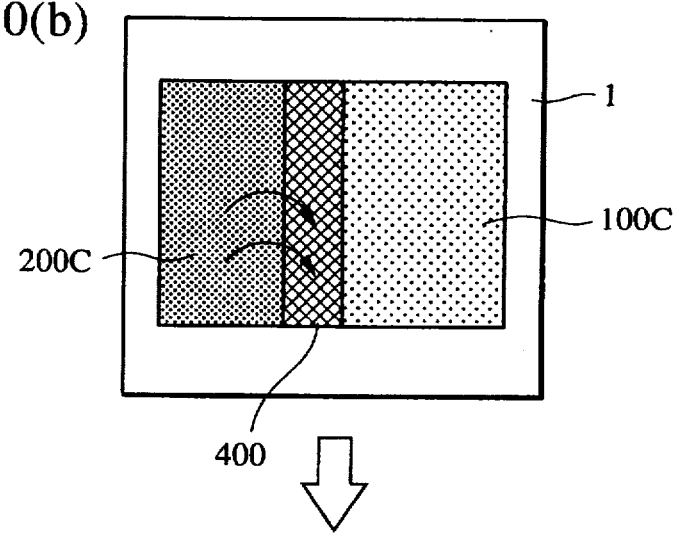
Figure 30C:
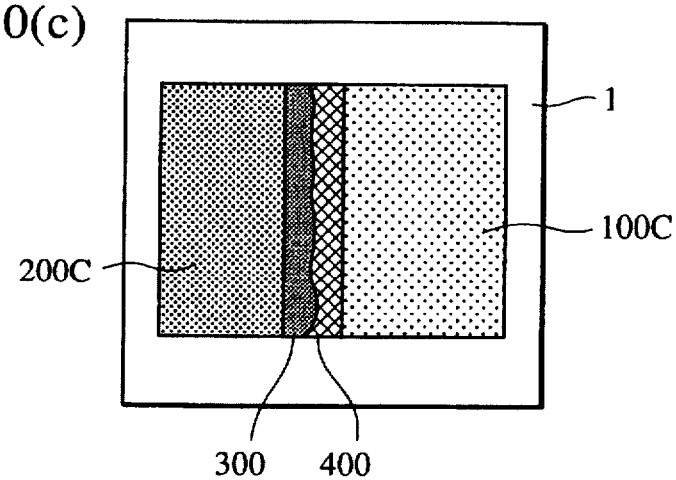

As shown in FIG. 30A, if the black ink for the region 200c and the color ink for the region 100c are caused to approach, bleeding takes place as described with reference to FIG. 29 and therefore the image degrades. Therefore, the bound portion is, as shown in FIG. 30B, is converted into PCBk recording. Although the boundary portion is converted into PCBk recording, ink in the,region 200c is introduced into the PCBk region. Thus, the PCBk region 400 encounters color mixture due to ink introduced from the region 200c as indicated by reference numeral 300 shown in FIG. 30C.

Although the mixture region is mixture of the evaporation-type ink and the penetration-type ink, the mixture cannot visually be detected because the two regions have the same black tone. Therefore, although bleeding and color mixture take place in the boundary portion, deterioration in the image quality can be prevented.

Although an advantage can be realized against the color mixture if the PCBk region is wider, the incongruity between the PCBk region and black ink region can be eliminated if the PCBk region is smaller. The inventor of the present invention considered the results of foregoing experiments so that the preferable region, in which conversion into PCBk is performed, is 1 mm or less, which is the minimum width capable of achieving the object.

Figure 31:
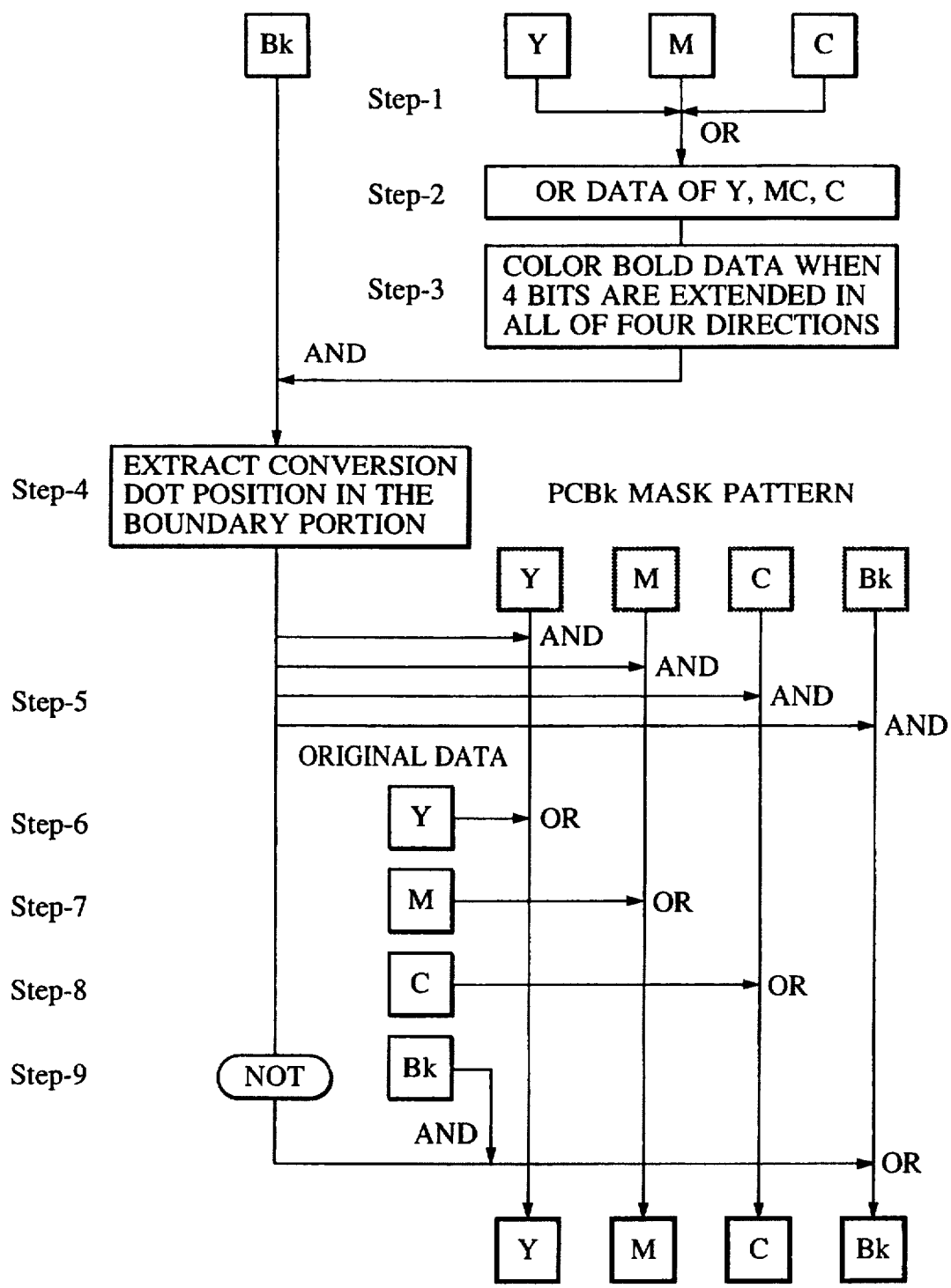
FIG. 31 a diagram showing a sequence for detecting a boundary and conversion of data in a boundary.

The operations of the means for detecting the boundary portion and the means for replacing the pixels in the boundary portion will now be described with reference to a overall sequence of the control shown in FIG. 31

In Step-1 OR of yellow, magenta and cyan data is obtained, and in Step-2 the obtained data is stored. In Step-3 4-bit bold data of the stored data is produced, and in Step-4 the AND with black data is calculated so that black dots, which must be converted, are extracted. In Step-5 the AND of data obtained in Step-4 and base data for each color is obtained so that conversion data for the boundary pixels is produced. In Step-6 to Step-8 image data rewritten while adding (OR) color conversion data to the original image data is rewritten. In Step-9 inversion of PCBk data is performed, and the AND with original black data is calculated to delete PCBk data from the original data. Then, the OR with PCBk data of black is calculated so as to be final image data.

As described above, the boundary detection means for detecting the portion, in which different-type inks are located adjacently, and a boundary portion pixel replacing means for replacing pixels to be recorded in the vicinity of the different-type ink into at least one or more different type ink pixels are provided. Thus, an evaporation-type ink can be used which is able to lower the visible level of bleeding if different-type inks are used adjacently and which realizes excellent coloring characteristic. As a result, an ink jet recording system and an ink jet recording apparatus capable of recording a high-quality image can be provided.

To detect whether or not a boundary between black data and color data exists in the same recording area, color data must exist in the printer if a black image is previously printed. If offset-transference of data is simply performed from the printer driver in the host computer to save the memory of the print buffer, the foregoing superimposition cannot be detected. Therefore, this embodiment has an arrangement that the boundary is detected by the following method.

The offset transference is performed by the following procedure. The data transference is performed by any of the following typical methods, that is, a method, in which a character code is transferred to the printer and a method in which a raster image is transferred to the printer. The method, in which the raster image is transferred, will now be described.

A multi-value print image is transferred from an application of the host computer to the printer driver to correspond to the resolution of the printer. In the printer driver, the data is subjected to a color conversion process and the like and finally subjected to a multi-value or binary conversion so as to be converted into a binary raster image. Then, the print image data is, together with a control command for the printer, transmitted to a printer port of the host computer or to an instructed file in the host computer. Then, an assumption is performed that the print image data is transmitted to the printer port.

In general, data, which has been binary-coded or rasterized by the printer driver, is sequentially transferred as color information of the same raster on the image to be recorded. In the printer, the raster data sequentially transferred is stored in the receiving buffer, and then the raster data is supplied to a controller portion for converting the raster data into dot image to be printed. Then, the dot image is developed. The developed data is longitudinally and laterally converted in the print buffer, and the required quantity of the data is stored to be adaptable to the layout of the positions of the nozzles of the recording head.

Figure 32:
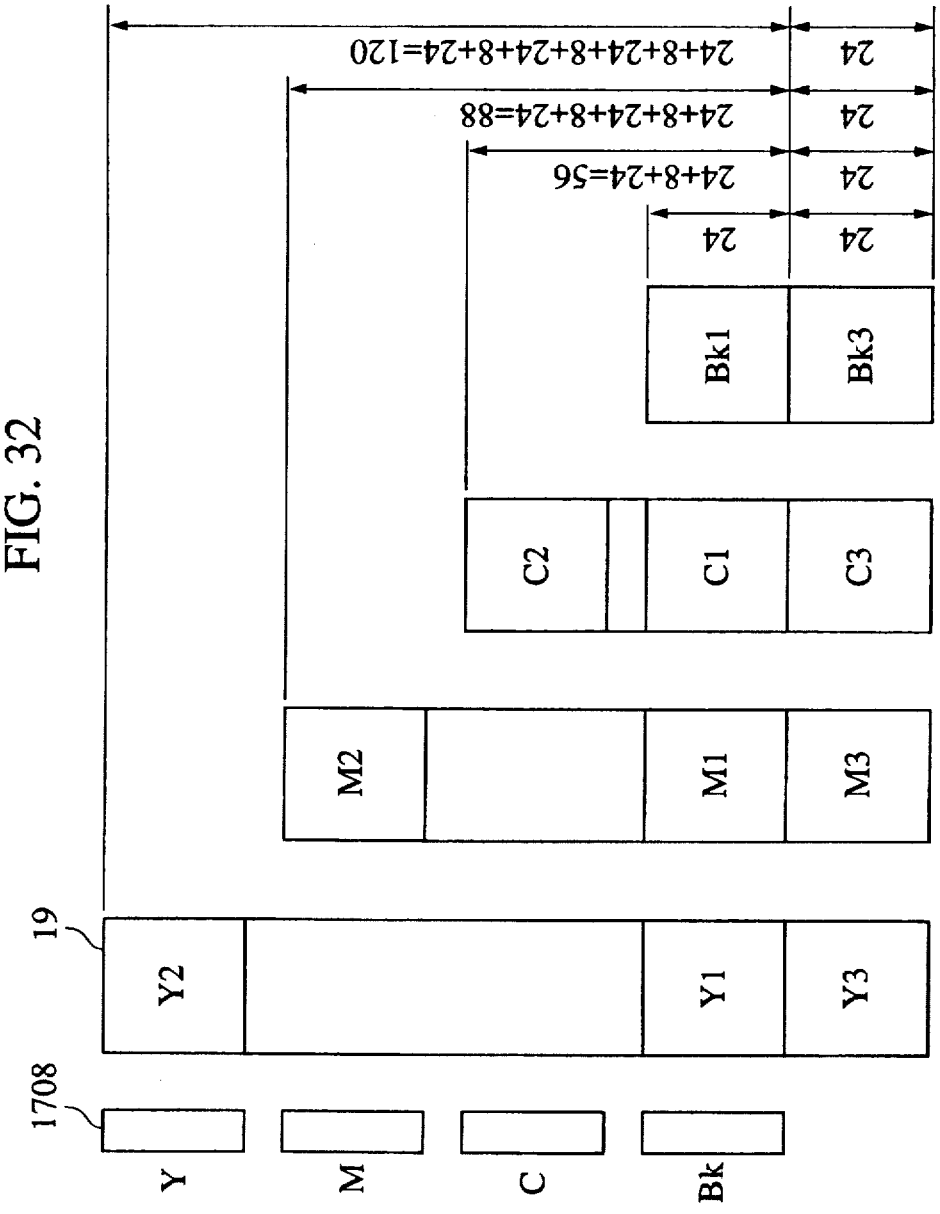
FIG. 32 is a diagram showing a state of memories in a print buffer in a printer.

FIG. 32 shows allocation in a memory 19 in a case where the offset transference is not performed. As can be understood from the allocation in the memory 19, the portion recorded by a recording head 1708 which performs scanning in the main scanning direction is not data on the same raster in the case of a vertical-configuration head. Therefore, data of color to be recorded finally (which is yellow in this embodiment) must be stored for a certain time after data of color to be recorded first (which is black in this embodiment) has been printed.

In order to prevent the foregoing waste, this embodiment has a structure such that data is transferred from the printer driver of the host computer to the printer to correspond to the respective nozzle positions (data for each color to be printed by the same main scanning for recording) to reduce the quantity of data to be stored temporarily.

By employing the foregoing method, the required quantity of the memory can significantly be reduced as described above. Thus, the rank of the RAM can be lowered by one or more degrees.

As can be understood from FIG. 32, the boundary detection cannot be performed as to whether or not a black dot and a color dot come in contact with each other in the vicinity of the same raster. Accordingly, an interface function capable of performing bidirectional communication between the printer and the host computer as shown in FIG. 11 is used to overcome the foregoing problem.

A process to print an image in the foregoing structure according to this embodiment will now be described with reference to a flow chart.

Figure 34B:
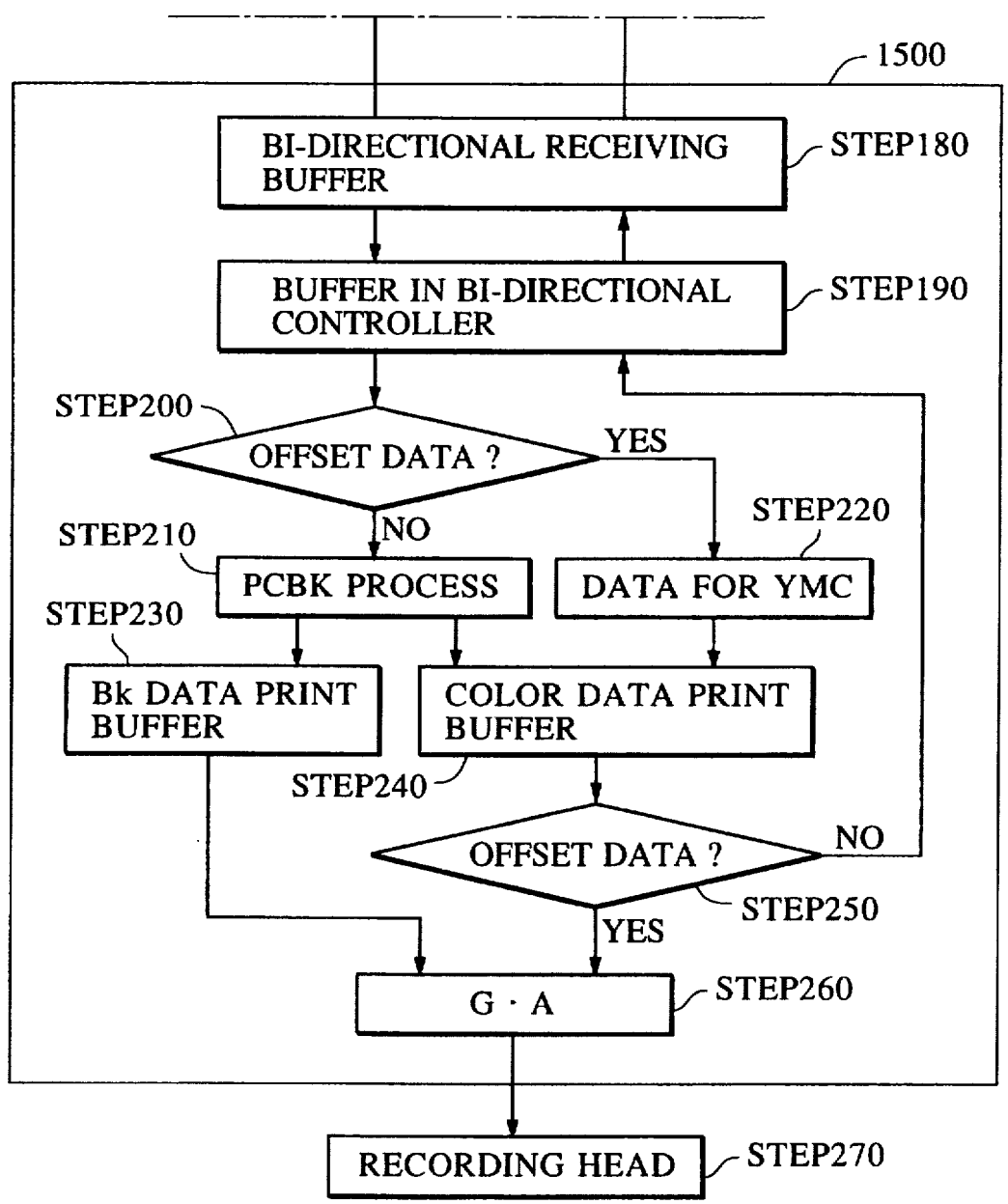

Referring to FIG. 34, the operation starts in STEP 100 so that a print command is transferred to an application software on the host computer. In STEP 110 the application software, together with the OS (Operating System), starts an operation for printing. In STEP 120 multi-value data corresponding to the resolution is supplied from GDI (Graphics Display Interface) of the OS into a printer driver software in the host computer. Then, an RGB signal obtained from the GDI is subjected to color conversion, color correction and the like into CMYK or the like.

In STEP 140 the foregoing data is converted into final binary data which can be recorded by the printer. In STEP 150 a printer control command, such as a printing mode, instructed by the printer driver, is added to the foregoing data so as to be converted into a raster data format. In STEP 160 the bidirectional output buffer receives data rasterized in STEP 150.

In STEP 170 a bidirectional offset processing portion offsets, into an instructed pattern, data for each color in each raster stored in the bidirectional output buffer in accordance with a predetermined offset quantity. In a case where the recording head is a vertical-configuration head, an instruction adaptable to the nozzle configuration is required. The bidirectional output buffer is able to overwrite data returned from the printer to the original position in the memory or write the same at an appropriate position. The foregoing processes to STEP 160 are functions of the host computer 3000.

The operations from STEP 180 are performed by a printer 1500. Communication between STEP 170 and STEP 180 is performed through a bidirectional interface, such as Centronics Interface.

In STEP 180 the bidirectional receiving buffer receives data from the host computer 3000. In STEP 190 data received by the buffer in the bidirectional controller in STEP 180 is interpreted by a printer engine to enable the operation. In STEP 200 whether or not data for each color transferred this time is in the same raster or the data has been offset and transferred to correspond to the configuration of the nozzles is performed in accordance with data interpreted by the bidirectional controller in STEP 190.

In this embodiment, the boundary portion between different color regions is detected in such a manner that initially data, which is not offset, is transferred and then data subjected to the PCBk process is offset and transferred.

The description will be made about the first case where data, which is not offset, has been transferred. Since the discrimination is performed in STEP 200 that data is not offset data, a negative discrimination is performed, and the operation proceeds to STEP 210. In STEP 210 a PCBk process is performed. As a result of the PCBk process, if a boundary between black data and color data exists, black data is partially thinned by a mask in a range of 4 dots in the boundary portion of the black data, and color data are substituted (added) for the positions of the thinned black data.

Processed black data is, in STEP 230, transferred to a black data print buffer. Color data is, in STEP 240, stored in color data print buffers. In STEP 250 whether or not color data is offset data is discriminated. Since the color data is not offset data in the first step, a negative discrimination is performed and the data is transferred to the buffer of the bidirectional controller. In STEP 190 format of data is converted inversely to enable the bidirectional controller to perform bidirectional communication of data in the buffer.

In STEP 180 the data is stored in the bidirectional receiving buffer and the data is transferred to a bidirectional offset processing portion in the host computer 3000 at a transference timing. The value of the offset process is zero raster and an instruction is performed in STEP 170 to overwrite data to the original data position. In STEP 160 data is overwritten at the position of the buffer instructed in STEP 170. The foregoing data is color data subjected to the PCBk process.

Then, the case where data is offset before it is transferred will now be described.

In STEP 170 data for each color is offset to correspond to the positions of nozzles for each color and offset data is extracted from the bidirectional output buffer. Data for each color has been subjected to the PCBk process.

Similarly to the foregoing case, the operation proceeds to STEP 180, STEP 190 and STEP 200 in which whether or not the data is offset data is discriminated. Since the data is offset data, the operation proceeds in the affirmative direction. In STEP 220 only yellow, magenta and cyan data is selected, and selected data is transferred to the color data print buffers in STEP 240. In STEP 250 whether or not the data is offset data is discriminated. Since the data is offset data, the operation proceeds to STEP 260 in which a gate array (G·A) causes a DMA to extract data on the memory, and a discharge signal is produced to correspond to the data. In STEP 270 the discharge signal is transferred to the recording head so that ink is discharged.

As described above, black data is printed in such a manner that the data is thinned by a degree corresponding to the boundary from color data at the first PCBk process. Color data subjected to the PCBk process is temporarily returned to the host computer by bidirectional communication, and data required to perform the PCBk is added by a quantity corresponding to the thinned black data so as to be printed when it is offset again at the time of the transference. The foregoing sequence is repeated.

The foregoing sequence will now be described in the viewpoint of the structure of the memory. FIG. 32 shows the structures of memories in the print buffer in the printer 1500. The number of recording rasters to be stored is calculated to correspond to the configuration of nozzles of the recording head 1708 shown in FIG. 32.

An assumption is performed that recording nozzles are arranged in the sequential order of black, cyan, magenta and yellow nozzles, each recording nozzle has 24 nozzles, and a space of 8 nozzles is formed between different colors to separate the colors. The recording order is made such that the black nozzles first record data. Expression as Bk1 and C1 schematically shows the capacity of the memory required for the width to be printed by one main scanning of the recording head having a width of 24 nozzles.

When data in Bk1 is printed, color data items in C2, M2 and Y2 are simultaneously printed. Data in C2, M2 and Y2 is previous data with respect to data in Bk1. That is, data for colors on the same raster before the color of interest has been transferred for printing. Therefore, if the offset transference is not performed, all yellow data items in Y1 to Y2, all magenta data items in M1 to M2 and all cyan data items in C1 to C2 must be stored before the timing at which data Bk1 is printed. Furthermore, to maintain the printing speed, a working area for editing data for the next line is required, as indicated by regions Y3, M3, C3 and Bk3. Thus, a total data quantity corresponding to 348 rasters must be stored.

The case where the offset transference is performed will now be described. When data in Bk1 is printed, data in C2, M2 and Y2 is printed similarly to the foregoing case. However, since offset transference recording is performed, only the foregoing data is transference from the printer driver of the host computer 3000. Therefore, only storage of only the foregoing data is required. To maintain the printing speed, provision of working areas Y3, M3, C3 and Bk3 for developing offset-transferred data results in 24 rasters being required for each color. Thus, a total area corresponding to 192 rasters is required.

Figure 33:
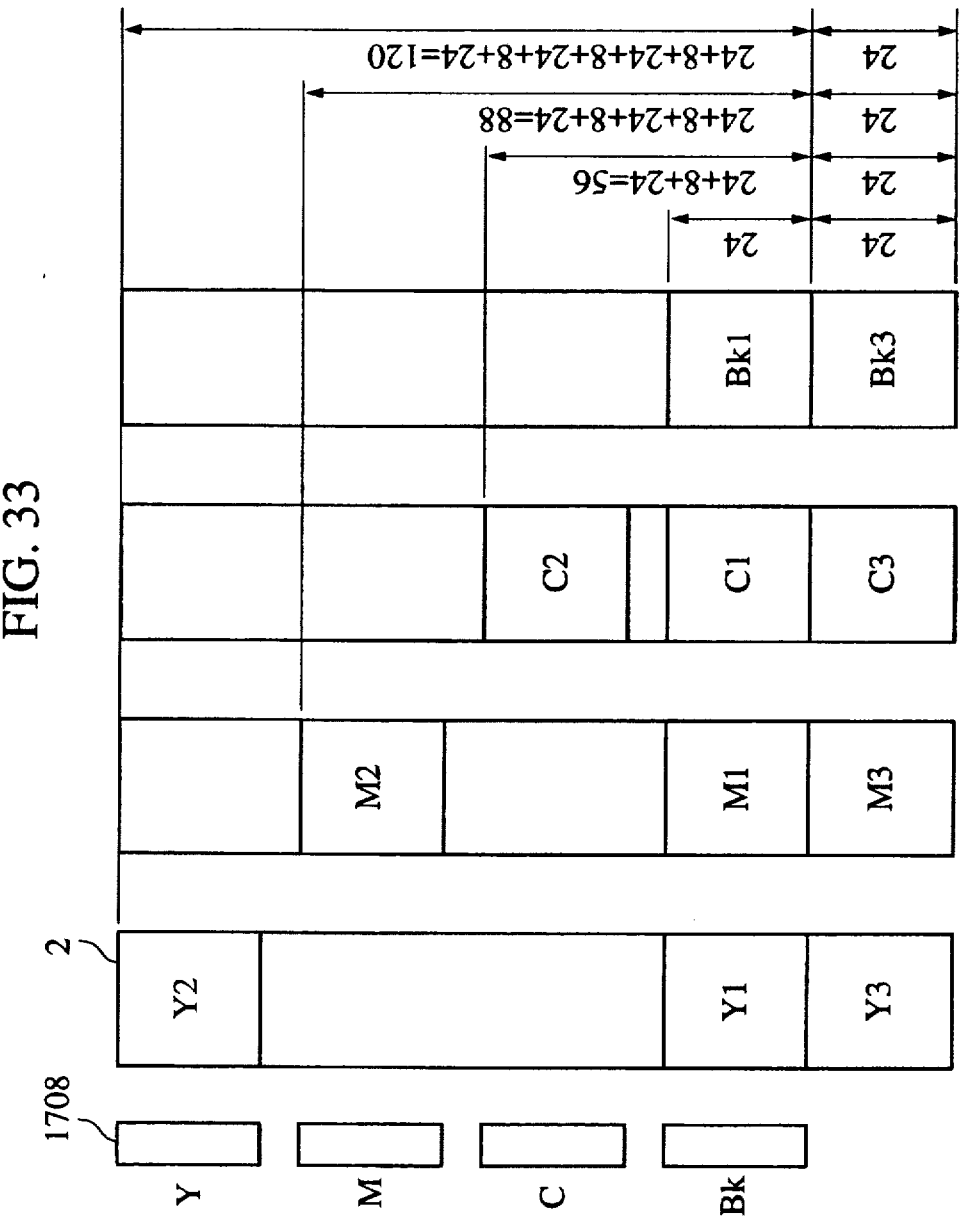
FIG. 33 is a diagram showing a state of memories in a bidirectional output buffer in a host computer.

The structures of memories (the bidirectional output buffer in this embodiment) in the host computer 3000 will now be described. The bidirectional output buffer requires at least a memory capacity shown in FIG. 33.

If the offset transference is not performed, data in the rasters before the area Y2 has been transferred to the printer when data in the region Bk1 is printed. Therefore, storage of the foregoing data is not required. As a result, required areas are regions Y1, M1, C1 and Bk1 and Y3, which is the working area of 24 rasters for editing the next line. Thus, a total area corresponding to 192 rasters is required.

When the offset transference is performed, the host computer 3000 must store data for 348 rasters similarly to the print buffer of the printer 1500.

Thirteenth Embodiment

In the twelfth embodiment, a black image is recorded in such a manner that transferred black data, which is not offset, is subjected to a boundary detection, and the mask for the PCBk process is provided so as to be used to record a black image without transference of the data to the host computer. In this embodiment, all of data items are temporarily returned to the host computer.

Figure 35B:
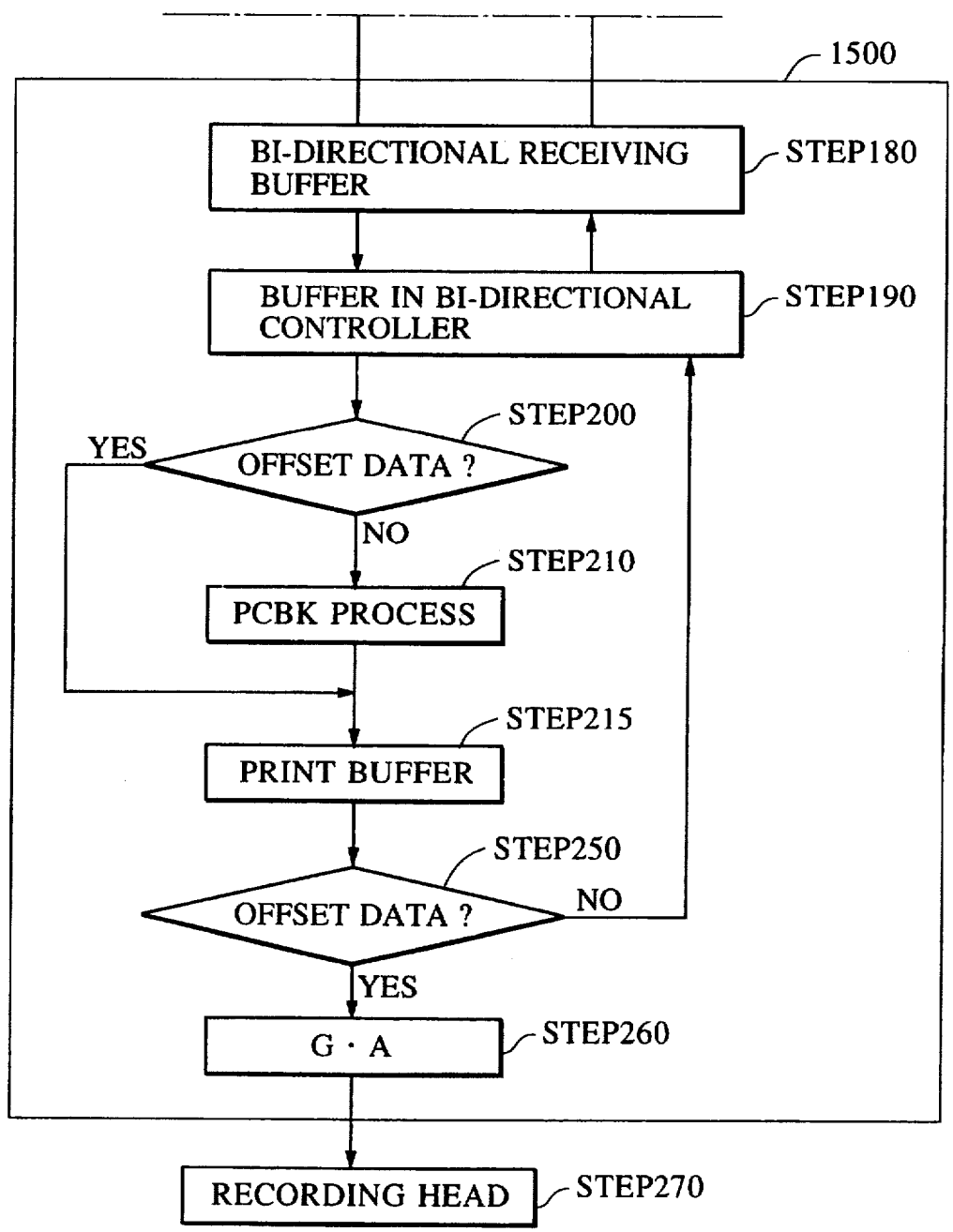

FIG. 35 is a flow chart in the foregoing case. Since STEP 100 to STEP 200 are the same, they are omitted from description.

If a discrimination is performed in STEP 200 that the data is not offset data, the PCBk process is performed in STEP 210. In STEP 215 the data is transferred to the print buffer. In STEP 215 black data and color data are commonly stored in the print buffer. In STEP 250 whether or not the data is offset data is discriminated. Since data allowed to pass through STEP 210 is not offset data, data is returned to the buffer in the bidirectional controller in STEP 190. Then, a similar process to that according to the first embodiment is performed.

If a discrimination is performed in STEP 200 that the data is offset data, print buffers for all colors are rewritten in STEP 215. In accordance with a result of discrimination performed in STEP 250, the operation proceeds in the direction of the affirmative discrimination. In STEP 260, the data is allowed to pass through the gate array (G·A) so that it is, as a printing signal, transferred to the recording head in STEP 270.

By using the foregoing structure which uses the bidirectional communication control which is usually employed to communicate a status, such as an error in a scanner or a printer and monitoring of the operation, an effective control can be performed such that bleeding can be prevented even if the capacity of the memory in the printer is reduced.

Although the bleeding preventive control and the like may be performed in the host computer, provision of a hard logic for only the boundary detection and mask process for the gate array (G·A) circuit in the printer enabling high speed communication as compared with a structure in which the control is performed in the host computer will realize a significant advantage. When the host computer is performing the printing job, the CPU is generally used to performing printing out of the application in the host computer. Therefore, the foregoing image bit data process can be performed by the hard logic, thus resulting in a significant effect being obtained.

As for the timing at which the data to be recorded is transferred, all of print files for one to several pages may be transmitted to the printer by using the function of a print manager or the like in the host computer and then the printing operation may start after all data items for the several pages have been completed; or a cycle consisting of transference, conversion and transference, and printing for one scanning operation for recording performed by the recording head may be repeated.

According to the seventh to thirteenth embodiments, the required memory in the recording apparatus using the foregoing vertical-configuration recording head can be saved, and bleeding in the boundary portion between different color regions can be prevented. As a result, a high-quality image can be recorded.

The present invention is particularly suitable for use in an ink jet recording head and recording apparatus wherein thermal energy generated by an electrothermal transducer, a laser beam or the like is used to cause a change of state of the ink to eject or discharge the ink. This is because the high density of the picture elements and the high resolution of the recording are possible.

The typical structure and the operational principle of such devices are preferably the ones disclosed in U.S. Pat. Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the production, development and contraction of the bubble, the liquid (ink) is ejected through an ejection outlet to produce at least one droplet. The driving signal is preferably in the form of a pulse, because the development and contraction of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination of the ejection outlet, liquid passage and the electrothermal transducer as disclosed in the above-mentioned patents. In addition, the present invention is applicable to the structure disclosed in Japanese Laid-Open Patent Application No. 123670/1984 wherein a common slit is used as the ejection outlet for plural electrothermal transducers, and to the structure disclosed in Japanese Laid-Open Patent Application No. 138461/1984 wherein an opening for absorbing pressure waves of the thermal energy is formed corresponding to the ejection portion. This is because the present invention is effective to perform the recording operation with certainly and at high efficiency regardless of the type of recording head.

In addition, the present invention is applicable to a serial type recording head wherein the recording head is fixed on the main assembly, to a replaceable chip type recording head which is connected electrically with the main apparatus and which can be supplied with the ink when it is mounted in the main assembly, or to a cartridge type recording head having an integral ink container.

The provisions of the recovery means and/or the auxiliary means for the preliminary operation are preferable, because they can further stabilize the effects of the present invention. Examples of such means include a capping means for the recording head, cleaning means therefore, pressing or sucking means, preliminary heating means which may be the electrothermal transducer, an additional heating element or a combination thereof. Also, means for effecting preliminary ejection (not for the recording operation) can stabilize the recording operation.

As regards the variation of the recording head mountable, it may be a single head corresponding to a single color ink, or may be plural heads corresponding to the plurality of ink materials having different recording colors or densities. The present invention is effectively applied to an apparatus having at least one of a monochromatic mode mainly with black, a multi-color mode with different color ink materials and/or a full-color mode using the mixture of the colors, which may be an integrally formed recording unit or a combination of plural recording heads.

Furthermore, in the foregoing embodiments, the ink has been liquid. It also may be ink material which is solid below the room temperature but liquid at room temperature. Since the ink is kept within a temperature between 30° C. and 70° C., in order to stabilize the viscosity of the ink to provide the stabilized ejection in the usual recording apparatus of this type, the ink may be such that it is liquid within the temperature range when the recording signal is the present invention is applicable to other types of ink. In one of them, the temperature rise due to the thermal energy is positively prevented by consuming it for the state change of the ink from the solid state to the liquid state. Another ink material is solidified when it is left, to prevent the evaporation of the ink. In either of the cases, in response to the application of the recording signal producing thermal energy, the ink is liquefied, and the liquefied ink may be ejected. Another ink material may start to be solidified at the time when it reaches the recording material.

The present invention is also applicable to such, an ink material as is liquefied by the application of the thermal energy. Such an ink material may be retained as a liquid or solid material in through holes or recesses formed in a porous sheet as disclosed in Japanese Laid-Open Patent Application No. 56847/1979 and Japanese Laid-Open Patent Application No. 71260/1985. The sheet is faced to the electrothermal transducers. The most effective one of the techniques described above is the film boiling system.

The ink jet recording apparatus may be used as an output terminal of an information processing apparatus such as computer or the like, as a copying apparatus combined with an image reader or the like, or as a facsimile machine having information sending and receiving functions.

While the invention has been described with reference to the structures disclosed herein, it is not confined to the details set forth and this application is intended to cover such modifications or changes as may come within the purposes of the improvements or the scope of the following claims.

What is claimed is:

1. A method of transferring data to be recorded in such a manner that the data to be recorded is transferred to a recording apparatus having a recording head including a plurality of recording elements offset in a predetermined direction for recording a plurality of colors, said method of transferring data to be recorded comprising the steps of:

obtaining quantities of offset of said recording elements for the plurality of colors in the predetermined direction relative to recording elements for any one of the plurality of colors; and transferring, to said recording apparatus, the data which is offset in the predetermined direction in accordance with the obtained quantity of offset and which corresponds to the plurality of colors.

2. A method of transferring data to be recorded according to claim 1, wherein the predetermined direction is a sub-scanning direction.

3. A method of transferring data to be recorded according to claim 1, wherein the predetermined direction is a main scanning direction.

4. A method of transferring data to be recorded according to claim 1, wherein said obtaining step is a step in which a request for the quantity of offset is issued to said recording apparatus and the quantity of offset is obtained from said recording apparatus.

5. A method of transferring data to be recorded according to claim 1, wherein said recording apparatus causes said recording head to main-scan an upper surface of a recording medium to record the data.

6. A method of transferring data to be recorded according to claim 1, wherein said recording head of said recording apparatus uses thermal energy to discharge ink to a recording medium.

7. A recording apparatus having a recording head including a plurality of recording elements offset in a predetermined direction for recording a plurality of colors, said recording apparatus comprising:

storage means for storing data to be recorded, which corresponds to said recording elements for the plurality of colors in quantities corresponding to the number of said recording elements; and receiving means for receiving the data, which is offset in a predetermined direction in accordance with quantities of offset of said recording elements for the plurality of colors in the predetermined direction relative to recording elements for any one of the plurality of colors, and which corresponds to the plurality of colors.

8. A recording apparatus according to claim 7 further comprising storage means for storing information indicating the quantity of offset.

9. A recording apparatus according to claim 8 further comprising transmitting means for transmitting the information stored in said storage means.

10. A recording apparatus according to claim 7, wherein the predetermined direction is a sub-scanning direction.

11. A recording apparatus according to claim 7, wherein the predetermined direction is a main scanning direction.

12. A recording apparatus according to claim 7 further comprising scanning means for causing said recording head to main-scan an upper surface of a recording medium.

13. A recording apparatus according to claim 7, wherein said recording apparatus is connected to a host computer which transfers the data to be recorded.

14. A recording apparatus according to claim 7, wherein said recording apparatus is adapted to a word processor which has a document processing function.

15. A recording apparatus according to claim 7, wherein said recording head uses thermal energy to discharge ink to a recording medium.

16. A recording system having a recording apparatus for recording data by using a recording head including a plurality of recording elements offset in a predetermined direction for recording a plurality of colors and a host computer for transferring, to said recording apparatus, the data to be recorded, said recording system comprising:

obtaining means for obtaining quantities of offset of said recording elements for the plurality of colors in the predetermined direction relative to recording elements for any one of the plurality of colors; and transferring means for transferring the data which is offset in the predetermined direction in accordance with the obtained quantity of offset and which corresponds to the plurality of colors, to said recording apparatus, wherein said recording apparatus has receiving means for receiving the data transferred by said transferring means and corresponding to the plurality of colors.

17. A recording system according to claim 16, wherein the predetermined direction is a sub-scanning direction.

18. A recording system according to claim 16, wherein the predetermined direction is a main scanning direction.

19. A recording system according to claim 16 further comprising scanning means for causing said recording head to main-scan an upper surface of a recording medium.

20. A recording system according to claim 16, wherein said recording head uses thermal energy to discharge ink to a recording medium.

21. A method of transferring data to be recorded in such a manner that the data to be recorded is transferred to a recording apparatus having a recording head including a plurality of recording elements offset in a sub-scanning direction for recording a plurality of colors, said method of transferring data to be recorded comprising the steps of:

obtaining quantities of offset of said recording elements for the plurality of colors in the sub-scanning direction relative to recording elements for any one of the plurality of colors;

changing the quantity of offset to change the positions of said recording elements to be used;

offsetting, in the sub-scanning direction, the data corresponding to the plurality of colors in accordance with the changed quantity of offset, and transferring the offset data corresponding to the plurality of colors to said recording apparatus.

22. A method of transferring data to be recorded according to claim 21, wherein the number of said recording elements of said recording head for at least one color is larger than the number of said recording elements for other colors, all of said recording elements provided by a larger number are not used during on scanning operation, and said changing step is a step in which the positions, at which said recording elements are used, are changed in accordance with a predetermined rule.

23. A method of transferring data to be recorded according to claim 21, wherein the number of said recording elements of said recording head for use in a scanning operation for recording at least one color is larger than the number of said recording elements for recording other colors.

24. A method of transferring data to be recorded in such a manner that the data to be recorded is transferred to a recording apparatus having a recording head including a plurality of recording elements offset in a sub-scanning direction for recording a plurality of colors, said method of transferring data to be recorded comprising the steps of:

obtaining quantities of offset of said recording elements for the plurality of colors in the sub-scanning direction relative to recording elements for any one of the plurality of colors;

thinning data to be recorded for at least one color so as to be complemented and completed by a plurality of scanning operations for recording;

offsetting, in the sub-scanning direction, the data corresponding to the plurality of colors in accordance with the changed quantity of offset, and transferring the offset data corresponding to the plurality of colors to said recording apparatus.

25. A method of transferring data to be recorded according to claim 21, wherein said recording head uses thermal energy to discharge ink to a recording medium.

26. A recording apparatus having a recording head including a plurality of recording elements offset in a sub-scanning direction for recording a plurality of colors, said recording apparatus comprising:

storage means for storing data to be recorded which corresponds to said recording elements for the plurality of colors;

receiving means for receiving the data, which is offset in the sub-scanning direction in accordance with quantities of offset of said recording elements for the plurality of colors in the sub-scanning direction relative to recording elements for any one of the plurality of colors, and which corresponds to the plurality of colors; and thinning means for thinning data to be recorded for at least one color so as to be complemented and completed by a plurality of scanning operations for recording.

27. A recording apparatus according to claim 26, wherein said recording head uses thermal energy to discharge ink to a recording medium.

28. A recording system comprising:

a recording apparatus for recording data by using a recording head including a plurality of recording elements offset in a sub-scanning direction for recording a plurality of colors; and a host computer for transferring, to said recording apparatus, the data to be recorded, wherein said host computer has obtaining means for obtaining quantities of offset of said recording elements for the plurality of colors in the sub-scanning direction relative to recording elements for any one of the plurality of colors; changing means for changing the quantity of offset to change the positions of said recording elements to be used; and transferring means for transferring the data which is offset in the sub-scanning direction in accordance with the obtained quantity of offset and which corresponds to the plurality of colors, to said recording apparatus, and said recording apparatus has receiving means for receiving the data transferred by said transferring means and corresponding to the plurality of colors.

29. A recording system comprising:

a recording apparatus for recording data by using a recording head including a plurality of recording elements offset in a sub-scanning direction for recording a plurality of colors; and a host computer for transferring, to said recording apparatus, the data to be recorded, wherein said host computer has obtaining means for obtaining quantities of offset of said recording elements for the plurality of colors in the sub-scanning direction relative to recording elements for any one of the plurality of colors; thinning means for thinning data to be recorded for at least one color so as to be complemented and completed by a plurality of scanning operations for recording; and transferring means for transferring the data which is offset in the sub-scanning direction in accordance with the obtained quantity of offset and which corresponds to the plurality of colors, to said recording apparatus, and said recording apparatus has receiving means for receiving the data transferred by said transferring means and corresponding to the plurality of colors.

30. A recording system according to claim 29, wherein said recording head uses thermal energy to discharge ink to a recording medium.

31. A recording apparatus having a recording head including a plurality of recording elements offset in a sub-scanning direction for recording a plurality of colors, said recording apparatus comprising:

storage means for storing data to be recorded which corresponds to said recording elements for the plurality of colors;

receiving means for receiving the data, which is offset in the sub-scanning direction in accordance with quantities of offset of said recording elements for the plurality of colors in the sub-scanning direction relative to recording elements for any one of the plurality of colors, and which corresponds to the plurality of colors;

detection means for detecting an image boundary portion between different-color regions in accordance with the data received by said receiving means; and bleeding preventive means for preventing bleeding occurring in the boundary portion in accordance with a result of detection performed by said detection means.

32. A recording apparatus according to claim 31, wherein said detection means has storage means for storing a fact that data for at least one color has been recorded in a predetermined region.

33. A recording apparatus according to claim 31, wherein said detection means has storage means for storing data for at least one color for a predetermined period after the data has been used to perform recording.

34. A recording apparatus according to claim 31, wherein said detection means has storage means for storing logical calculation data of data for at least two colors for a predetermined period after the data has been used to perform recording.

35. A recording apparatus according to claim 31, wherein said receiving means receives offset data to be recorded and non-offset data to be recorded, said detection means detects an image boundary portion between different-color regions in accordance with the non-offset data received by said receiving means.

36. A recording apparatus according to claim 31, wherein said bleeding preventive means has at least any one means selected from a group consisting of means for delaying recording, multi-pass means for controlling the number of passes and image correction means for correcting an image to be recorded.

37. A recording apparatus according to claim 31, wherein said recording head of said recording apparatus uses thermal energy to discharge ink to a recording medium.

38. A recording system comprising:

a recording apparatus for recording data by using a recording head including a plurality of recording elements offset in a sub-scanning direction for recording a plurality of colors; and a host computer for transferring, to said recording apparatus, the data to be recorded, wherein said host computer has transferring means for transferring the data offset in the sub-scanning direction in accordance with the quantities of offset of said recording elements for the plurality of colors in the sub-scanning direction relative to recording elements for any one of the plurality of colors and corresponding to the plurality of colors to said recording apparatus, and said recording apparatus has receiving means for receiving the data transferred by said transferring means and corresponding to the plurality of colors, detection means for detecting an image boundary portion between different-color regions in accordance with the data received by said receiving means, and bleeding preventive means for preventing bleeding occurring in the boundary portion in accordance with a result of detection performed by said detection means.

39. A recording system according to claim 38, wherein said recording head of said recording apparatus uses thermal energy to discharge ink to a recording medium.

40. A method of transferring data to be recorded in such a manner that the data to be recorded is transferred to a recording apparatus having a recording head including a plurality of recording elements offset in a sub-scanning direction for recording a plurality of colors, said method of transferring data to be recorded comprising the steps of:

offsetting and transferring the data in such a manner that the data offset in the sub-scanning direction in accordance with the quantities of offset of said recording elements for the plurality of colors in the sub-scanning direction relative to recording elements for any one of the plurality of colors and corresponding to the plurality of colors is transferred to said recording apparatus; and transferring non-offset data corresponding to the plurality of the other colors together with the data which is transferred in said offset and transferring step.

41. A method of transferring data to be recorded in such a manner that the data to be recorded is transferred to a recording apparatus having a recording head including a plurality of recording elements offset in a sub-scanning direction for recording a plurality of colors, said method of transferring data to be recorded comprising:

a first transferring process for transferring the data corresponding to the plurality of colors and stored in storage means to said recording apparatus without offsetting the data in the sub-scanning direction;

a receiving process for receiving the data processed by said recording apparatus;

a conversion process for, in accordance with received data, converting the data stored in said storage means; and a second transferring process for offsetting the converted data in accordance with the quantities of offset of said recording elements for the plurality of colors in the predetermined direction relative to recording elements for any one of the plurality of colors and transferring the offset data.

42. A method of transferring data to be recorded according to claim 41, wherein said recording head uses thermal energy to discharge ink to a recording medium.

43. A recording system in which communication between a recording apparatus for recording data by using a recording head including a plurality of recording elements offset in a sub-scanning direction for recording a plurality of colors; and a host computer for transferring, to said recording apparatus, the data to be recorded is performed by a bidirectional interface, wherein said host computer has first transferring means for transferring the data corresponding to the plurality of colors and stored in storage means to said recording apparatus without offsetting the data in the sub-scanning direction; receiving means for receiving the data processed by said recording apparatus; conversion means for, in accordance with received data, converting the data stored in said storage means; and second transferring means for offsetting the converted data in accordance with the quantities of offset of said recording elements for the plurality of colors in the predetermined direction relative to recording elements for any one of the plurality of colors and transferring the offset data, and said recording apparatus has discrimination means for discriminating whether or not data received from said host computer has been offset, processing means for processing the data if the received data has not been offset, transmission means for transmitting the processed data to said host computer, and control means for recording the received data if the received data has been offset.

44. A recording system according to claim 43, wherein said processing means has boundary detection means for detecting boundary between different-color pixels and boundary-pixel replacing means for converting pixel data in the boundary portion detected by said boundary detection means into pixel data for another color.

45. A recording system according to claim 43, wherein said host computer initially transfers the data stored in said storage means to said recording apparatus without offsetting the data in the sub-scanning direction, and then offsets the data stored in said storage means in the sub-scanning direction to transfer the offset data to said recording apparatus.

46. A recording system according to claim 43, wherein said recording head uses thermal energy to discharge ink to a recording medium.

47. A recording apparatus having a recording head including a plurality of recording elements offset in a sub-scanning direction for recording a plurality of colors, said recording apparatus comprising:

bidirectional interface means for communication with an external apparatus;

discrimination means for discriminating whether or not the data received from said bidirectional interface has been offset in the sub-scanning direction in accordance with quantities of offset of said recording elements for the plurality of colors in the sub-scanning direction relative to recording elements for any one of the plurality of colors;

processing means for processing the data if the received data has not been offset;

transmission means for transmitting the processed data to said external apparatus through said bidirectional interface; and control means for recording the received data if the received data has been offset.

48. A recording apparatus according to claim 47, wherein said processing means has boundary detection means for detecting boundary between different-color pixels and boundary-pixel replacing means for converting pixel data in the boundary portion detected by said boundary detection means into pixel data for another color.

49. A recording apparatus according to claim 47, wherein said recording head uses thermal energy to discharge ink to a recording medium.

50. A method according to claim 1, wherein said recording elements are arranged in a plurality of groups, each said group being separated from those of said groups adjacent thereto by a gap such that said recording elements in said groups are offset in a predetermined direction for recording the plurality of colors.

51. A recording apparatus according to claim 7, wherein said recording elements are arranged in a plurality of groups, each said group being separated from those of said groups adjacent thereto by a gap such that said recording elements in said groups are offset in a predetermined direction for recording the plurality of colors.

52. A recording system according to claim 16, wherein said recording elements are arranged in a plurality of groups, each said group being separated from those of said groups adjacent thereto by a gap such that said recording elements in said groups are offset in a predetermined direction for recording the plurality of colors.

53. A method of transferring data according to claim 21, wherein said recording elements are arranged in a plurality of groups, each said group being separated from those of said groups adjacent thereto by a gap such that said recording elements in said groups are offset in a sub-scanning direction for recording the plurality of colors.

54. A method of transferring data according to claim 41, wherein said recording elements are arranged in a plurality of groups, each said group being separated from those of said groups adjacent thereto by a gap such that said recording elements in said groups are offset in a sub-scanning direction for recording the plurality of colors.

55. A method according to claim 1, wherein said obtaining step obtains quantities of offset predetermined for each of the plurality of colors.

56. A recording system according to claim 16, wherein said obtaining means obtains quantities of offset predetermined for each of the plurality of colors.

57. A method of transferring data to be recorded in such a manner that the data to be recorded is transferred to a recording apparatus having a recording head including a plurality of recording elements offset in a predetermined direction for recording a plurality of colors, said method of transferring the data to be recorded comprising the steps of:

transferring, to said recording apparatus, the data which corresponds to said recording elements for any one of the plurality of colors; and transferring, to said recording apparatus, the data which is offset in the predetermined direction in accordance with a quantity of offset of said recording elements for the plurality of colors in the predetermined direction relative to said recording elements for the one of the plurality of colors and which corresponds to the plurality of said offset recording elements for the plurality of colors.

58. A recording apparatus having a recording head including a plurality of recording elements offset in a predetermined direction for recording a plurality of colors, said recording apparatus comprising:

receiving means for receiving both data, which is non-offset and corresponds to said recording elements for any one of the plurality of colors and data which is offset in a predetermined direction in accordance with quantities of offset of said recording elements for the plurality of colors in the predetermined direction relative to the recording elements for the one of the plurality of colors, and which corresponds to the plurality of colors; and storage means for storing the non-offset data and the offset data received by said receiving means which correspond to said recording elements for the plurality of colors.

* * * * *

UNITED STATES PATENT AND TRADEMARK OFFICE
CERTIFICATE OF CORRECTION

PATENT NO. : 5,907,666

DATED : May 25, 1999

INVENTORS : Kentaro Yano, et al.

Page 1 of 2

It is certified that error appears in the above-identified patent and that said Letters Patent is hereby corrected as shown below:

COLUMN 13

Line 20, "version" should read --conversion--.

COLUMN 22

Line 14, "n16O" should read --n160--.

COLUMN 23

Line 66, "whether not" should read --whether or not--.

COLUMN 26

Line 66, "a" should be deleted.

COLUMN 31

Line 17, "penetration-type inks" should read --magenta and cyan inks--;
Line 25, "easily" should read --easily be--;
Line 25, "to be" should read --the--;
Line 48, "correspond" should read --corresponding--; 2nd occurr
Line 56, "indicate" should read --indicates--; and
Line 67, "of" (second occurrence) should read --to--.

UNITED STATES PATENT AND TRADEMARK OFFICE
CERTIFICATE OF CORRECTION

PATENT NO.  : 5,907,666

DATED       : May 25, 1999

INVENTORS   : Kentaro Yano, et al.

It is certified that error appears in the above-identified patent and that said Letters Patent is hereby corrected as shown below:

COLUMN 32

Line 31, "the, region" should read --the region--.

COLUMN 38

Line 4, "certainly" should read --certainty--.

Signed and Sealed this

Fourteenth Day of December, 1999

Attest:

Q. TODD DICKINSON

Attesting Officer

Acting Commissioner of Patents and Trademarks